(12) United States Patent
Morinaga et al.

(10) Patent No.: US 12,345,987 B2
(45) Date of Patent: Jul. 1, 2025

(54) WIRING SUBSTRATE AND DISPLAY DEVICE

(71) Applicant: Sharp Display Technology Corporation, Kameyama (JP)

(72) Inventors: Junichi Morinaga, Kameyama (JP); Shingo Kamitani, Kameyama (JP); Hikaru Yoshino, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 18/585,150

(22) Filed: Feb. 23, 2024

(65) Prior Publication Data

US 2024/0329474 A1    Oct. 3, 2024

(30) Foreign Application Priority Data

Mar. 27, 2023   (JP) ................... 2023-049373

(51) Int. Cl.
| | |
|---|---|
| *G02F 1/1362* | (2006.01) |
| *G02F 1/1333* | (2006.01) |
| *G02F 1/1345* | (2006.01) |
| *G06F 3/044* | (2006.01) |

(52) U.S. Cl.
CPC ...... *G02F 1/136286* (2013.01); *G02F 1/1345* (2013.01); *G02F 1/13338* (2013.01); *G02F 1/13629* (2021.01); *G06F 3/0443* (2019.05)

(58) Field of Classification Search
None
See application file for complete search history.

(56) References Cited

U.S. PATENT DOCUMENTS

| | | | | |
|---|---|---|---|---|
| 4,804,953 | A * | 2/1989 | Castleberry | G02F 1/1362 345/206 |
| 5,148,248 | A * | 9/1992 | Possin | H01L 27/12 257/E27.111 |
| 2002/0054037 | A1 * | 5/2002 | Kawano | G02F 1/136259 345/205 |
| 2004/0257487 | A1 * | 12/2004 | Lee | G02F 1/136286 349/43 |
| 2006/0223222 | A1 * | 10/2006 | Choi | H10K 59/125 438/149 |
| 2007/0040956 | A1 * | 2/2007 | Shin | G02F 1/136286 349/50 |
| 2020/0083256 | A1 * | 3/2020 | Yoshida | G02F 1/1368 |
| 2020/0272011 | A1 * | 8/2020 | Yoshida | G06F 3/0412 |
| 2021/0116765 | A1 * | 4/2021 | Yoshida | G02F 1/13624 |

* cited by examiner

*Primary Examiner* — Ryan Crockett
(74) *Attorney, Agent, or Firm* — Keating & Bennett, LLP

(57) ABSTRACT

A wiring substrate includes a first wiring and a second wiring that intersects the first wiring. The first wiring is formed of a lower-layer wiring portion formed of a first conductive film and an upper-layer wiring portion formed of a second conductive film disposed on an upper layer side of the first conductive film via a first insulating film. A first contact hole that connects the lower-layer wiring portion and the upper-layer wiring portion is provided at a position where the first insulating film overlaps both the lower-layer wiring portion and the upper-layer wiring portion in the first insulating film. The second wiring is formed of a third conductive film disposed on an upper layer side of the second conductive film via second insulating films. The second insulating films have a larger film thickness than a film thickness of the first insulating film.

15 Claims, 31 Drawing Sheets

WIRING SUBSTRATE AND DISPLAY DEVICE

CROSS-REFERENCE TO RELATED APPLICATIONS

This application claims the benefit of priority to Japanese Patent Application Number 2023-049373 filed on Mar. 27, 2023. The entire content of the above-identified application is hereby incorporated by reference.

BACKGROUND

1. Field

A technique disclosed in the present specification relates to a wiring substrate and a display device.

2. Description of the Related Art

In the related art, a technique disclosed in U.S. Patent Application Publication No. 2020/0272011 below is known as an example of a display device including a wiring substrate. The display device disclosed in U.S. Patent Application Publication No. 2020/0272011 includes a liquid crystal layer, a pixel electrode that has a longitudinal shape and has a bent portion in the middle in a longitudinal direction, a common electrode that overlaps the pixel electrode via an insulating film interposed therebetween, and a wiring that extends in a short direction of the pixel electrode, overlaps the bent portion of the pixel electrode via an insulating film interposed therebetween, and is electrically connected to the common electrode.

The display device disclosed in U.S. Patent Application Publication No. 2020/0272011 described above is provided with a gate wiring for driving a TFT connected to the pixel electrode and a source wiring for supplying an image signal to the TFT. Here, for example, in a case where the length of the gate wiring is very long, wiring resistance of the gate wiring may increase, and as a result, a scanning signal transmitted by the gate wiring may be blunt. Due to parasitic capacitance generated between the gate wiring and the source wiring, a load of the gate wiring may increase, and as a result, the scanning signal transmitted by the gate wiring may be blunt.

The technique described in the present specification has been completed based on the above-described circumstances, and it is desirable to reduce bluntness of a signal.

SUMMARY (1) According to an aspect of a technique described in the present specification, there is provided a wiring substrate including a first wiring and a second wiring that intersects the first wiring, in which the first wiring is formed of a lower-layer wiring portion formed of a first conductive film and an upper-layer wiring portion formed of a second conductive film disposed on an upper layer side of the first conductive film via a first insulating film, a first contact hole that connects the lower-layer wiring portion and the upper-layer wiring portion is provided at a position where the first insulating film overlaps both the lower-layer wiring portion and the upper-layer wiring portion in the first insulating film, the second wiring is formed of a third conductive film disposed on an upper layer side of the second conductive film via second insulating films, and the second insulating films have a larger film thickness than a film thickness of the first insulating film.

(2) According to still another aspect of a technique described in the present specification, there is provided a display device including the wiring substrate according to (1) above, and a counter substrate disposed to face the wiring substrate.

DESCRIPTION OF THE EMBODIMENTS

First Embodiment

Figure 1:
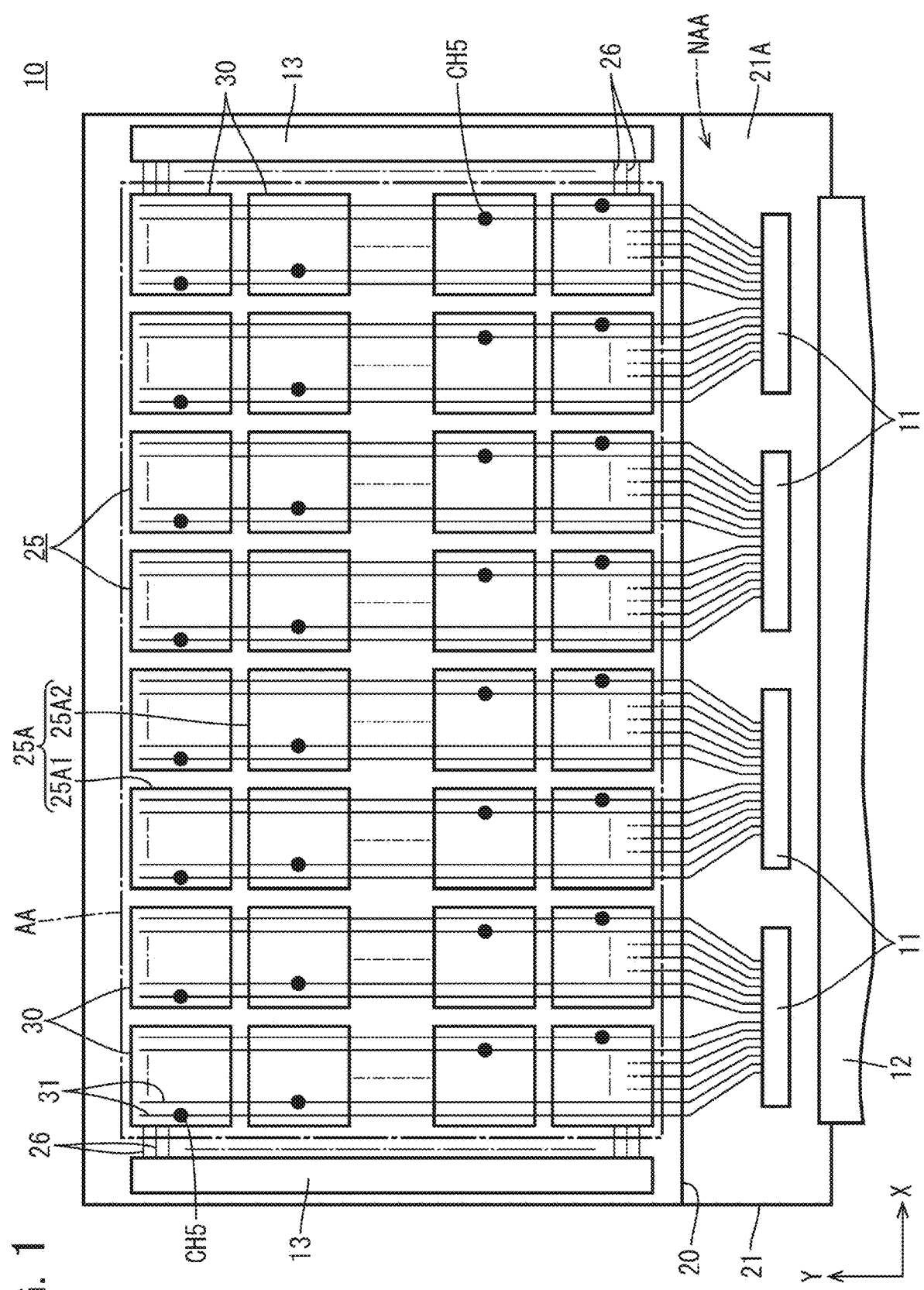
FIG. 1 is a plan view of a liquid crystal panel according to a first embodiment.
Figure 2:
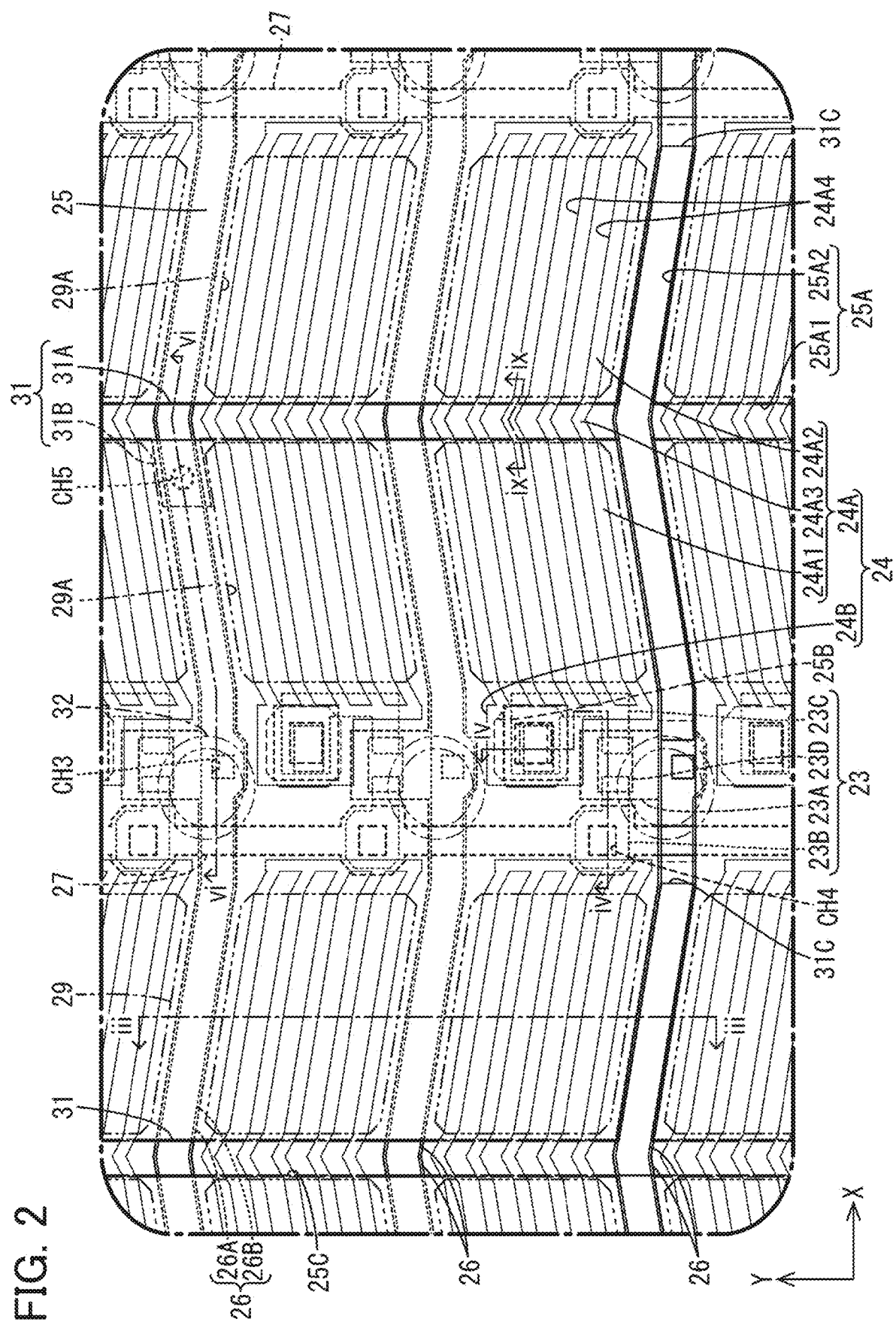
FIG. 2 is a plan view illustrating a pixel arrangement in a display region of the liquid crystal panel according to the first embodiment.
Figure 3:
FIG. 3 is a cross-sectional view of the liquid crystal panel according to the first embodiment taken along line iii-iii in FIG. 2.
Figure 4:
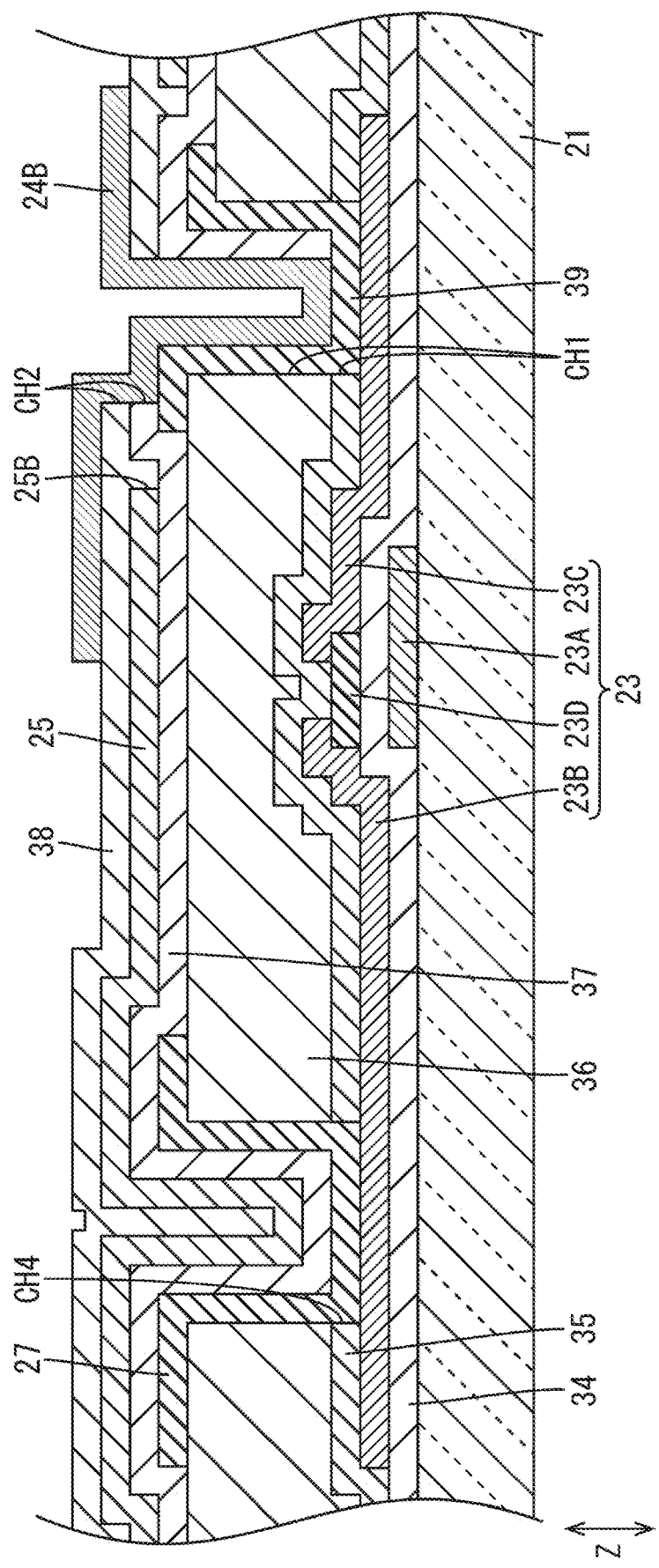
FIG. 4 is a cross-sectional view of an array substrate that constitutes the liquid crystal panel according to the first embodiment taken along line iv-iv in FIG. 2.
Figure 5:
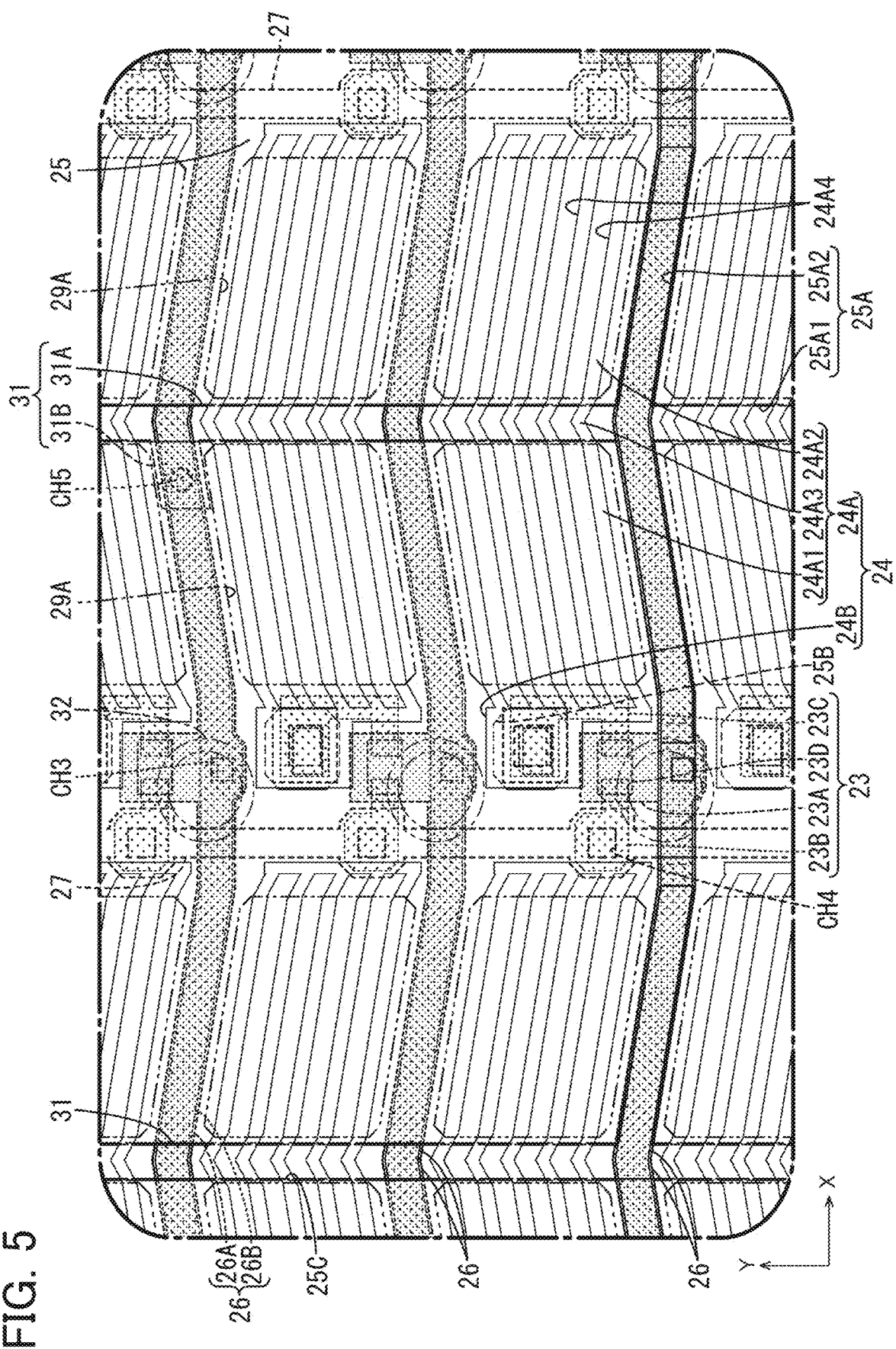
FIG. 5 is a plan view illustrating the pixel arrangement in the display region of the liquid crystal panel according to the first embodiment and is a plan view illustrating a first metal film and a second metal film in different mesh shapes.
Figure 6:
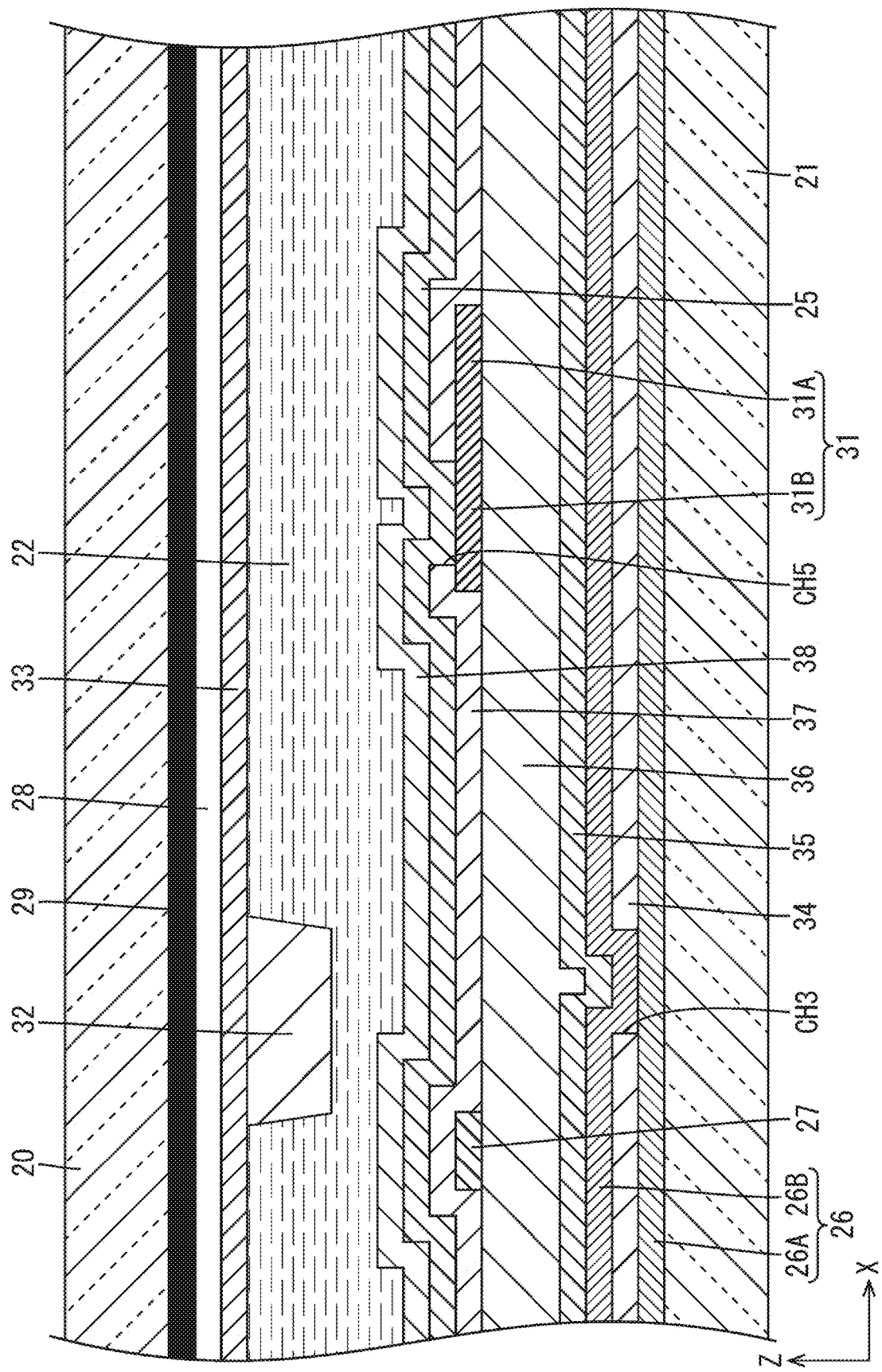
FIG. 6 is a cross-sectional view of the liquid crystal panel according to the first embodiment taken along the line vi-vi in FIG. 2.
Figure 8:
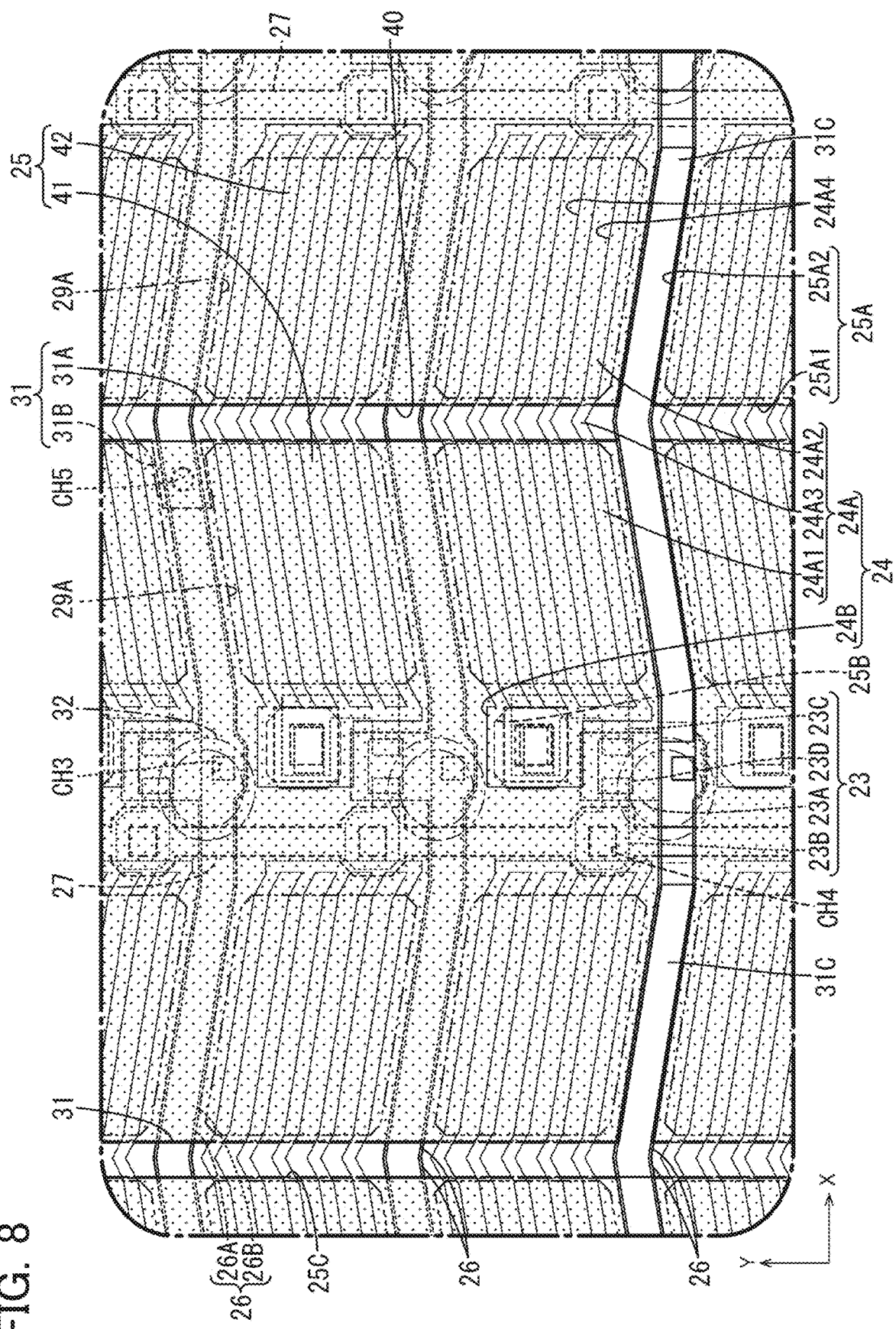
FIG. 8 is a plan view illustrating a pixel arrangement in a display region of the liquid crystal panel according to the first embodiment and is a plan view illustrating a first transparent electrode film in a mesh shape.
Figure 9:
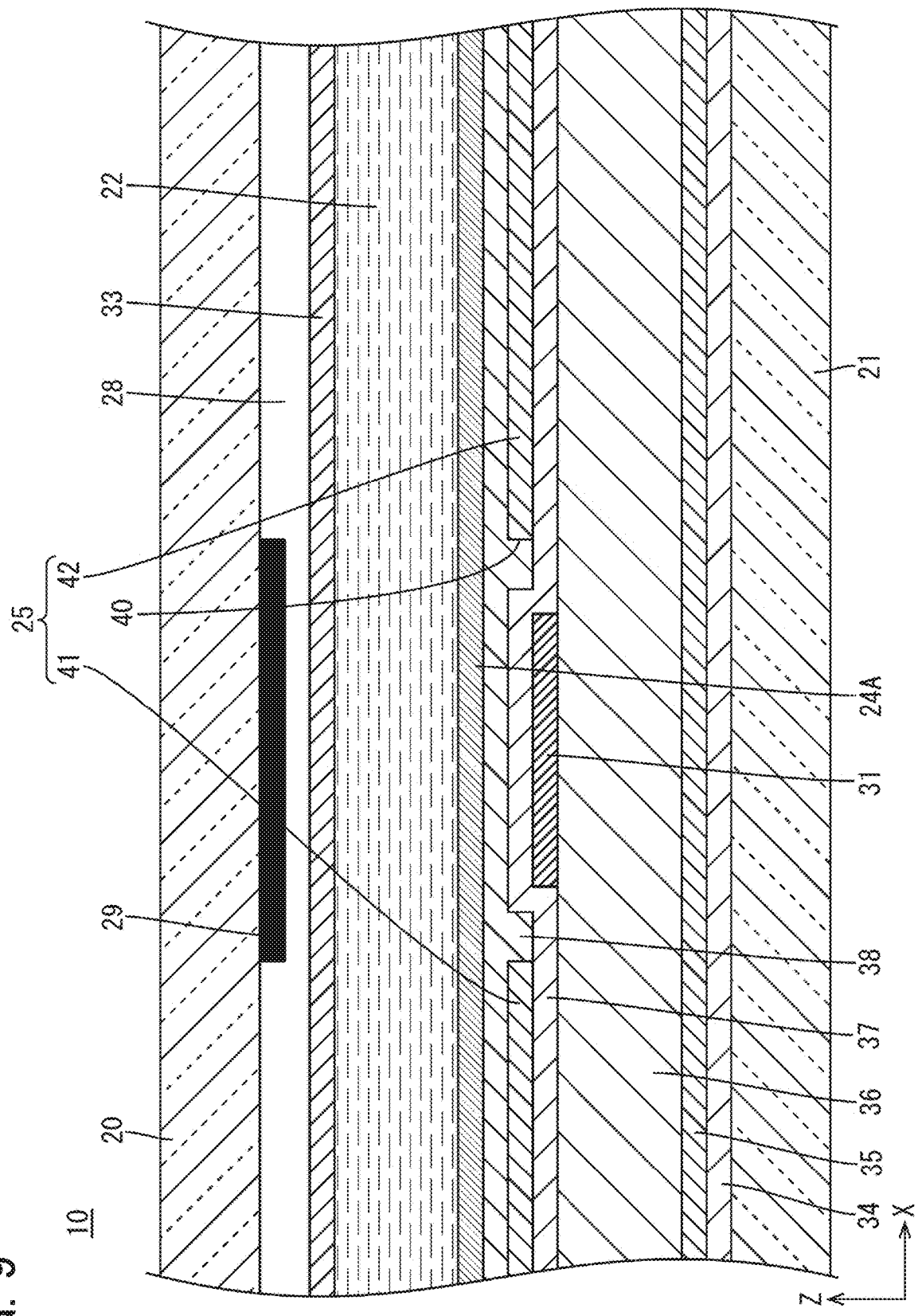
FIG. 9 is a cross-sectional view of the liquid crystal panel according to the first embodiment taken along line ix-ix in FIG. 2.

A first embodiment will be described with reference to FIGS. 1 to 9. In the present embodiment, a liquid crystal panel (display device) 10 having an image display function and a touch panel function (position input function, position detection function) will be illustrated. The X-axis, Y-axis, and Z-axis are shown in a part of each drawing, and the direction of each axis is drawn in the direction shown in each drawing. An upper side of FIGS. 3, 6, and 9 is defined as a front side, and a lower side of the same drawing is defined as a rear side.

A schematic planar configuration of the liquid crystal panel 10 will be described with reference to FIG. 1. As illustrated in FIG. 1, the liquid crystal panel 10 has a substantially rectangular planar shape that is horizontally long as a whole. In the liquid crystal panel 10, a short-side direction coincides with the Y-axis direction, a long-side direction coincides with the X-axis direction, and a plate thickness direction (normal direction of the main surfaces of each of substrates 20 and 21) coincides with the Z-axis direction. In the present embodiment, an X-axis direction is a "first direction", and a Y-axis direction is a "second direction that intersects the first direction". The liquid crystal panel 10 can be used, for example, in an in-vehicle liquid crystal display device, or the like. The in-vehicle liquid crystal display device is used, for example, in an instrument panel, a multifunctional display, an information system, or the like, and generally has a horizontally long shape. The ratio of the long side dimension to the short side dimension in the liquid crystal panel 10 varies depending on the application of the liquid crystal display device. For example, in a case where the length of the in-vehicle liquid crystal display device has a value close to a vehicle width from the front of a passenger seat to the front of a driver seat, the above ratio has a very high value. The liquid crystal panel 10 can display an image by using illumination light emitted from a backlight device (illumination device) disposed on the rear side of the liquid crystal panel 10. The backlight device is disposed on the rear side (back surface side) of the liquid crystal panel 10, and includes a light source (for example, LED), an optical member that converts the light from the light source into planar light by applying an optical effect, and the like, for example.

As illustrated in FIG. 1, the liquid crystal panel 10 has a display region (range surrounded by a one-dot chain line in FIG. 1) AA on which an image is displayed at a central portion of a screen. On the other hand, a picture-frame-shaped (frame-shaped) peripheral portion surrounding the display region AA on the screen of the liquid crystal panel 10 is defined as a non-display region NAA in which no image is displayed. The liquid crystal panel 10 is formed by bonding a pair of substrates 20 and 21. The substrate on the front side (front side) of the pair of substrates 20 and 21 is used as a counter substrate 20, and the substrate on the rear side (back surface side) is used as an array substrate (wiring substrate) 21. Both the counter substrate 20 and the array substrate 21 are formed by stacking various films on the inner surface side of a glass substrate. A polarizing plate is attached to each of the outer surface sides of the substrates 20 and 21.

As illustrated in FIG. 1, the array substrate 21 includes a protrusion portion 21A that protrudes laterally from the counter substrate 20 along the Y-axis direction. A driver (signal supply unit) 11 and a flexible substrate 12 for supplying various signals related to the display function and the touch panel function, which will be described below, are mounted on the protrusion portion 21A. The driver 11 is mounted on the protrusion portion 21A on the array substrate 21 by chip on glass (COG). The driver 11 is formed of an LSI chip having a drive circuit inside, and processes various signals transmitted by the flexible substrate 12. The drivers 11 are arranged in the display region AA on the array substrate 21 at intervals in the Y-axis direction. The flexible substrate 12 has a configuration in which multiple wiring patterns are formed on a substrate formed of a synthetic resin material having insulating properties and flexibility (for example, polyimide resin or the like). One end side portion of the flexible substrate 12 is connected to the array substrate 21, and the other end side portion is connected to an external control substrate (signal supply source). Various signals supplied from the control substrate are transmitted to the liquid crystal panel 10 via the flexible substrate 12. In the non-display region NAA of the array substrate 21, a pair of gate circuit units 13 is provided so as to interpose the display region AA from both sides in the X-axis direction. The gate circuit unit 13 supplies a scanning signal to a gate wiring 26 which will be described later. The gate circuit unit 13 is monolithically provided on the array substrate 21.

The liquid crystal panel 10 according to the present embodiment has both a display function of displaying an image and a touch panel function of detecting the position (input position) where the user inputs based on the displayed image. The liquid crystal panel 10 is integrated (in-cell) with a touch panel pattern for exhibiting the touch panel function. The touch panel pattern is defined as a so-called projection electrostatic capacitance system, and a detection system is defined as a self-capacitance type. As illustrated in FIG. 1, the touch panel pattern is configured to include a plurality of touch electrodes (position detection electrodes) 30 arranged in a matrix shape in the main surface of the liquid crystal panel 10. The touch electrodes 30 are disposed in the display region AA of the liquid crystal panel 10. Therefore, the display region AA of the liquid crystal panel 10 substantially coincides with a touch region (position input region) where an input position can be detected. The non-display region NAA substantially coincides with a non-touch region (non-position input region) where detection of the input position is not possible. When a user brings a position input object such as a finger of the user that is a conductor or a touch pen operated by the user close to the front surface (display surface) of the liquid crystal panel 10 based on an image displayed in the display region AA of the liquid crystal panel 10, electrostatic capacitance is formed between the position input object and the touch electrode 30. As a result, a change occurs in the electrostatic capacitance detected by the touch electrode 30 located near the position input object due to approach of the position input object, and thus electrostatic capacitance different from the electrostatic capacitance of the touch electrode 30 located far from the position input object is obtained. A detection circuit which will be described later can detect an input position based on this difference in electrostatic capacitance.

As illustrated in FIG. 1, the touch electrode 30 described above is configured by a common electrode 25 provided on the array substrate 21. The common electrode 25 is disposed over substantially the entire region of the display region AA. The common electrode 25 includes a partition opening portion (partition slit) 25A having a substantially lattice shape, and is divided into a plurality of touch electrodes 30 by the partition opening portion 25A. The partition opening portion 25A includes a first partition opening portion 25A1 and a second partition opening portion 25A2. The first partition opening portion 25A1 traverses the entire length of the common electrode 25 substantially along the Y-axis direction and partitions a space between the touch electrodes 30 adjacent to each other in the X-axis direction. The second partition opening portion 25A2 crosses the entire length of the common electrode 25 along the X-axis direction and partitions a space between the touch electrodes 30 adjacent to each other in the Y-axis direction. A plurality of the first partition opening portions 25A1 are arranged at intervals corresponding to the touch electrode 30 in the X-axis direction. A plurality of the second partition opening portions 25A2 are arranged at intervals corresponding to the touch electrode 30 in the Y-axis direction. A plurality of touch electrodes 30 partitioned by the partition opening portion 25A are disposed to be arranged at intervals along the Y-axis direction and the X-axis direction in the display region AA. The touch electrode 30 has a substantially rectangular shape in a plan view, and the dimension of one side is approximately several millimeters. The size of the touch electrode 30 is much larger than a pixel described later in a plan view. The touch electrodes 30 are disposed in a range spanning a plurality of pixels in the X-axis direction and the Y-axis direction.

As illustrated in FIG. 1, a plurality of touch wirings (third wirings, position detection wirings) 31 provided on the liquid crystal panel 10 are selectively connected to the plurality of touch electrodes 30. The touch wiring 31 extends in the Y-axis direction to cross all the touch electrodes 30 arranged in a row in the Y-axis direction. One end side portion of the touch wiring 31 in the Y-axis direction is connected to the driver 11 in the non-display region NAA. The touch wiring 31 is connected to a specific touch electrode 30 of the plurality of touch electrodes 30 arranged in the Y-axis direction in the display region AA. The touch wiring 31 is extended from the touch electrode 30 as a connection target to the opposite side (upper side in FIG. 1) of the driver 11 side (lower side in FIG. 1). The touch wiring 31 is connected to an inspection circuit, an anti-static element, and the like (not illustrated) disposed in the non-display region NAA on the reverse side (upper side in FIG. 1) of the driver 11. Depending on the number of the touch wirings 31 installed, only one touch wiring 31 may be connected to one touch electrode 30, or a plurality of touch wirings 31 may be connected to one touch electrode 30. The number of touch wirings 31 connected to one touch electrode 30 may be different according to the position of the touch electrode 30. In that case, for example, it is preferable that the number of touch wirings 31 connected to the touch electrode 30 far from the driver 11 be more than the number of touch wirings 31 connected to the touch electrode 30 close to the driver 11, but the present embodiment is not limited thereto. In FIG. 1, a connection portion of the touch wiring 31 to the touch electrode 30 (third wiring contact hole CH5) is illustrated by a black circle. Furthermore, the touch wiring 31 is connected to the detection circuit. The detection circuit may be provided in the driver 11, and may be provided outside the liquid crystal panel 10 via the flexible substrate 12. The detailed configuration of the touch wiring 31 will be described later.

As illustrated in FIG. 1, a common potential signal related to the image display function and a touch signal (position detection signal) related to the touch panel function are supplied from the driver 11 to the touch wiring 31 in a time division manner. A timing at which the common potential signal is supplied from the driver 11 to the touch wiring 31 is a display period. A timing at which the touch signal is supplied from the driver 11 to the touch wiring 31 is a sensing period (position detection period). The common potential signal is transmitted to all the touch wirings 31 at the same timing (display period), and thus all the touch electrodes 30 have a reference potential based on the common potential signal and function as the common electrode 25.

The configuration of the display region AA on the array substrate 21 and the counter substrate 20 constituting the liquid crystal panel 10 will be described with reference to FIG. 2. FIG. 2 illustrates two rows of a pixel arrangement. As illustrated in FIG. 2, a thin film transistor (switching element, TFT) 23 and a pixel electrode 24 are provided on the inner surface side of the display region AA on the array substrate 21. A plurality of TFTs 23 and a plurality of pixel electrodes 24 are provided to be arranged in a matrix shape at intervals along the X-axis direction and the Y-axis direction. A gate wiring (first wiring, scanning wiring) 26 and a source wiring (second wiring, signal wiring, data wiring) 27 that are perpendicular (intersect) to each other are disposed around the TFTs 23 and pixel electrodes 24. The gate wiring 26 is repeatedly bent in a zigzag shape and extends substantially in the X-axis direction to cross the display region AA. A plurality of gate wirings 26 are arranged at intervals in the Y-axis direction. The source wiring 27 extends substantially straight in the Y-axis direction and traverses the display region AA. A plurality of source wirings 27 are arranged at intervals in the X-axis direction. The TFT 23 is disposed to be adjacent to a portion (intersection portion) where the gate wiring 26 and the source wiring 27 intersect each other. The pixel electrode 24 is disposed to interpose the TFT 23 in the X-axis direction between the intersection portions of the gate wirings 26 and the source wirings 27. Each of the gate wiring 26, the source wiring 27, and the pixel electrode 24 that are disposed adjacent to each other are connected to the TFT 23. The TFT 23 is driven based on the scanning signal transmitted by the gate wiring 26, and can charge the pixel electrode 24 to a potential based on an image signal transmitted by the source wiring 27 with the driving.

As illustrated in FIG. 2, the pixel electrode 24 has a horizontally longitudinal shape in a plan view, and a longitudinal direction coincides with the X-axis direction, and a short direction coincides with the Y-axis direction. The ratio of a longitudinal dimension to a short dimension in the pixel electrode 24 is 3. While the gate wiring 26 is interposed between the pixel electrodes 24 adjacent in the short direction (Y-axis direction), the source wiring 27 and the TFT 23 are interposed between the pixel electrodes 24 adjacent in the longitudinal direction (X-axis direction). The arrangement interval of the gate wiring 26 is approximately the same as the short dimension of the pixel electrode 24, and the arrangement interval of the source wiring 27 is approximately the same as the longitudinal dimension of the pixel electrode 24. Therefore, as compared with the case where the pixel electrode has a vertically elongated shape, the arrangement interval of the source wiring 27 is approximately the ratio obtained by dividing the short dimension of the pixel electrode 24 by the longitudinal dimension (for example, approximately 1/3). Accordingly, the number of installed source wirings 27 per unit length in the X-axis direction is approximately the same ratio as described above (for example, approximately 1/3). As compared with the case where the pixel electrode has a vertically elongated shape, the arrangement interval of the gate wiring 26 is approximately the ratio obtained by dividing the longitudinal dimension of the pixel electrode 24 by the short dimension (for example, approximately 3). Accordingly, the number of installed gate wirings 26 per unit length in the X-axis direction is approximately the same ratio as described above (for example, approximately 3). As a result, the number of installed source wirings 27 can be reduced, so that the number of image signals supplied to the source wiring 27 is reduced.

A light shielding portion 29 and a spacer 32 indicated by two-dot chain lines in FIG. 2 are formed on the counter substrate 20 side. The light shielding portion 29 has a substantially grid-like planar shape to partition a space between the pixel electrodes 24 adjacent to each other, and has a pixel opening portion 29A at a position where the light shielding portion 29 overlaps most of the pixel electrodes 24 in a plan view. It is possible to emit the transmitted light of the pixel electrode 24 to the outside of the liquid crystal panel 10 by the pixel opening portion 29A. The light shielding portion 29 is disposed to overlap at least the TFT 23, the gate wiring 26, the source wiring 27, and the touch wiring 31 on the array substrate 21 side in a plan view. The spacer 32 is provided for holding an interval between the pair of substrates 20 and 21. The spacer 32 has a substantially circular planar shape. The spacer 32 is disposed near an intersection portion between the gate wiring 26 and the source wiring 27 provided on the array substrate 21. The spacer 32 has a height equivalent to a cell thickness (distance between the array substrate 21 and the counter substrate 20, that is, the thickness of a liquid crystal layer 22). There are a main spacer having a function of holding a cell thickness uniform and a sub-spacer that has a function of supporting when a load is applied from the outside of a cell and has a height smaller than a height of the main spacer by a predetermined amount. FIG. 2 illustrates an example in which the spacer 32 is a sub-spacer, but the spacer 32 may be a main spacer.

A cross-sectional configuration of the liquid crystal panel 10 will be described with reference to FIG. 3. As illustrated in FIG. 3, the liquid crystal panel 10 includes a liquid crystal layer (medium layer) 22 disposed between a pair of substrates 20 and 21 and containing liquid crystal molecules which are substances whose optical performance change with application of an electric field. In the display region AA on the inner surface side of the counter substrate 20 constituting the liquid crystal panel 10, three color filters 28 of blue (B), green (G), and red (R) are provided. A plurality of color filters 28 having colors different from each other are arranged to be adjacent to each other in an extension direction (Y-axis direction) of the source wiring 27. A plurality of color filters 28 having colors different from each other extend in an extension direction (substantially X-axis direction) of the gate wiring 26. As described above, the plurality of color filters 28 having colors different from each other are arranged in horizontal stripes as a whole. These color filters 28 are disposed to overlap each pixel electrode 24 on the array substrate 21 side in a plan view. The color filter 28 and the pixel electrode 24 overlapping each other constitute a pixel which is a display unit. A plurality of color filters 28 having colors different from each other are disposed so that the boundaries (color boundaries) overlap the gate wiring 26. An overcoat film 33 disposed in a solid pattern over substantially the entire area of the counter substrate 20 for flattening is also provided on the upper layer side (liquid crystal layer 22 side) of the color filter 28. An alignment film for aligning the liquid crystal molecules contained in the liquid crystal layer 22 is formed on the innermost surface (uppermost layer) of both substrates 20 and 21 in contact with the liquid crystal layer 22, respectively.

Here, various films stacked on the inner surface side of the array substrate 21 will be described with reference to FIGS. 3 and 4. FIG. 4 is a cross-sectional view of the array substrate 21 in the vicinity of TFT 23. As illustrated in FIGS. 3 and 4, on the array substrate 21, a first metal film (first conductive film), a gate insulating film (first insulating film) 34, a semiconductor film, a second metal film (second conductive film), a first interlayer insulating film (second insulating film) 35, a flattening film (second insulating film) 36, a third metal film (third conductive film), a second interlayer insulating film (third insulating film) 37, a first transparent electrode film, a third interlayer insulating film (fourth insulating film) 38, and a second transparent electrode film are stacked in this order from the lower layer side (glass substrate side). Each of the first metal film, the second metal film, and the third metal film has conductivity and light shielding properties by being a single layer film made of one type of metal material selected from copper, titanium, aluminum, molybdenum, tungsten, and the like, or a stacked film made of different types of metal materials or alloy. The first metal film constitutes a portion of the gate wiring 26, a gate electrode 23A of the TFT 23, and the like. The second metal film constitutes a portion of the gate wiring 26, a source electrode 23B and a drain electrode 23C of the TFT 23, and the like. The third metal film constitutes the source wiring 27, the touch wiring 31, and the like. The semiconductor film is made of a thin film, for example, using a semiconductor material such as an oxide semiconductor and amorphous silicon, as a material, and constitutes a semiconductor portion 23D of the TFT 23 and the like. The first transparent electrode film and the second transparent electrode film are made of a transparent electrode material (for example, indium tin oxide (ITO) or indium zinc oxide (IZO)). The first transparent electrode film constitutes the common electrode 25 (touch electrode 30) and the like. The second transparent electrode film constitutes the pixel electrode 24 and the like.

Each of the gate insulating film 34, the first interlayer insulating film 35, the second interlayer insulating film 37, and the third interlayer insulating film 38 is formed of an inorganic insulating material such as silicon nitride ($SiN_x$) and silicon oxide ($SiO_2$). The film thicknesses of the gate insulating film 34, the first interlayer insulating film 35, the second interlayer insulating film 37, and the third interlayer insulating film 38 formed of an inorganic insulating material are set to, for example, approximately 200 nm to 700 nm. The flattening film 36 is formed of, for example, an organic insulating material such as PMMA (acrylic resin), and has a larger film thickness than film thicknesses of the other insulating films 34, 35, 37, and 38 formed of an inorganic insulating material. The film thickness of the flattening film 36 formed of an organic insulating material is set to, for example, approximately 1 μm to 3 μm, and is larger than the film thicknesses of the gate insulating film 34, the first interlayer insulating film 35, the second interlayer insulating film 37, and the third interlayer insulating film 38 made of an inorganic insulating material, by an order of magnitude. The front surface of the array substrate 21 is flattened by the flattening film 36. The gate insulating film 34 keeps the first metal film on the lower layer side, and the semiconductor film and the second metal film on the upper layer side in an insulated state. The first interlayer insulating film 35 and the flattening film 36 keeps the semiconductor film and the second metal film on the lower layer side and the third metal film on the upper layer side in an insulated state. The second interlayer insulating film 37 keeps the third metal film on the lower layer side and the first transparent electrode film on the upper layer side in an insulated state. The third interlayer insulating film 38 keeps the first transparent electrode film on the lower layer side and the second transparent electrode film on the upper layer side in an insulated state.

A configuration of the TFT 23 will be described in detail with reference to FIGS. 4 and 5. FIG. 5 illustrates the pixel arrangement in the same range as that of FIG. 2. FIG. 5 illustrates the first metal film and the second metal film provided on the array substrate 21 in different mesh shapes, respectively. As illustrated in FIGS. 4 and 5, the TFT 23 includes the gate electrode 23A formed of the first metal film. The gate electrode 23A is branched from the gate wiring 26. Specifically, the gate electrode 23A is formed by making a portion of the gate wiring 26 protrude toward the pixel electrode 24 side as a connection target in the Y-axis direction. The gate electrode 23A has a substantially rectangular shape in a plan view. A scanning signal transmitted to the gate wiring 26 is supplied to the gate electrode 23A. The TFT 23 includes the source electrode 23B formed of the second metal film. The source electrode 23B extends in the X-axis direction. One end portion thereof is disposed to overlap the source wiring 27, and the other end portion thereof is disposed to overlap the semiconductor portion 23D described later. A portion of the source wiring 27 overlapping the source electrode 23B is wider than the other portions, and the wide portion is connected to the source electrode 23B.

As illustrated in FIGS. 4 and 5, the TFT 23 includes the drain electrode 23C formed of the second metal film. In the drain electrode 23C, both end portions of a portion extending in the Y-axis direction extend to the same side (left side in FIG. 5) in the X-axis direction, and the entire planar shape is a gate shape. One end portion of the drain electrode 23C, which extends in the X-axis direction, is disposed to overlap the semiconductor portion 23D at a position spaced from the source electrode 23B in the X-axis direction. The other end portion of the drain electrode 23C, which extends in the X-axis direction, is disposed to overlap both an intermediate electrode 39 and a portion of the pixel electrode 24. The intermediate electrode 39 is formed of a third metal film located between the drain electrode 23C formed of the second metal film, and the pixel electrode 24 formed of the second transparent electrode film in the Z-axis direction. The intermediate electrode 39 has a rectangular planar shape that is larger than one end portion of the drain electrode 23C by one size. A first pixel contact hole CH1 is formed as an opening at a position where the first interlayer insulating film 35 and the flattening film 36 overlap both the drain electrode 23C and the intermediate electrode 39 in the first interlayer insulating film 35 and the flattening film 36. The intermediate electrode 39 is connected to the drain electrode 23C through the first pixel contact hole CH1. A second pixel contact hole CH2 is formed as an opening at a position where the second interlayer insulating film 37 and the third interlayer insulating film 38 overlaps both the intermediate electrode 39 and the pixel electrode 24 in the second interlayer insulating film 37 and the third interlayer insulating film 38. The pixel electrode 24 is connected to the intermediate electrode 39 through the second pixel contact hole CH2. As described above, the pixel electrode 24 is connected to the drain electrode 23C via the intermediate electrode 39.

As illustrated in FIGS. 4 and 5, the TFT 23 includes the semiconductor portion 23D formed of a semiconductor film. The semiconductor portion 23D has a rectangular shape that is horizontally long and extends in the X-axis direction in a plan view. One end portion of the semiconductor portion 23D is connected to the source electrode 23B, and the other end portion thereof is connected to the drain electrode 23C. The semiconductor portion 23D is disposed to overlap the gate electrode 23A via the gate insulating film 34. When the TFT 23 is turned on based on the scanning signal supplied to the gate electrode 23A, an image signal supplied from the source wiring 27 to the source electrode 23B is supplied to the drain electrode 23C via the semiconductor portion 23D. As a result, the pixel electrode 24 is charged to a potential based on the image signal.

As illustrated in FIGS. 5 and 6, the gate wiring 26 according to the present embodiment has a stacked structure of a lower-layer wiring portion 26A formed of the first metal film and an upper-layer wiring portion 26B formed of the second metal film. FIG. 6 is a cross-sectional view of the array substrate 21 cut along the gate wiring 26. The lower-layer wiring portion 26A and the upper-layer wiring portion 26B overlap each other and are parallel to each other, and are repeatedly bent in a zigzag shape and extend substantially in the X-axis direction. The lower-layer wiring portion 26A includes the gate electrode 23A that partially protrudes in the Y-axis direction. The gate electrode 23A is disposed not to overlap the upper-layer wiring portion 26B. A first wiring contact hole (first contact hole) CH3 is provided at a position where the gate insulating film 34 overlaps both the lower-layer wiring portion 26A and the upper-layer wiring portion 26B in the gate insulating film 34. The upper-layer wiring portion 26B is connected to the lower-layer wiring portion 26A through the first wiring contact hole CH3. The first wiring contact hole CH3 is disposed at a position spaced from the central portion of the semiconductor portion 23D in the TFT 23 in the Y-axis direction. A plurality of first wiring contact holes CH3 are arranged at positions at intervals of approximately one pixel in the X-axis direction. The number of installed first wiring contact holes CH3 disposed to overlap one gate wiring 26 is equal to the number of arrangements of pixels (TFTs 23 and pixel electrodes 24) arranged in the X-axis direction. As described above, the gate wiring 26 according to the present embodiment has a stacked structure of the lower-layer wiring portion 26A and the upper-layer wiring portion 26B that are connected to each other through the first wiring contact hole CH3 of the gate insulating film 34. Thus, the wiring resistance is reduced as compared with the case where the gate wiring 26 has a single-layer structure formed of only the first metal film. As a result, bluntness in the scanning signal transmitted by the gate wiring 26 is unlikely to occur.

Figure 7:
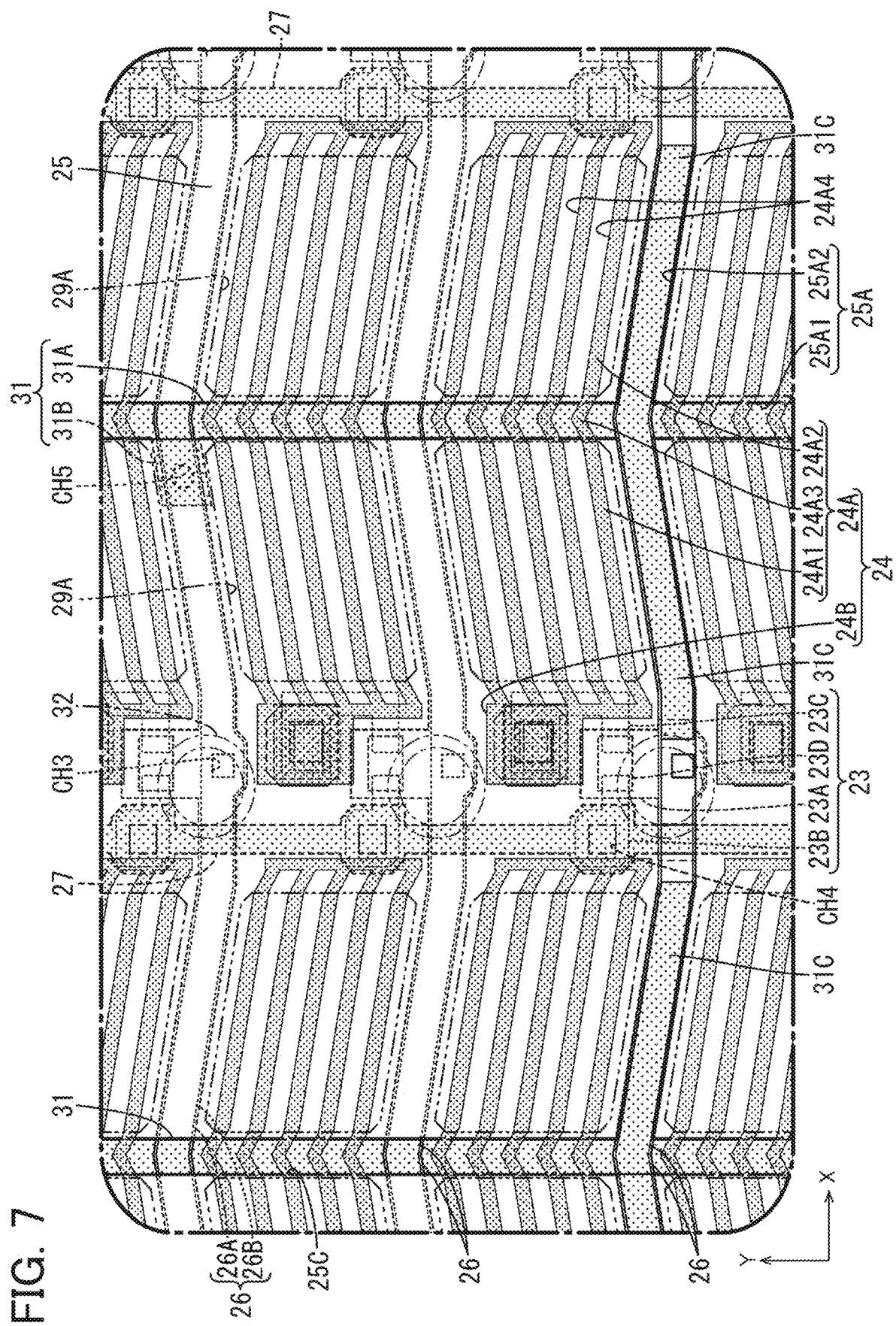
FIG. 7 is a plan view illustrating a pixel arrangement in a display region of the liquid crystal panel according to the first embodiment and is a plan view illustrating a third metal film and a second transparent electrode film in different mesh shapes.

In this state, as illustrated in FIGS. 6 and 7, the source wiring 27 according to the present embodiment is formed of the third metal film (third conductive film). FIG. 7 illustrates the pixel arrangement in the same range as that of FIG. 2. FIG. 7 illustrates the third metal film and the second transparent electrode film provided on the array substrate 21 in different mesh shapes, respectively. The first interlayer insulating film 35 and the flattening film 36 are interposed between the source wiring 27 and the upper-layer wiring portion 26B constituting the gate wiring 26. The source wiring 27 and the upper-layer wiring portion 26B intersect each other. The gate wiring 26 and the source wiring 27 are kept in an insulated state by the first interlayer insulating film 35 and the flattening film 36. The total film thickness of the first interlayer insulating film 35 and the flattening film 36 is in a micrometer order and is larger than the film thickness of the gate insulating film 34 which is in a nanometer order, by an order of magnitude. Therefore, as compared with the case where an insulating film having the same film thickness as that of the gate insulating film 34 is interposed between the gate wiring 26 and the source wiring 27, the parasitic capacitance that may be generated between the gate wiring 26 and the source wiring 27 is reduced. For the flattening film 36, an organic insulating material having a relative dielectric constant (for example, relative dielectric constant 3 to 4) smaller than the relative dielectric constant of the inorganic insulating material used for the gate insulating film 34 (for example, relative dielectric constant 4 to 8) can be used. As a result, a load on the gate wiring 26 is reduced, and bluntness in the scanning signal transmitted by the gate wiring 26 is unlikely to occur.

As described above, according to the present embodiment, bluntness in the scanning signal transmitted by the gate wiring 26 is unlikely to occur. Thus, as the pixel electrode 24 has the horizontally long shape, the number of the installed gate wirings 26 is approximately three times that of the case where the pixel electrode is formed of a vertically elongated shape. Even if the time when the scanning signal is supplied to one gate wiring 26 (writing time of the TFT 23) is about 1/3, it is possible to appropriately drive the TFT 23 and appropriately charge the pixel electrode 24. In addition to this, for example, as the liquid crystal panel 10 has a very horizontally long shape, the length of the gate wiring 26 becomes very long, and this is suitable for a case where there is a concern that the wiring resistance of the gate wiring 26 increases.

In the present embodiment, since the source wiring 27 is formed of the third metal film, the connection structure of the TFT 23 with the source electrode 23B is as follows. That is, as illustrated in FIG. 4, a second wiring contact hole CH4 is provided in the first interlayer insulating film 35 and the flattening film 36 interposed between overlap portions of the source electrode 23B formed of the second metal film and the source wiring 27 formed of the third metal film. The second wiring contact hole CH4 is disposed at a position that overlaps both one end portion of the source electrode 23B and the wide portion of the source wiring 27. The source wiring 27 is connected to the source electrode 23B through the second wiring contact hole CH4.

A detailed configuration of the pixel electrode 24 will be described with reference to FIGS. 3, 4, and 7. As illustrated in FIG. 7, the pixel electrode 24 includes a pixel electrode body 24A having a horizontally long planar shape. The pixel electrode body 24A is bent in the middle in the longitudinal direction. Specifically, the pixel electrode body 24A has a shallow inverted V shape in which both side edges on the longitudinal side are slightly inclined with respect to the X-axis direction, and the pixel electrode body 24A is bent once at a substantially central position. The pixel electrode body 24A includes a first pixel electrode portion 24A1, a second pixel electrode portion 24A2, and a bent portion 24A3. The first pixel electrode portion 24A1 extends in a first inclination direction inclined from the X-axis direction. The second pixel electrode portion 24A2 extends in a second inclination direction that is inclined from the X-axis direction and intersects the first inclination direction. The bent portion 24A3 is interposed between the first pixel electrode portion 24A1 and the second pixel electrode portion 24A2. The first inclination direction described above is a direction from the lower left to the upper right in FIG. 7. The second inclination direction described above is a direction from the upper left to the lower right in FIG. 7. The bent portion 24A3 has an inverted V shape in a plan view, and has a relationship of being inclined to the touch wiring 31. The bent portion 24A3 is the central portion of the pixel electrode body 24A in the longitudinal direction. As illustrated in FIGS. 3 and 7, a plurality of (four in FIG. 7) slits 24A4 that extend in along a side edge on the longitudinal side are formed in the pixel electrode body 24A. The slits 24A4 are continuously provided over the first pixel electrode portion 24A1, the second pixel electrode portion 24A2, and the bent portion 24A3. The specific number of installation, shape, formation range, and the like of the slits 24A4 can be appropriately changed other than those illustrated in the drawing. For example, the bent portion 24A3 illustrated in FIG. 7 includes an inverted V-shaped portion that extends in a direction different from the first inclination direction and the second inclination direction. The portion that extends in the direction different from the first inclination direction and the second inclination direction may not be provided and can be changed to an inverted V shape that extends in the same direction as the first inclination direction and the second inclination direction.

As illustrated in FIG. 7, the pixel electrode 24 includes a contact portion 24B that protrudes to one side from the pixel electrode body 24A in the X-axis direction. The contact portion 24B protrudes leftward from the first pixel electrode portion 24A1 in FIG. 7, and is disposed to overlap the other end portion of the drain electrode 23C and the intermediate electrode 39. The contact portion 24B has a rectangular shape in a plan view. As illustrated in FIG. 4, the contact portion 24B is connected to the other end portion of the drain electrode 23C via the intermediate electrode 39. As illustrated in FIG. 3, the plurality of pixel electrodes 24 are disposed to overlap the upper layer side of the common electrode 25 via the third interlayer insulating film 38. When the pixel electrode 24 having such a configuration is charged, a potential difference occurs between the pixel electrode 24 and the overlapping common electrode 25. As a result, between an opening edge of the slit 24A4 in the pixel electrode 24 and the common electrode 25, a fringe electric field including a component in the normal direction to the main surface of the array substrate 21 in addition to a component along the main surface of the array substrate 21 (inclination electric field) is generated. By utilizing this fringe electric field, an alignment state of the liquid crystal molecules contained in the liquid crystal layer 22 can be controlled. That is, the operation mode of the liquid crystal panel 10 according to the present embodiment is a fringe field switching (FFS) mode.

The touch wiring 31 will be described with reference to FIGS. 6 and 7. As illustrated in FIG. 7, the touch wiring 31 is disposed to overlap the bent portion 24A3 of the pixel electrode body 24A of the pixel electrode 24. That is, the touch wiring 31 is disposed to cross the central portion of the pixel electrode body 24A in the short direction of the pixel electrode body. The plurality of touch wirings 31 and the plurality of source wirings 27 are arranged alternately and repeatedly in the X-axis direction at intervals of approximately half the longitudinal dimension of the pixel electrodes 24 between the touch wirings 31 and the source wirings 27. Specifically, the first pixel electrode portion 24A1 and the TFT 23 are interposed between the touch wiring 31 and the source wiring 27 located on the left side in FIG. 7 with respect to the touch wiring 31. The second pixel electrode portion 24A2 is interposed between the touch wiring 31 and the source wiring 27 located on the right side in FIG. 7 with respect to the touch wiring 31.

As illustrated in FIG. 7, the touch wiring 31 includes a touch wiring body (third wiring body) 31A extending in the Y-axis direction and a first branch portion 31B branched from the touch wiring body 31A. The touch wiring body 31A has a relationship of intersecting the pixel electrode body 24A and the gate wiring 26. The first branch portion 31B is branched to extend from a portion of the touch wiring body 31A, which intersects the prescribed gate wiring 26 along this gate wiring 26. The plurality of first branch portions 31B are provided at positions at intervals in the Y-axis direction in one touch wiring body 31A. As illustrated in FIG. 6, the first branch portion 31B is disposed to overlap a portion of the touch electrode 30 (common electrode 25) and a portion of the gate wiring 26. Specifically, the first branch portion 31B is disposed to overlap an upper layer side of the upper-layer wiring portion 26B constituting the gate wiring 26 via the first interlayer insulating film 35 and the flattening film 36, and is disposed to overlap a lower layer side of the touch electrode 30 via the second interlayer insulating film 37. A third wiring contact hole (second contact hole) CH5 is provided in the second interlayer insulating film 37 interposed between the first branch portion 31B and the touch electrode 30. The third wiring contact hole CH5 is disposed at a position at which the second interlayer insulating film 37 overlaps both the touch electrode 30 and the first branch portion 31B of the touch wiring 31 in the second interlayer insulating film 37. The touch electrode 30 is connected to the first branch portion 31B through the third wiring contact hole CH5.

In this manner, the touch electrode 30 is brought to a potential based on a signal supplied by the touch wiring 31 connected through the third wiring contact hole CH5. Here, an electric field generated between the common electrode 25 and the bent portion 24A3 of the pixel electrode 24 having a longitudinal shape is likely to be disturbed in the vicinity of the bent portion 24A3. Thus, a defect is likely to occur in display due to the disturbance. In this respect, the touch wiring 31 is disposed to overlap the bent portion 24A3 via the second interlayer insulating film 37 and the third interlayer insulating film 38. Thus, even in a case where a defect has occurred in display near the bent portion 24A3, it is possible to block light by the touch wiring 31. As a result, it is possible to keep the display quality good. In addition, the first branch portion 31B branched from the touch wiring body 31A is disposed to overlap a portion of the gate wiring 26. Thus, as compared with the case where the first branch portion and the third wiring contact hole are overlapped with a portion of the pixel electrode 24, it is possible to block light by the gate wiring 26 even in a case where a defect has occurred in display due to the third wiring contact hole CH5. As a result, it is possible to keep the display quality good.

The common electrode 25 (touch electrode 30) will be described with reference to FIGS. 8 and 9. FIG. 8 illustrates the pixel arrangement in the same range as that of FIG. 2. FIG. 8 illustrates the first transparent electrode film provided on the array substrate 21 in a mesh shape. FIG. 8 illustrates four touch electrodes 30. FIG. 9 is a cross-sectional view of the array substrate 21 in the vicinity of the touch wiring 31. As illustrated in FIGS. 8 and 9, the first partition opening portion 25A1 included in the partition opening portion 25A provided in the common electrode 25 is disposed to overlap a specific touch wiring 31 (touch wiring 31 having a disposition of being interposed between the adjacent touch electrodes 30 in the X-axis direction) among the plurality of touch wirings 31. The second partition opening portion 25A2 included in the partition opening portion 25A is disposed to overlap a specific gate wiring 26 (gate wiring 26 having a disposition of being interposed between the adjacent touch electrodes 30 in the Y-axis direction) among the plurality of gate wirings 26. The first partition opening portion 25A1 illustrated in FIG. 8 among a plurality of first partition opening portions 25A1 provided in the common electrode 25 is set to a "first opening portion 40" below. The touch electrode 30 located on the left side in FIG. 8 with respect to the first opening portion 40 is set to a "first electrode portion 41". The touch electrode 30 located on the right side in FIG. 8 with respect to the first opening portion 40 is set to a "second electrode portion 42".

As illustrated in FIGS. 8 and 9, the first opening portion 40 extends in the Y-axis direction which is an extension direction of the source wiring 27 and the touch wiring 31, and divides the common electrode 25 into the first electrode portion 41 and the second electrode portion 42. The first opening portion 40 is disposed to overlap the bent portion 24A3 of the pixel electrode body 24A of the pixel electrode 24, and has a relationship of non-overlapping with the source wiring 27. As described above, the first opening portion 40 is disposed not to overlap all the source wirings 27. Thus, as compared with a case where the first opening portion is disposed to overlap a specific source wiring 27 among the plurality of source wirings 27 and not to overlap the remaining source wirings 27, it is possible to equalize the parasitic capacitance generated between the plurality of source wirings 27 and the common electrode 25. As a result, the potential of the pixel electrode 24 charged based on the image signal transmitted by the source wiring 27 is stabilized. The first opening portion 40 is disposed to overlap the touch wiring 31. Here, an electric field generated between the common electrode 25 and the overlapping pixel electrode 24 is likely to be disturbed near the first opening portion 40 of the common electrode 25. Thus, a defect is likely to occur in display due to the disturbance. In this respect, the first opening portion 40 is disposed to overlap the touch wiring 31, and a common potential signal is supplied to the touch wiring 31 during the display period, so that it is possible to suppress the disturbance of the electric field. Even in a case where a defect has occurred in the display near the first opening portion 40, it is possible to block light by the touch wiring 31. As a result, it is possible to keep the display quality good.

As illustrated in FIG. 8, a TFT opening 25B that overlaps a portion of the TFT 23 (near the first pixel contact hole CH1 and the second pixel contact hole CH2) is formed in the common electrode 25. A plurality of TFT openings 25B are formed at positions where the common electrode 25 overlaps the plurality of respective TFTs 23 in the common electrode 25. The plurality of TFT openings 25B are arranged in a matrix shape at intervals in the X-axis direction and the Y-axis direction in the common electrode 25. A short circuit between the common electrode 25 and the pixel electrode 24 is prevented by the TFT opening 25B. A wiring opening 25C that overlaps the touch wiring 31 disposed not to overlap the first opening portion 40 among the plurality of touch wirings 31 is formed in the common electrode 25. Similar to the first opening portion 40, the wiring opening 25C has an elongated (vertically long) slit shape that extends in the extension direction (Y-axis direction) of the source wiring 27 and the touch wiring 31. The wiring opening 25C crosses the bent portion 24A3 of the pixel electrode body 24A of the pixel electrode 24 and the gate wiring 26, similarly to the first opening portion 40. The plurality of wiring openings 25C are disposed at intervals in the Y-axis direction in one touch electrode 30, and the touch electrode 30 is not divided into left and right portions. A portion of the touch electrode 30 remaining between the wiring openings 25C adjacent to each other in the Y-axis direction may be disposed to overlap a specific gate wiring 26, for example.

As illustrated in FIG. 7, the touch wiring 31 includes a shielding portion 31C branched from the touch wiring body 31A. The shielding portion 31C is branched to extend from a portion of the touch wiring body 31A, which intersects the gate wiring 26 overlapping the second partition opening portion 25A2, along this gate wiring 26. A pair of shielding portions 31C extends from the touch wiring body 31A to each of both left and right sides illustrated in FIG. 7, and has a shallow inverted V shape formed following the side edge on the longitudinal side of the pixel electrode 24 as a whole. The shielding portion 31C is disposed to overlap the second partition opening portion 25A2 and overlap a portion of the gate wiring 26. In this manner, it is possible to suitably block an electric field generated between the gate wiring 26 and an edge portion of the touch electrode 30, which faces the second partition opening portion 25A2, and an electric field generated between the gate wiring 26 and the pixel electrode 24 via the second partition opening portion 25A2, by the shielding portion 31C. As a result, deterioration in display quality due to the electric field described above is suppressed. Further, since the shielding portion 31C overlaps the gate wiring 26, it is possible to avoid an occurrence of a decrease in an aperture ratio (the amount of transmitted light) due to the shielding portion 31C.

As illustrated in FIG. 2, the light shielding portion 29 provided on the counter substrate 20 is provided to overlap each of the TFT 23, the gate wiring 26, the source wiring 27, and the touch wiring 31. That is, the light shielding portion 29 overlaps the bent portion 24A3 of the pixel electrode body 24A of the pixel electrode 24 and overlaps the partition opening portion 25A of the common electrode 25. In this manner, in the vicinity of the partition opening portion 25A (including the first opening portion 40) of the common electrode 25 and the vicinity of the bent portion 24A3 of the pixel electrode body 24A of the pixel electrode 24, even in a case where disturbance has partially occurred in an electric field generated between the pixel electrode 24 and the common electrode 25, a display failure caused by the disturbance is unlikely to be visually recognized by the light shielding portion 29. The pixel opening portion 29A of the light shielding portion 29 is disposed to selectively overlap the first pixel electrode portion 24A1 and the second pixel electrode portion 24A2 of the pixel electrode body 24A of the pixel electrode 24.

As described above, the array substrate (wiring substrate) 21 in the present embodiment includes the gate wiring (first wiring) 26 and the source wiring (second wiring) 27 that intersects the gate wiring 26. The gate wiring 26 includes the lower-layer wiring portion 26A formed of the first metal film (first conductive film) and the upper-layer wiring portion 26B formed of the second metal film (second conductive film) disposed on the upper layer side of the first metal film via the gate insulating film (first insulating film) 34. The first wiring contact hole (first contact hole) CH3 that connects the lower-layer wiring portion 26A and the upper-layer wiring portion 26B is provided at the position where the gate insulating film 34 overlaps both the lower-layer wiring portion 26A and the upper-layer wiring portion 26B in the gate insulating film 34. The source wiring 27 is formed of the third metal film (third conductive film) disposed on the upper layer side of the second metal film via the first interlayer insulating film 35 and the flattening film 36 that are the second insulating films. The first interlayer insulating film 35 and the flattening film 36 that are the second insulating films have a larger film thickness than a film thickness of the gate insulating film 34.

The gate wiring 26 according to the present embodiment has a stacked structure of the lower-layer wiring portion 26A and the upper-layer wiring portion 26B that are connected to each other through the first wiring contact hole CH3 of the gate insulating film 34. Thus, the wiring resistance is reduced as compared with the case where the gate wiring 26 has a single-layer structure. As a result, bluntness in the signal transmitted by the gate wiring 26 is unlikely to occur. The gate wiring 26 and the source wiring 27 that intersect each other are kept in an insulated state by the first interlayer insulating film 35 and the flattening film 36 that are the second insulating films interposed between the gate wiring 26 and the source wiring 27. Since the film thicknesses of the first interlayer insulating film 35 and the flattening film 36 that are the second insulating films are larger than the film thickness of the gate insulating film 34, the parasitic capacitance that may be generated between the gate wiring 26 and the source wiring 27 is reduced as compared with the case where the film thickness of the second insulating film is set to be equal to the film thickness of the gate insulating film 34. As a result, a load on the gate wiring 26 is reduced, and bluntness in the signal transmitted by the gate wiring 26 is unlikely to occur.

In addition, the array substrate further includes the pixel electrode 24, the TFT (switching element) 23 connected to the gate wiring 26, the source wiring 27, and the pixel electrode 24, and the common electrode 25 disposed to overlap the pixel electrode 24. The common electrode 25 includes the first opening portion 40 extending along the source wiring 27, and the first electrode portion 41 and the second electrode portion 42 divided by the first opening portion 40. The first opening portion 40 is disposed to overlap a portion of the pixel electrode 24. When the TFT 23 is driven based on the signal transmitted by the gate wiring 26, the pixel electrode 24 is charged to a potential based on the signal transmitted by the source wiring 27. The first opening portion 40 of the common electrode 25 is disposed to overlap a portion of the pixel electrode 24, and has a relationship of non-overlapping with the source wiring 27. In this manner, in a case where the plurality of source wirings 27 are provided, it is possible to equalize the parasitic capacitance that is generated between the plurality of source wirings 27 and the common electrode 25. As a result, the potential of the pixel electrode 24 charged based on the signal transmitted by the source wiring 27 is stabilized.

The array substrate further includes the touch wiring (third wiring) 31 that is formed of a portion of the third metal film different from the source wiring 27 and intersects the gate wiring 26. The pixel electrode 24 has a longitudinal shape along the gate wiring 26 and includes the bent portion 24A3 in the middle in the longitudinal direction. The common electrode 25 is formed of the first transparent electrode film that is one of the first transparent electrode film disposed on the upper layer side of the third metal film via the second interlayer insulating film (third insulating film) 37 and the second transparent electrode film disposed on the upper layer side of the first transparent electrode film via the third interlayer insulating film (fourth insulating film) 38. The pixel electrode 24 is formed of the second transparent electrode film that is the other of the first transparent electrode film and the second transparent electrode film. The touch wiring 31 is disposed to overlap the bent portion 24A3. The third wiring contact hole (second contact hole) CH5 that connects the common electrode 25 and the touch wiring 31 is provided at the position where at least the second interlayer insulating film 37 overlaps both the common electrode 25 and the touch wiring 31 at least in the second interlayer insulating film 37. In this manner, the common electrode 25 is brought to a potential based on a signal supplied by the touch wiring 31 connected through the third wiring contact hole CH5. Here, an electric field generated between the common electrode 25 and the bent portion 24A3 of the pixel electrode 24 having a longitudinal shape is likely to be disturbed in the vicinity of the bent portion 24A3. Thus, a defect is likely to occur in display due to the disturbance. In this respect, the touch wiring 31 is disposed to overlap the bent portion 24A3 via at least the second interlayer insulating film 37. Thus, even in a case where a defect has occurred in display near the bent portion 24A3, it is possible to block light by the touch wiring 31. As a result, it is possible to keep the display quality good.

The touch wiring 31 includes the touch wiring body (third wiring body) 31A intersecting the gate wiring 26, and the first branch portion 31B that is branched from the touch wiring body 31A and is disposed to overlap a portion of the common electrode 25 and a portion of the gate wiring 26. The third wiring contact hole CH5 is disposed to overlap the first branch portion 31B. Since the first branch portion 31B is connected to the common electrode 25 through the third wiring contact hole CH5, the signal transmitted by the touch wiring 31 is supplied to the common electrode 25. The first branch portion 31B branched from the touch wiring body 31A is disposed to overlap the portion of the common electrode 25 and the portion of the gate wiring 26. Thus, as compared with the case where the first branch portion and the third wiring contact hole are overlapped with a portion of the pixel electrode 24, it is possible to block light by the gate wiring 26 even in a case where a defect has occurred in display due to the third wiring contact hole CH5. As a result, it is possible to keep the display quality good.

The common electrode 25 is provided so that the first opening portion 40 overlaps the touch wiring 31. An electric field generated between the common electrode 25 and the overlapping pixel electrode 24 is likely to be disturbed near the first opening portion 40 of the common electrode 25. Thus, a defect is likely to occur in display due to the disturbance. In this respect, the first opening portion 40 is disposed to overlap the touch wiring 31, and a common potential signal is supplied to the touch wiring 31 during the display period, so that it is possible to suppress the disturbance of the electric field. Even in a case where a defect has occurred in the display near the first opening portion 40, it is possible to block light by the touch wiring 31. As a result, it is possible to keep the display quality good.

The gate insulating film 34 is formed of an inorganic insulating material, and the flattening film 36 that is the second insulating film is formed of an organic insulating material. The film thickness of the flattening film 36 that is the second insulating film formed of an organic insulating material is much larger than the film thickness of the gate insulating film 34 formed of an inorganic insulating material. For the flattening film 36, an organic insulating material having a relative dielectric constant (for example, relative dielectric constant 3 to 4) smaller than the relative dielectric constant of the inorganic insulating material used for the gate insulating film 34 (for example, relative dielectric constant 4 to 8) can be used. As a result, the parasitic capacitance that may be generated between the gate wiring 26 and the source wiring 27 is further reduced, and thus the signal transmitted by the gate wiring 26 is less likely to be blunt.

The liquid crystal panel (display device) 10 according to the present embodiment includes the above-described array substrate 21 and the counter substrate 20 disposed to face the array substrate 21. According to the liquid crystal panel 10 having such a configuration, the signal transmitted by the gate wiring 26 is unlikely to be blunt, and thus an excellent display quality can be obtained.

Second Embodiment

A second embodiment will be described with reference to FIG. 10 or 11. The second embodiment illustrates a case where the arrangement of a first wiring contact hole CH103 is changed. Repetitive descriptions of structure, action, and effect similar to those of the first embodiment described above will be omitted.

Figure 10:
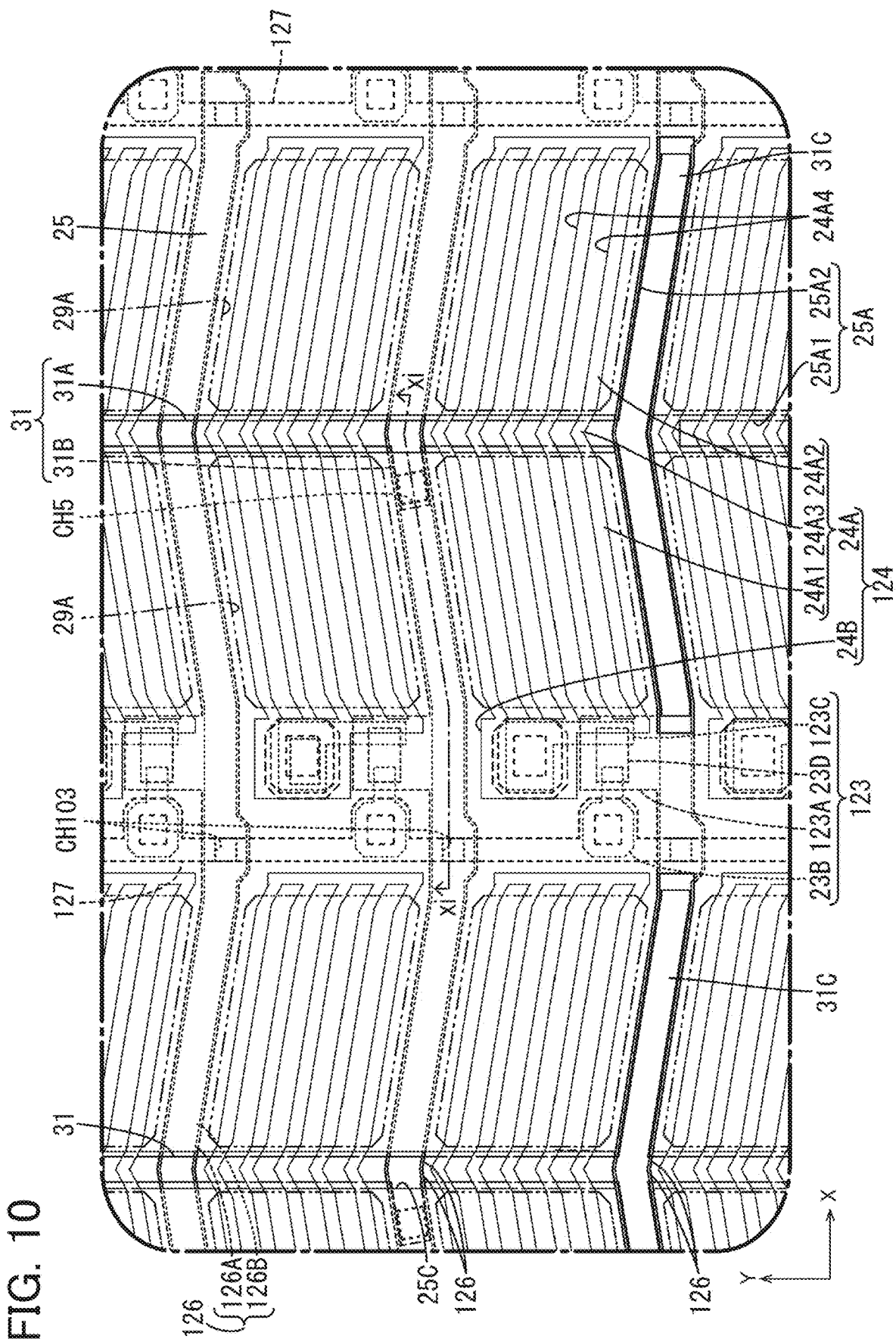
FIG. 10 is a plan view illustrating a pixel arrangement in a display region of a liquid crystal panel according to a second embodiment.
Figure 11:
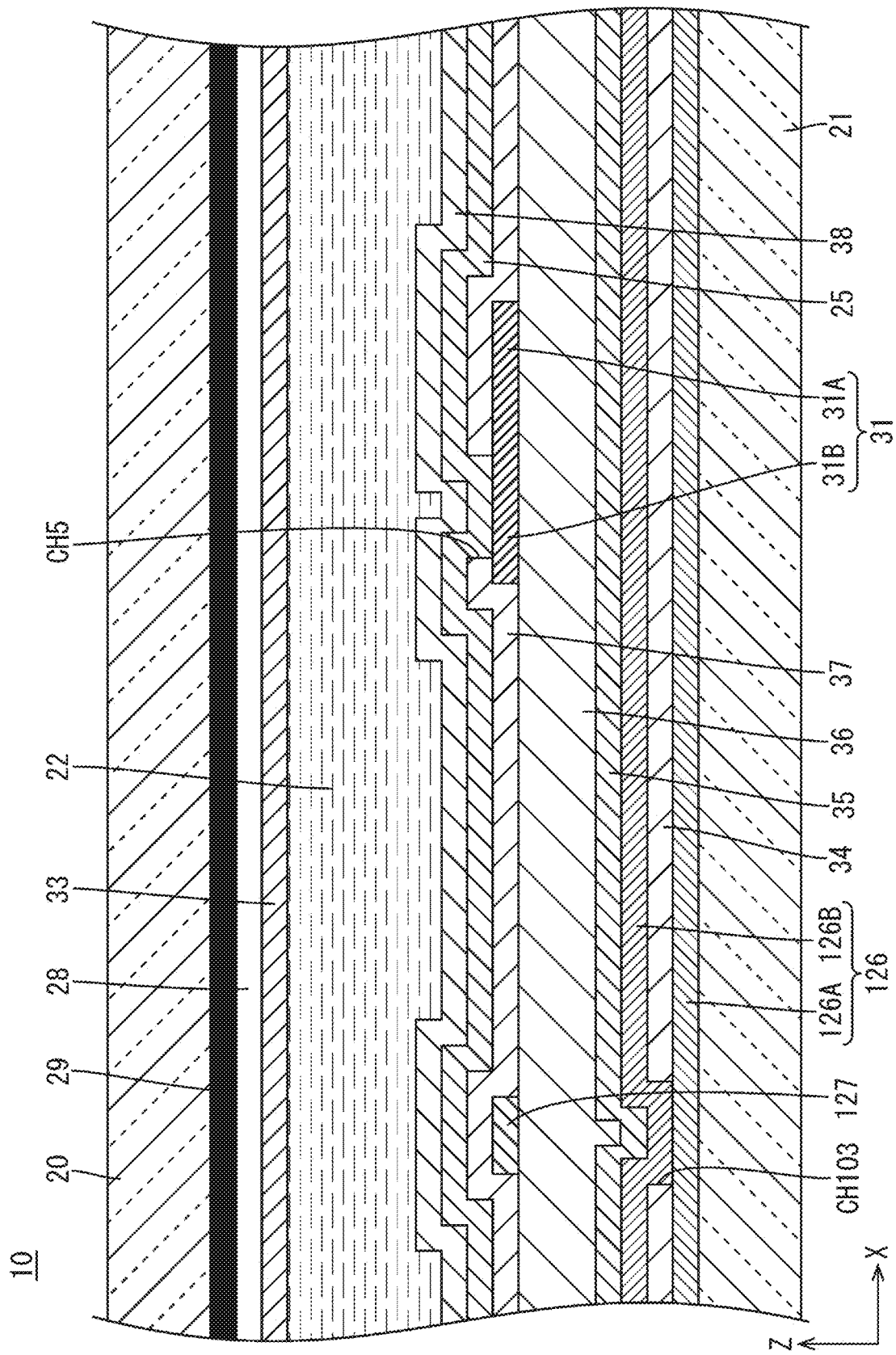
FIG. 11 is a cross-sectional view of the liquid crystal panel according to the second embodiment taken along the line xi-xi in FIG. 10.

As illustrated in FIGS. 10 and 11, the first wiring contact hole CH103 according to the present embodiment is disposed to overlap a source wiring 127. FIG. 10 illustrates the pixel arrangement in the same range as that of FIG. 2. FIG. 11 illustrates a cross-sectional configuration at the same position as that in FIG. 6. Specifically, the first wiring contact hole CH103 only needs to overlap a portion of a gate wiring 126, and has a predetermined degree of freedom in arrangement within a range of forming the gate wiring 126. In the present embodiment, the first wiring contact hole CH103 is disposed at a position that overlaps a source wiring 127 among the source wiring 127, a TFT 123, and a pixel electrode 124 arranged in the X-axis direction that is the extension direction of the gate wiring 126. In this manner, as compared with the case where the first wiring contact hole CH103 is disposed to be adjacent to the TFT 123 and not to overlap the source wiring 127 as in the first embodiment described above, a distance between the first wiring contact hole CH103 and the TFT 123 is increases. Here, the width of the lower-layer wiring portion 26A and the upper-layer wiring portion 26B may be increased in order to increase the connection area between the lower-layer wiring portion 26A and the upper-layer wiring portion 26B in a portion on which the first wiring contact hole CH3 is disposed. For example, in FIG. 2, the lower-layer wiring portion 26A and the upper-layer wiring portion 26B are widened to protrude to the lower side in FIG. 2 at the portion on which the first wiring contact hole CH3 is disposed. In a case where a distance between this widened portion and a portion of the TFT 23 (for example, the drain electrode 23C of the TFT 23) is small, a short circuit is likely to occur. In the present embodiment, a situation in which a connection portion between the lower-layer wiring portion 126A and the upper-layer wiring portion 126B connected to each other through the first wiring contact hole CH103 is short-circuited with the TFT 123 is unlikely to occur. The planar shape of a drain electrode 123C of the TFT 123 in the present embodiment is different from that of the drain electrode 23C in the first embodiment described above. Specifically, the entire planar shape of the drain electrode 23C in the first embodiment described above has a gate shape, and the drain electrode 123C in the present embodiment has an L-shaped planar shape. In the case of the planar shape of the drain electrode 123C as in the present embodiment, as compared with the drain electrode 23C in the first embodiment described above, there is a concern that the parasitic capacitance between the gate electrode 123A and the drain electrode 123C increases. On the other hand, it is possible to increase the aperture ratio. Further, in the present embodiment, an example of a portion in which the spacer is not disposed in the display region AA will be described. The spacer may be disposed similarly to the first embodiment described above.

As described above, according to the present embodiment, the pixel electrode 124, the gate wiring 126, the source wiring 127, and the TFT 123 connected to the pixel electrode 124 are provided. The source wiring 127, the TFT 123, and the pixel electrode 124 are disposed to be arranged along the gate wiring 126. The first wiring contact hole CH103 is disposed to overlap the source wiring 127. When the TFT 123 is driven based on the signal transmitted by the gate wiring 126, the pixel electrode 124 is charged to a potential based on the signal transmitted by the source wiring 127. Since the first wiring contact hole CH103 is disposed at the position that overlaps the source wiring 127 among the source wiring 127, the TFT 123, and the pixel electrode 124 arranged along the gate wiring 126, the distance between the first wiring contact hole CH103 and the TFT 123 increases as compared with the case where the first wiring contact hole is disposed not to overlap the source wiring 127 and to be adjacent to the TFT 123. As a result, a situation in which the connection portion between the lower-layer wiring portion 126A and the upper-layer wiring portion 126B connected to each other through the first wiring contact hole CH103 is short-circuited to the TFT 123 is unlikely to occur.

Third Embodiment

A third embodiment will be described with reference to FIGS. 12 to 16. The third embodiment shows a case where a connection wiring 43 is added to the second embodiment described above. Repetitive descriptions of structure, action, and effect similar to those of the second embodiment described above will be omitted.

Figure 12:
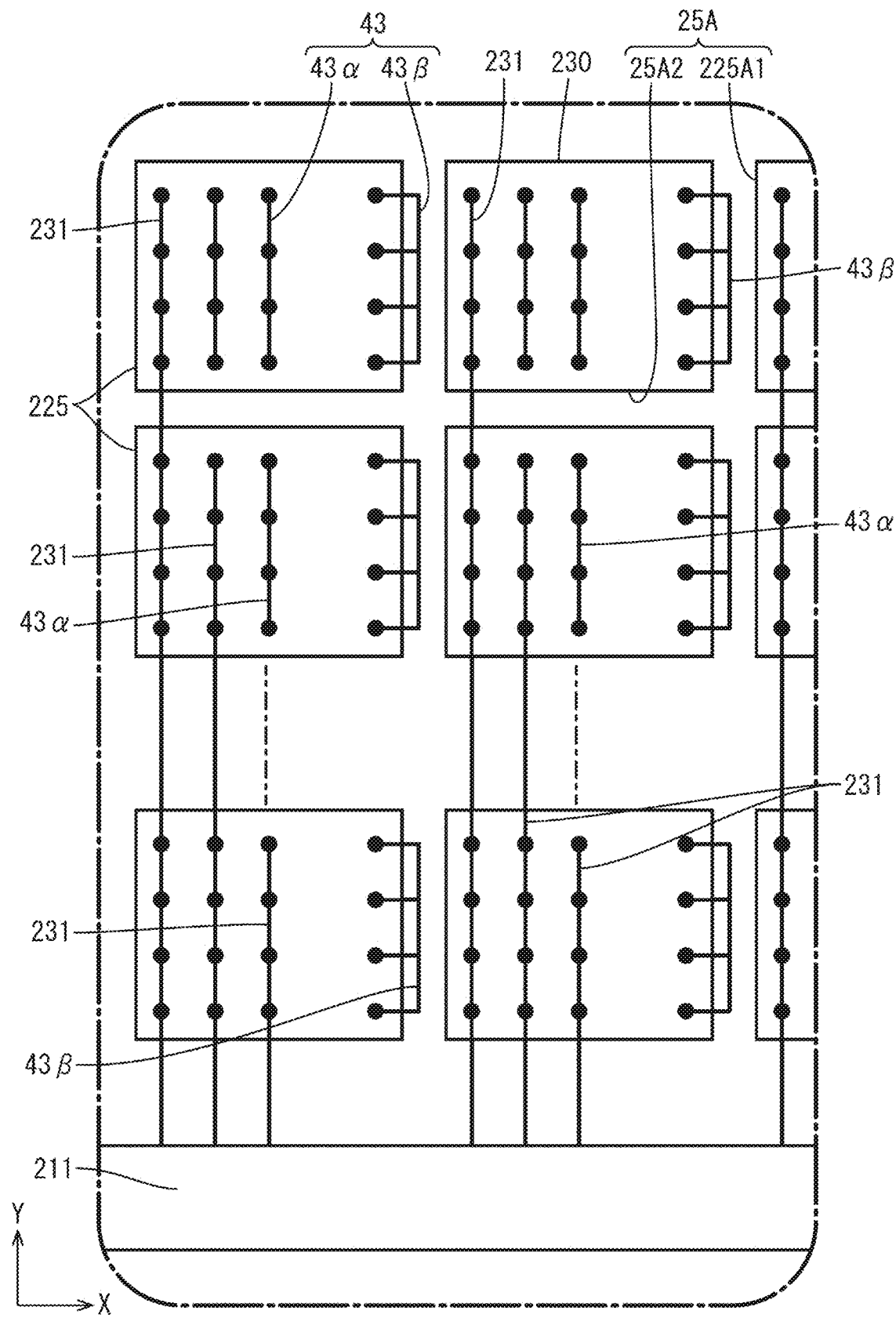
FIG. 12 is a plan view schematically illustrating a relationship between a driver, a touch electrode, a touch wiring, and a connection wiring according to a third embodiment.

As illustrated in FIG. 12, a connection wiring (fourth wiring) 43 connected to a touch electrode 230 is provided on an array substrate 221 according to the present embodiment. FIG. 12 schematically illustrates a driver 211, the touch electrode 230, a touch wiring 231, and the connection wiring 43. Similarly to the touch wiring 231, the connection wiring 43 extends in the Y-axis direction, and the formation range in the Y-axis direction is limited to the same formation range of the touch electrode 230 as the connection target. The connection wiring 43 includes a first connection wiring 43α disposed to overlap the touch electrode 230 as the connection target and a second connection wiring 43β disposed to overlap a first partition opening portion 225A1. All of the connection wirings 43 are connected to the touch electrode 230 as the connection target at a plurality of places. In FIG. 12, connection portions of the connection wirings 43 to the touch electrode 230 (third wiring contact hole CH6 and fourth wiring contact hole CH7 which will be described later) are indicated by black circles. With such a connection wiring 43, the resistance distribution of the touch electrode 230 is reduced. The touch wiring 231 in the present embodiment is not disposed on an opposite side of the driver 211 side (lower side in FIG. 12) rather than the touch electrode 230 as the connection target (upper side in FIG. 12). The first connection wiring 43α that overlaps the touch electrode 230 is disposed at an interval on the side of the touch wiring 231 opposite to the driver 211 side in the Y-axis direction. That is, the first connection wiring 43α is located in the same row as the touch wiring 231. The first connection wiring 43α is disposed by using a space in which the touch wiring 231 is not disposed. The number of first connection wirings 43α disposed to overlap the touch electrode 230 far from the driver 211 is more than the number of first connection wirings 43α disposed to overlap the touch electrode 230 close to the driver 211.

Figure 13:
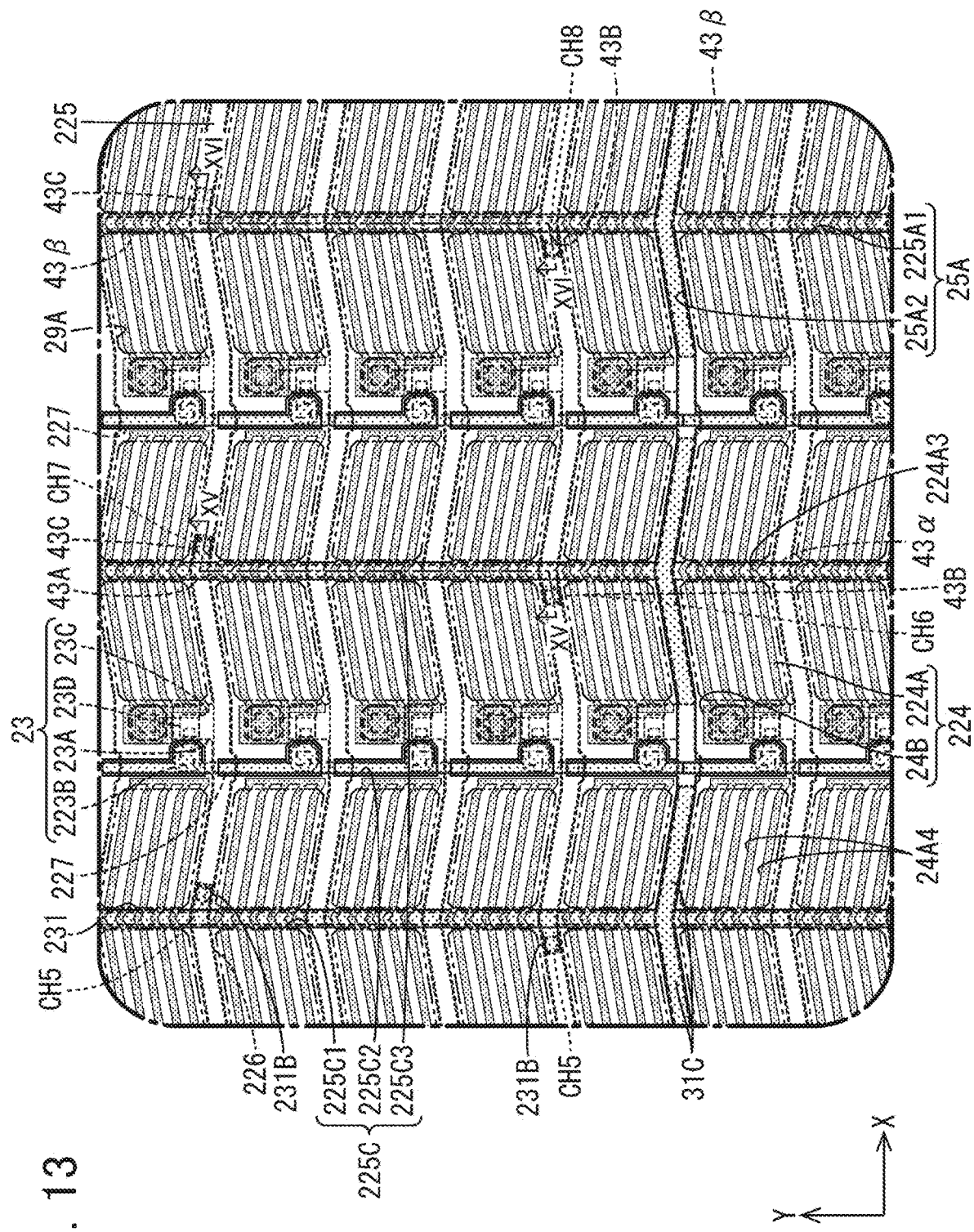
FIG. 13 is a plan view illustrating a pixel arrangement in a display region of a liquid crystal panel according to the third embodiment and is a plan view illustrating a third metal film and a second transparent electrode film in different mesh shapes.

As illustrated in FIG. 13, the connection wiring 43 is formed of the third metal film, and is disposed to intersect a pixel electrode 224 and a gate wiring 226, similarly to the touch wiring 231. FIG. 13 illustrates three rows of the pixel arrangement. FIG. 13 illustrates the third metal film and the second transparent electrode film provided on the array substrate 221 in different mesh shapes, respectively. Specifically, the connection wiring 43 includes a connection wiring body (fourth wiring body) 43A extending in the Y-axis direction, a second branch portion 43B that is branched from the connection wiring body 43A and extends to the left side in FIG. 13, and a third branch portion 43C that is branched from the connection wiring body 43A and extends to the right side in FIG. 13. The connection wiring body 43A is disposed to cross a bent portion 224A3 of a pixel electrode body 224A of the pixel electrode 224. The second branch portion 43B is branched to extend from a portion of the connection wiring body 43A that intersects the prescribed gate wiring 226 along this gate wiring 226. The second branch portion 43B is disposed to overlap a portion of the touch electrode 230 (common electrode 225) and a portion of the gate wiring 226. The third branch portion 43C is branched to extend along the gate wiring 226 from a portion of the connection wiring body 43A, which intersects this gate wiring 226 different from the gate wiring 226 overlapping the second branch portion 43B. The third branch portion 43C is disposed to overlap a portion of the touch electrode 230 (common electrode 225) and a portion of the gate wiring 226. The touch wiring 231 according to the present embodiment includes two first branch portions 231B extending from the left and right in FIG. 13, respectively, similar to the second branch portion 43B and the third branch portion 43C provided in the connection wiring 43.

Figure 14:
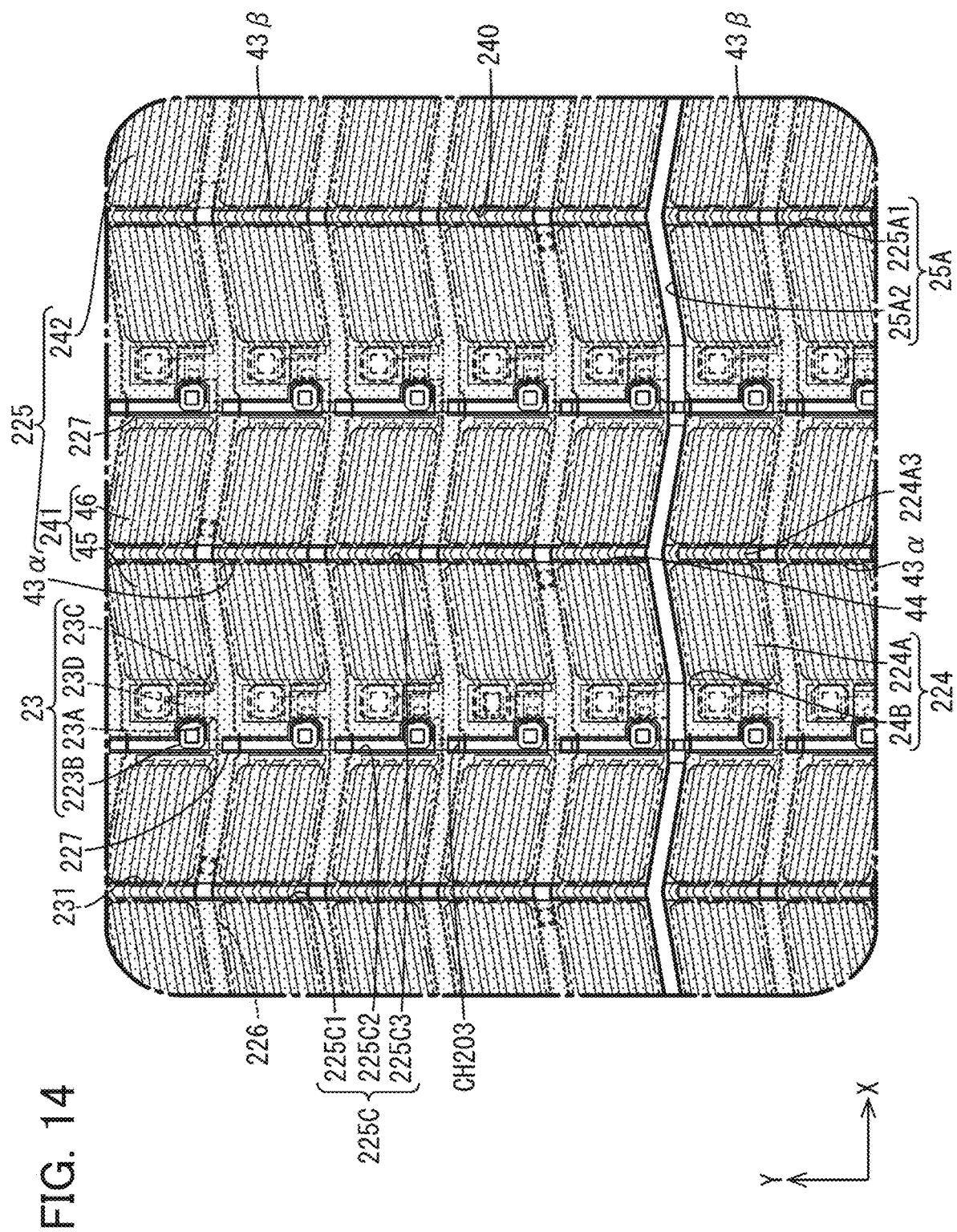
FIG. 14 is a plan view illustrating a pixel arrangement in a display region of the liquid crystal panel according to the third embodiment and is a plan view illustrating a first transparent electrode film in a mesh shape.

As illustrated in FIG. 14, a wiring opening 225C provided in the common electrode 225 is disposed at a position that overlaps each of the source wiring 227 and the first connection wiring 43α, in addition to the position overlapping the touch wiring 231. FIG. 14 illustrates the pixel arrangement in the same range as that of FIG. 13. FIG. 14 illustrates the first transparent electrode film provided on the array substrate 221 in a mesh shape. The wiring opening 225C includes a first wiring opening 225C1 that overlaps the touch wiring 231, a second wiring opening 225C2 that overlaps the source wiring 227, and a third wiring opening 225C3 that overlaps the first connection wiring 43α. The second wiring opening 225C2 is provided in a range from a first wiring contact hole CH203 to the source electrode 223B in the Y-axis direction. A plurality of second wiring openings 225C2 having such a formation range are disposed at intervals in the Y-axis direction, and the touch electrode 230 is not divided into left and right portions. Since the second wiring opening 225C2 is provided in the common electrode 225, the parasitic capacitance that may be generated between the source wiring 227 and the common electrode 225 is reduced. In particular, this is suitable in a case where the film thickness of a second interlayer insulating film 237 interposed between the source wiring 227 and the common electrode 225 is thin.

On the other hand, as illustrated in FIG. 14, the first wiring opening 225C1 and the third wiring opening 225C3 are both provided over the entire length of the touch electrode 230 in the Y-axis direction. Therefore, the touch electrode 230 is divided into a plurality of portions by the first wiring opening 225C1 and the third wiring opening 225C3. The first partition opening portion 225A1 illustrated in FIG. 14 among a plurality of first partition opening portions 225A1 provided in the common electrode 225 is set to a "first opening portion 240" below. The touch electrode 230 located on the left side in FIG. 14 with respect to the first opening portion 240 is set to a "first electrode portion 241" below. The touch electrode 230 located on the right side in FIG. 14 with respect to the first opening portion 240 is set to a "second electrode portion 242" below. In the present embodiment, instead of the touch wiring 231, the second connection wiring 43β is disposed to overlap in the first opening portion 240. In addition, the third wiring opening 225C3 located near the center in the X-axis direction in FIG. 14 among a plurality of wiring openings 225C provided in the common electrode 225 is set to a "second opening portion 44" that overlaps most of the first connection wiring 43α (connection wiring body 43A described later). A portion of the first electrode portion 241, which is located on the left side in FIG. 14 with respect to the second opening portion 44, is set to a "third electrode portion 45". A portion of the first electrode portion 241, which is located on the right side in FIG. 14 is set to a "fourth electrode portion 46". In the present embodiment, the second opening portion 44 that divides the third electrode portion 45 and the fourth electrode portion 46 constituting the first electrode portion 241 is provided in the common electrode 25 in addition to the first opening portion 240 that divides the first electrode portion 241 and the second electrode portion 242. Thus, a situation in which the first opening portion 240 is visually recognized is unlikely to occur as compared with the case where the second opening portion is not formed. As a result, it is possible to keep the display quality good.

Figure 15:
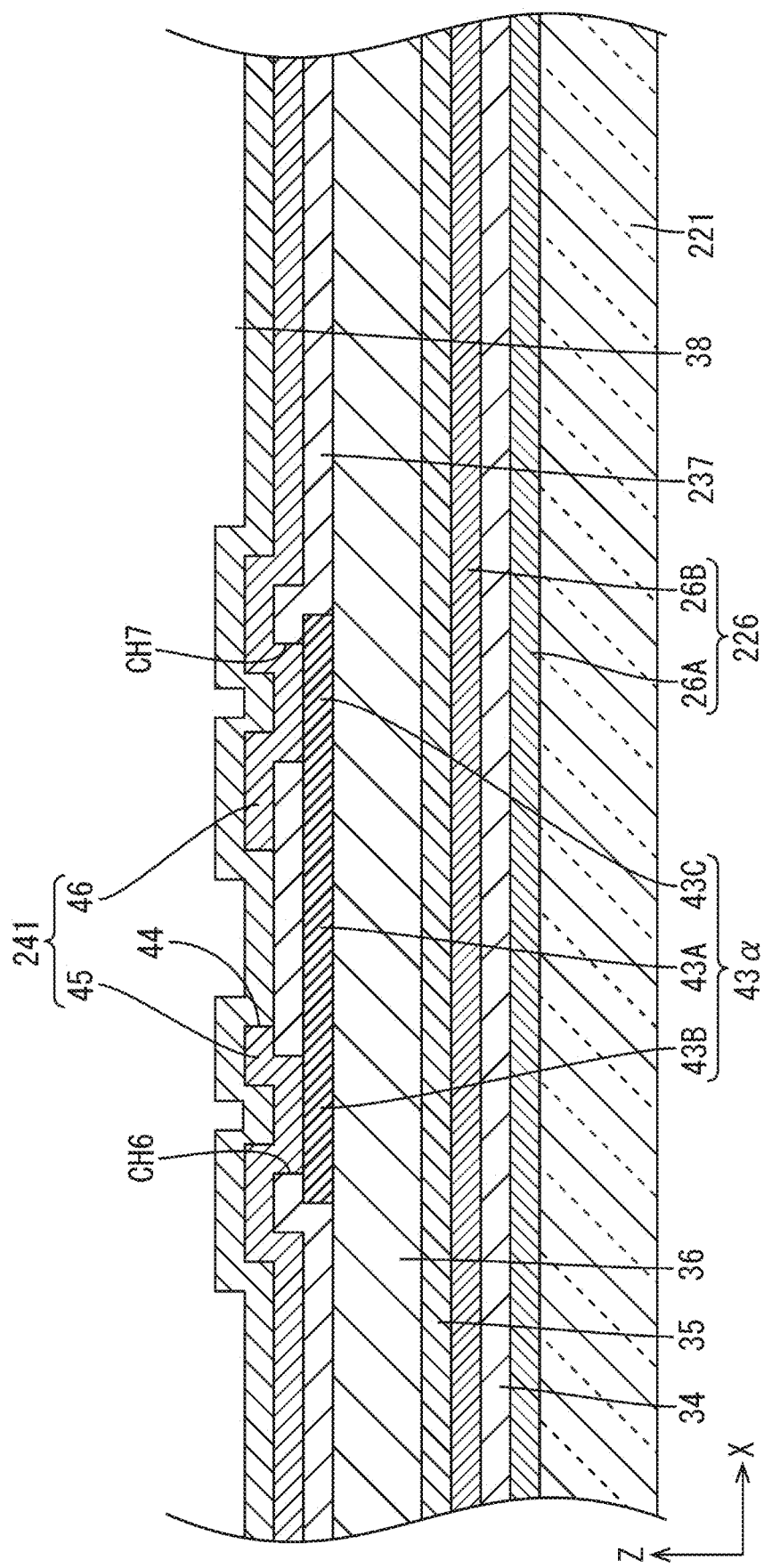
FIG. 15 is a cross-sectional view of an array substrate according to the third embodiment taken along line xv-xv of FIG. 13.

As illustrated in FIGS. 13 and 15, the connection wiring body 43A provided in the first connection wiring 43α is disposed to overlap the second opening portion 44. FIG. 15 illustrates a cross-sectional configuration related to a connection portion between the first connection wiring 43α and the touch electrode 230. The second branch portion 43B provided in the first connection wiring 43α is disposed to overlap the third electrode portion 45. The third branch portion 43C provided in the first connection wiring 43α is disposed to overlap the fourth electrode portion 46. A fourth wiring contact hole (third contact hole) CH6 is provided in the second interlayer insulating film 237 interposed between the second branch portion 43B and the third electrode portion 45. The fourth wiring contact hole CH6 is disposed at a position where the second interlayer insulating film 237 overlaps both the second branch portion 43B and the third electrode portion 45 in the second interlayer insulating film 237. The third electrode portion 45 is connected to the second branch portion 43B through the fourth wiring contact hole CH6. A fifth wiring contact hole (fourth contact hole) CH7 is provided in the second interlayer insulating film 237 interposed between the third branch portion 43C and the fourth electrode portion 46. The fifth wiring contact hole CH7 is disposed at a position where the second interlayer insulating film 237 overlaps both the third branch portion 43C and the fourth electrode portion 46 in the second interlayer insulating film 237. The fourth electrode portion 46 is connected to the third branch portion 43C through the fifth wiring contact hole CH7. As described above, the third electrode portion 45 and the fourth electrode portion 46 constituting the first electrode portion 41 are short-circuited by the connection wiring 43 connected through the fourth wiring contact hole CH6 and the fifth wiring contact hole CH7. As a result, it is possible to keep the third electrode portion 45 and the fourth electrode portion 46 at the same potential, and it is possible to reduce the resistance distribution in the first electrode portion 241. The two first branch portions 231B provided in the touch wiring 231 have the similar configuration to that of the second branch portion 43B and the third branch portion 43C described above, and are respectively connected to the touch electrode 230 as the connection target.

Figure 16:
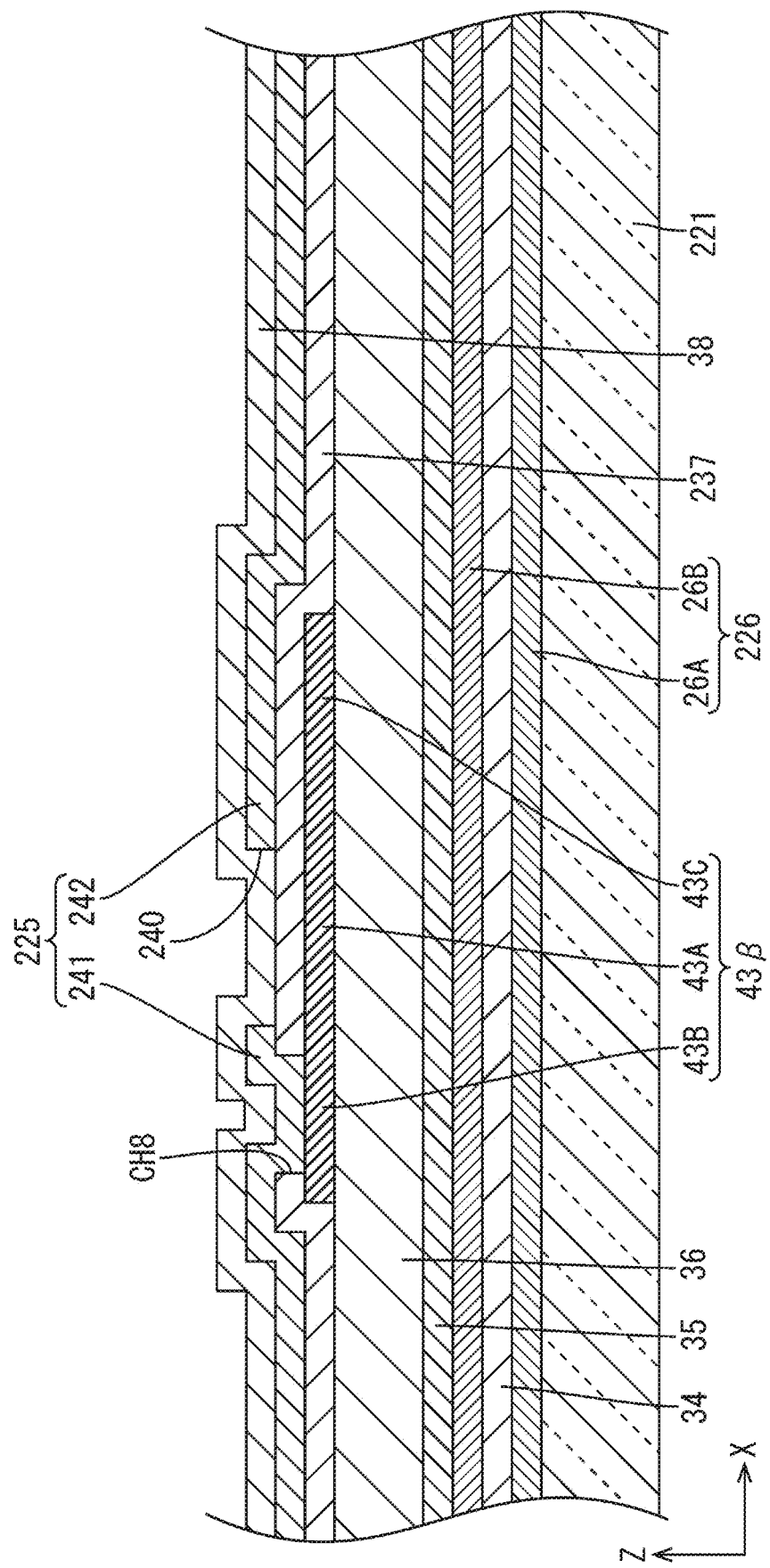
FIG. 16 is a cross-sectional view of the array substrate according to the third embodiment taken along line xvi-xvi of FIG. 13.

As illustrated in FIGS. 14 and 16, the connection wiring body 43A provided in the second connection wiring 43β is disposed to overlap the first opening portion 240. FIG. 16 illustrates a cross-sectional configuration related to a connection portion between the second connection wiring 43β and the touch electrode 230. The second branch portion 43B provided in the second connection wiring 43β is disposed to overlap the first electrode portion 241. The third branch portion 43C provided in the second connection wiring 43β is disposed to overlap the second electrode portion 242. A sixth wiring contact hole CH8 is provided in the second interlayer insulating film 237 interposed between the second branch portion 43B and the first electrode portion 241. The sixth wiring contact hole CH8 is disposed at a position where the second interlayer insulating film 237 overlaps both the second branch portion 43B and the first electrode portion 241 in the second interlayer insulating film 237. The first electrode portion 241 is connected to the second branch portion 43B through the sixth wiring contact hole CH8. With the second connection wiring 43β, it is possible to reduce the resistance distribution in the first electrode portion 241. On the other hand, no contact hole is formed at a position where the second interlayer insulating film 237 overlaps both the third branch portion 43C and the second electrode portion 242 in the second interlayer insulating film 237. As a result, an occurrence of a short circuit between the first electrode portion 241 and the second electrode portion 242 constituting different touch electrodes 230 is prevented.

As described above, according to the present embodiment, the connection wiring (fourth wiring) 43 that is formed of a portion of the third metal film different from the source wiring 227 and the touch wiring 231 and intersects the gate wiring 226 is provided. The common electrode 225 includes the second opening portion 44 that extends along the connection wiring 43 and divides the first electrode portion 241 into the third electrode portion 45 and the fourth electrode portion 46. The connection wiring 43 includes the connection wiring body (fourth wiring body) 43A that is disposed to intersect the gate wiring 226 and overlap the second opening portion 44, the second branch portion 43B that is branched from the connection wiring body 43A and is disposed to overlap the third electrode portion 45, and the third branch portion 43C that is branched from the connection wiring body 43A and is disposed to overlap the fourth electrode portion 46. In at least the second interlayer insulating film 237, the fourth wiring contact hole (third contact hole) CH6 that connects the third electrode portion 45 and the second branch portion 43B is provided at the position where at least the second interlayer insulating film 237 overlaps both the third electrode portion 45 and the second branch portion 43B, and the fifth wiring contact hole (fourth contact hole) CH7 that connects the fourth electrode portion 46 and the third branch portion 43C is provided at the position where at least the second interlayer insulating film 237 overlaps both the fourth electrode portion 46 and the third branch portion 43C. The third electrode portion 45 and the fourth electrode portion 46 constituting the first electrode portion 41 are short-circuited by the connection wiring 43 connected through the fourth wiring contact hole CH6 and the fifth wiring contact hole CH7. As a result, it is possible to keep the third electrode portion 45 and the fourth electrode portion 46 at the same potential, and it is possible to reduce the resistance distribution. The second opening portion 44 that divides the third electrode portion 45 and the fourth electrode portion 46 constituting the first electrode portion 241 is provided in the common electrode 25 in addition to the first opening portion 240 that divides the first electrode portion 241 and the second electrode portion 242. Thus, a situation in which the first opening portion 240 is visually recognized is unlikely to occur as compared with the case where the second opening portion is not formed. As a result, it is possible to keep the display quality good.

Fourth Embodiment

A fourth embodiment will be described with reference to FIG. 17. The fourth embodiment shows a case where a configuration of a pixel electrode 324 is changed from the second embodiment described above. Repetitive descriptions of the structure, action, and effect similar to those of the second embodiment described above will be omitted.

Figure 17:
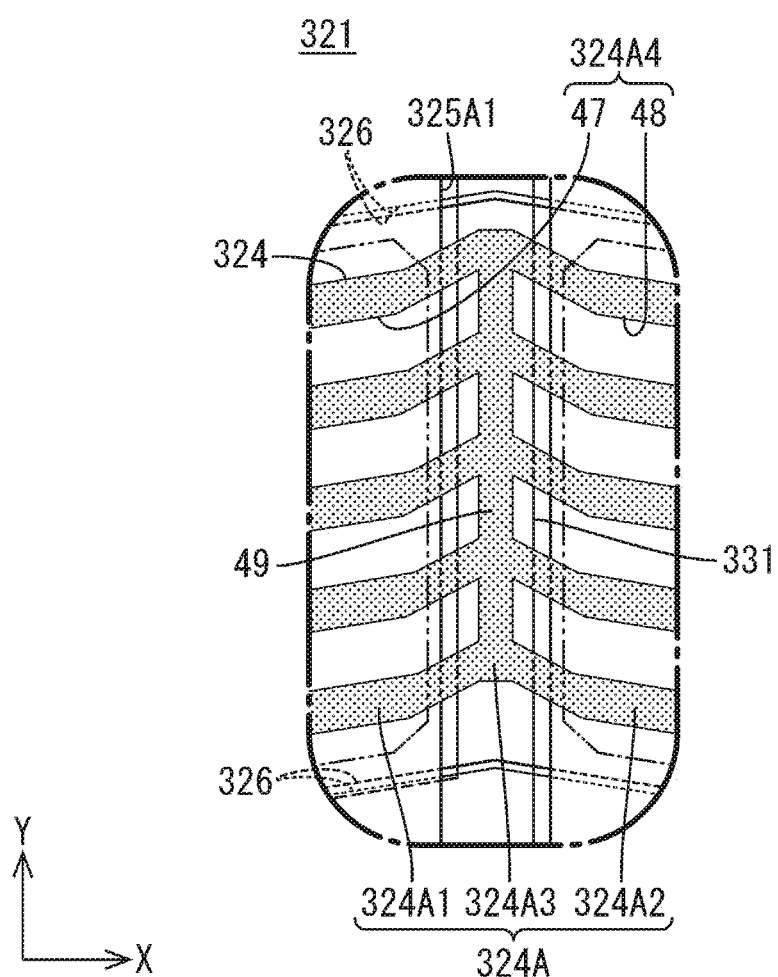
FIG. 17 is a plan view illustrating a vicinity of a bent portion of a pixel electrode in a display region of a liquid crystal panel according to a fourth embodiment and is a plan view illustrating a second transparent electrode film in a mesh shape.

As illustrated in FIG. 17, in a pixel electrode body 324A of the pixel electrode 324 according to the present embodiment, a slit 324A4 is divided into two pieces by a bent portion 324A3. FIG. 17 illustrates the vicinity of the bent portion 324A3 of the pixel electrode 324. FIG. 17 illustrates a second transparent electrode film provided on an array substrate 321 in a mesh shape. Specifically, the bent portion 324A3 constituting the pixel electrode 324 includes a third pixel electrode portion (seventh electrode portion) 49 that extends in the Y-axis direction which is the extension direction of a touch wiring 331. The third pixel electrode portion 49 has a vertically long band shape. The third pixel electrode portion 49 is continuous with both a first pixel electrode portion (fifth electrode portion) 324A1 and a second pixel electrode portion (sixth electrode portion) 324A2. The third pixel electrode portion 49 is disposed to overlap a first partition opening portion 325A1 or the wiring opening 25C (refer to FIG. 10). The slit 324A4 is divided into a third opening portion 47 provided in the first pixel electrode portion 324A1 and a fourth opening portion 48 provided in the second pixel electrode portion 324A2, by the third pixel electrode portion 49. The third opening portion 47 and the fourth opening portion 48 both extend along the gate wiring 326, but have a relationship of intersecting each other. The third pixel electrode portion 49 has a relationship of intersecting both the third opening portion 47 and the fourth opening portion 48.

According to such a configuration, when the pixel electrode 324 is charged, an electric field is generated between the common electrode 325 and portions of the first pixel electrode portion 324A1 and the second pixel electrode portion 324A2 in the vicinity of edge portions of the third opening portion 47 and the fourth opening portion 48 that extend along the gate wiring 326. Here, when the slit 24A4 is made single as in the second embodiment described above, there is a concern that the electric field generated between the pixel electrode 24 and the common electrode 25 is disturbed over a wide range centered on the bent portion 24A3 (see FIG. 10). In this respect, since the bent portion 324A3 includes the third pixel electrode portion 49 that extends along the touch wiring 331 and intersects both the third opening portion 47 and the fourth opening portion 48, it is possible to suppress the disturbance of the electric field as described above to a narrow range. As a result, it is possible to keep the display quality good.

As described above, according to the present embodiment, the pixel electrode 324 is formed of the second transparent electrode film and includes the first pixel electrode portion (fifth electrode portion) 324A1 and the second pixel electrode portion (sixth electrode portion) 324A2 that are disposed to interpose the bent portion 324A3 and are continuous with the bent portion 324A3. The third opening portion 47 that extends along the gate wiring 326 is provided in the first pixel electrode portion 324A1, and the fourth opening portion 48 that extends along the gate wiring 326 and has a relationship of intersecting the third opening portion 47 is provided in the second pixel electrode portion 324A2. The bent portion 324A3 includes the third pixel electrode portion (seventh electrode portion) 49 that extends along the touch wiring 331 and has a relationship of intersecting both the third opening portion 47 and the fourth opening portion 48. An electric field is generated between the common electrode 325 and portions of the first pixel electrode portion 324A1 and the second pixel electrode portion 324A2 in the vicinity of the edge portions of the third opening portion 47 and the fourth opening portion 48 that extend along the gate wiring 326. When an opening that communicates with the third opening portion 47 and the fourth opening portion 48 is provided in the bent portion, there is a concern that an electric field generated with the common electrode is disturbed over the wide range centered on the bent portion. In this respect, since the bent portion 324A3 includes the third pixel electrode portion 49 that extends along the touch wiring 331 and intersects both the third opening portion 47 and the fourth opening portion 48, it is possible to suppress the disturbance of the electric field as described above to a narrow range. As a result, it is possible to keep the display quality good.

Fifth Embodiment

A fifth embodiment will be described with reference to FIG. 18. The fifth embodiment shows a case where a configuration of a pixel electrode 424 is changed from the fourth embodiment described above. Repetitive descriptions of the structure, action, and effect similar to those of the fourth embodiment described above will be omitted.

Figure 18:
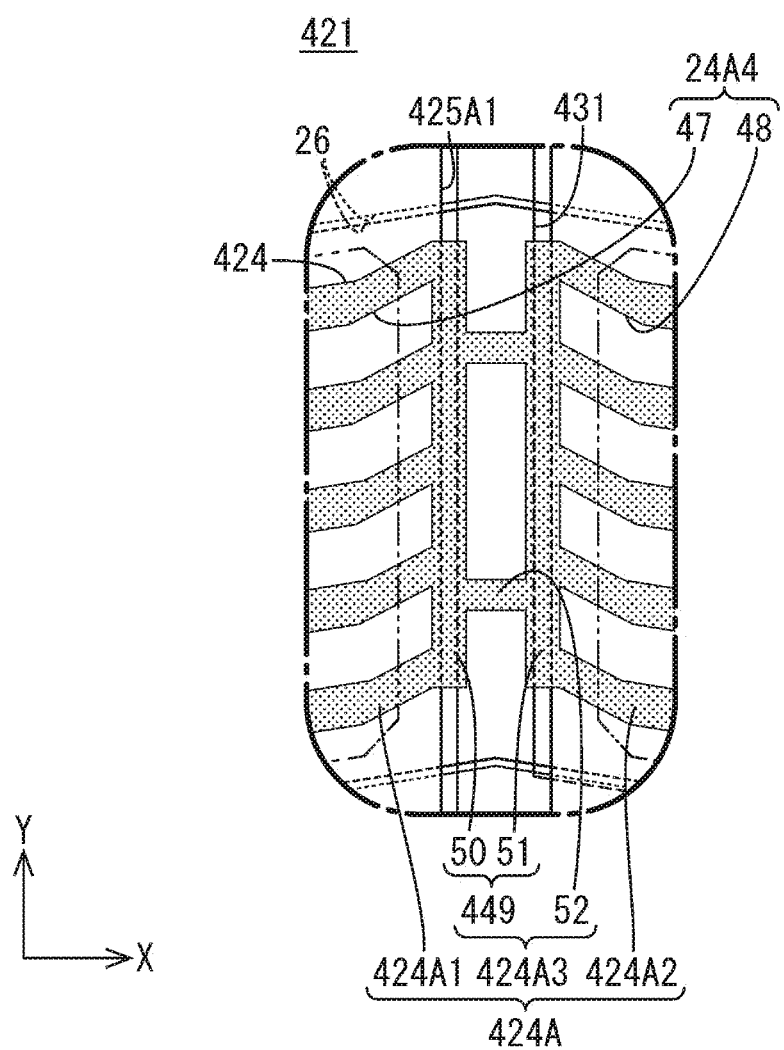
FIG. 18 is a plan view illustrating a vicinity of a bent portion of a pixel electrode in a display region of a liquid crystal panel according to a fifth embodiment and is a plan view illustrating a second transparent electrode film in a mesh shape.

As illustrated in FIG. 18, in the pixel electrode 424 according to the present embodiment, a third pixel electrode portion 449 constituting a bent portion 424A3 configured by a fourth pixel electrode portion (eighth electrode portion) 50 and a fifth pixel electrode portion (ninth electrode portion) 51. FIG. 18 illustrates the vicinity of the bent portion 424A3 of the pixel electrode 424. FIG. 18 illustrates a second transparent electrode film provided on an array substrate 421 in a mesh shape. The fourth pixel electrode portion 50 and the fifth pixel electrode portion 51 both extend in the Y-axis direction and have a vertically long band shape. The fourth pixel electrode portion 50 and the fifth pixel electrode portion 51 are disposed at positions at an interval in the X-axis direction. Most of each of the fourth pixel electrode portion 50 and the fifth pixel electrode portion 51 is disposed to overlap a first partition opening portion 425A1 or the wiring opening 25C (see FIG. 10). The fourth pixel electrode portion 50 is continuous with a first pixel electrode portion 424A1. The fifth pixel electrode portion 51 is continuous with a second pixel electrode portion 424A2. The bent portion 424A3 includes a joining portion 52 that joins the fourth pixel electrode portion 50 and the fifth pixel electrode portion 51 which are disposed at the interval from each other. The joining portion 52 extends in the X-axis direction, and has a relationship of intersecting the source wiring 127 (refer to FIG. 10) and a touch wiring 431. The joining portion 52 is disposed to overlap the first partition opening portion 425A1 or the wiring opening 25C. Two joining portions 52 are provided at positions at an interval in the Y-axis direction. As described above, the joining portion 52 that joins the fourth pixel electrode portion 50 and the fifth pixel electrode portion 51 constituting a third pixel electrode portion 449 has a relationship of overlapping the touch wiring 431. As in the fourth embodiment described above, as compared with the case where the third pixel electrode portion is made as a single structure, it is possible to reduce the overlapping area of the pixel electrode 424 with the touch wiring 431. As a result, it is possible to reduce the parasitic capacitance that may be generated between the touch wiring 431 and the pixel electrode 424.

As described above, according to the present embodiment, the third pixel electrode portion 449 includes the fourth pixel electrode portion (eighth electrode portion) 50 continuous with the first pixel electrode portion 424A1, and the fifth pixel electrode portion (ninth electrode portion) 51 continuous with the second pixel electrode portion 424A2. The bent portion 424A3 includes the joining portion 52 that intersects the touch wiring 431 and joins the fourth pixel electrode portion 50 and the fifth pixel electrode portion 51. The joining portion 52 that joins the fourth pixel electrode portion 50 and the fifth pixel electrode portion 51 constituting the third pixel electrode portion 449 has a relationship of overlapping the touch wiring 431. As compared with the case where the third pixel electrode portion extending along the touch wiring 431 is continuous with both the first pixel electrode portion and the second pixel electrode portion as a single structure, it is possible to reduce the overlapping area of the pixel electrode 424 with the touch wiring 431. As a result, it is possible to reduce the parasitic capacitance that may be generated between the touch wiring 431 and the pixel electrode 424.

Sixth Embodiment

A sixth embodiment will be described with reference to FIG. 19. The sixth embodiment shows a case where a configuration of a pixel electrode 524 is changed from the fifth embodiment described above. Repetitive descriptions of the structure, action, and effect similar to those of the fifth embodiment described above will be omitted.

Figure 19:
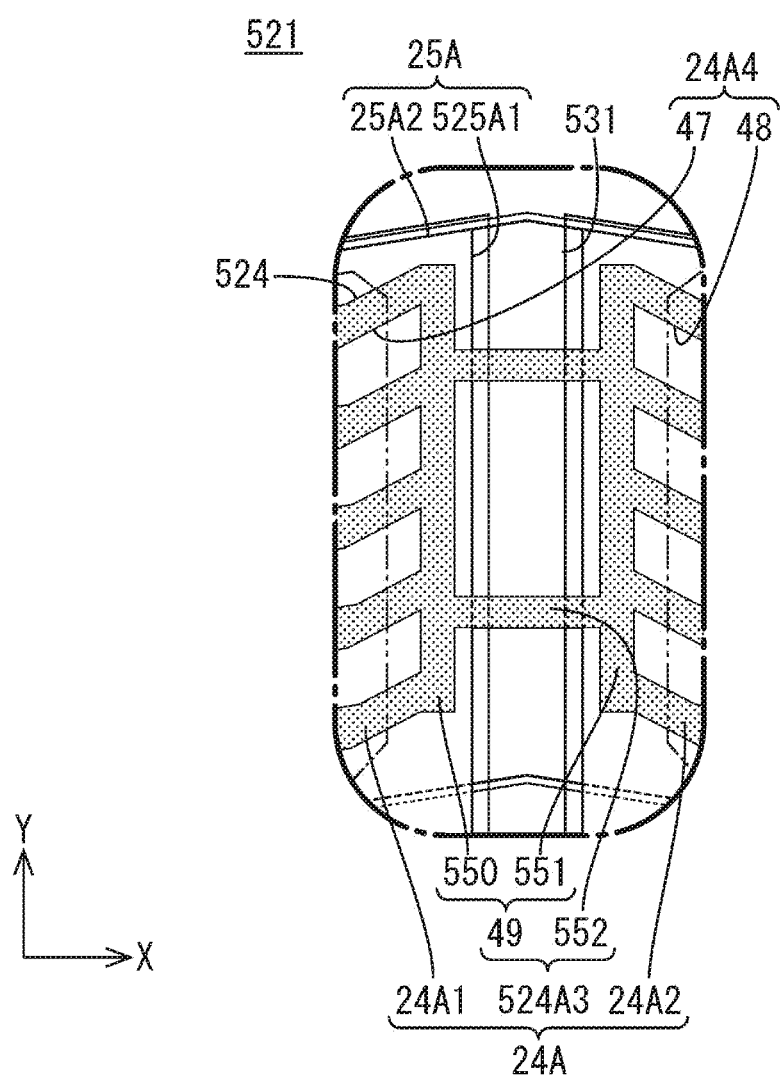
FIG. 19 is a plan view illustrating a vicinity of a bent portion of a pixel electrode in a display region of a liquid crystal panel according to a sixth embodiment and is a plan view illustrating a second transparent electrode film in a mesh shape.

As illustrated in FIG. 19, in the pixel electrode 524 according to the present embodiment, a fourth pixel electrode portion 550 and a fifth pixel electrode portion 551 are disposed not to overlap a first partition opening portion 525A1 or the wiring opening 25C (see FIG. 10). FIG. 19 illustrates the vicinity of a bent portion 524A3 of a pixel electrode 524, and FIG. 19 illustrates the second transparent electrode film provided on an array substrate 521 in a mesh shape. Specifically, the fourth pixel electrode portion 550 and the fifth pixel electrode portion 551 are disposed at an interval larger than the width dimension of the first partition opening portion 525A1 or the wiring opening 25C. The length dimension of a joining portion 552 is larger than the width dimension of a first partition opening portion 525A1 or the wiring opening 25C. The joining portion 552 crosses the entire width of the first partition opening portion 525A1 or the wiring opening 25C. With such a configuration, in comparison with the fifth embodiment described above, it is possible to reduce the overlapping area between a touch wiring 531 and the pixel electrode 524. As a result, it is possible to reduce the parasitic capacitance that may be generated between the touch wiring 531 and the pixel electrode 524.

Seventh Embodiment

A seventh embodiment will be described with reference to FIG. 20. The seventh embodiment shows a case where a configuration of a pixel electrode 624 is changed from the second embodiment described above. Repetitive descriptions of the structure, action, and effect similar to those of the second embodiment described above will be omitted.

Figure 20:
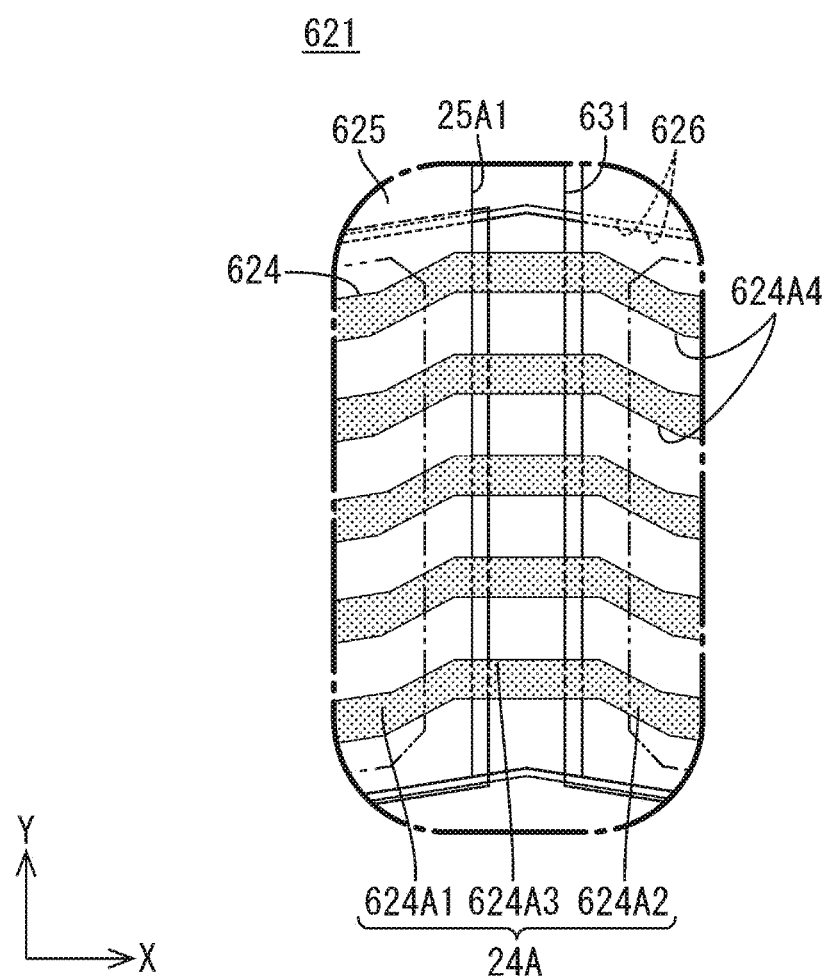
FIG. 20 is a plan view illustrating a vicinity of a bent portion of a pixel electrode in a display region of a liquid crystal panel according to a seventh embodiment and is a plan view illustrating a second transparent electrode film in a mesh shape.

As illustrated in FIG. 20, in the pixel electrode 624 according to the present embodiment, a bent portion 624A3 has a relationship of being perpendicular to a touch wiring 631. FIG. 20 illustrates the vicinity of the bent portion 624A3 of the pixel electrode 624. FIG. 20 illustrates a second transparent electrode film provided on an array substrate 621 in a mesh shape. The bent portion 624A3 has a horizontal stripe shape extending in the X-axis direction. As described above, the bent portion 624A3 has a relationship of being perpendicular to the touch wiring 631. Thus, as compared with the case where the bent portion has a relationship of being inclined with respect to the touch wiring as in the second embodiment described above, it is possible to reduce the overlapping area with the touch wiring 631. As a result, it is possible to reduce the parasitic capacitance that may be generated between the touch wiring 631 and the pixel electrode 624. In the present embodiment, a slit (fifth opening portion) 624A4 is continuously provided over a first pixel electrode portion 624A1, a second pixel electrode portion 624A2, and the bent portion 624A3, similarly to the second embodiment.

As described above, according to the present embodiment, the pixel electrode 624 is formed of a second transparent electrode film and includes the first pixel electrode portion 624A1 and the second pixel electrode portion 624A2 which are disposed to interpose the bent portion 624A3 and are continuous with the bent portion 624A3. The slit (fifth opening portion) 624A4 that extends along a gate wiring 626 is continuously provided in the bent portion 624A3, the first pixel electrode portion 624A1, and the second pixel electrode portion 624A2. The bent portion 624A3 has a relationship of being perpendicular to the touch wiring 631. An electric field is generated between a common electrode 625 and portions of the bent portion 624A3, the first pixel electrode portion 624A1, and the second pixel electrode portion 624A2 in the vicinity of the edge portion of the slit 624A4 extending along the gate wiring 626. Since the bent portion 624A3 has a relationship of being perpendicular to the touch wiring 631, it is possible to reduce the overlapping area with the touch wiring 631, as compared with the case where the bent portion has a relationship of being inclined with respect to the touch wiring 631. As a result, it is possible to reduce the parasitic capacitance that may be generated between the touch wiring 631 and the pixel electrode 624.

Eighth Embodiment

An eighth embodiment will be described with reference to FIG. 21 or 22. The eighth embodiment shows a case where an arrangement and a configuration of a pixel electrode 724 are changed from the second embodiment described above. Repetitive descriptions of the structure, action, and effect similar to those of the second embodiment described above will be omitted.

Figure 21:
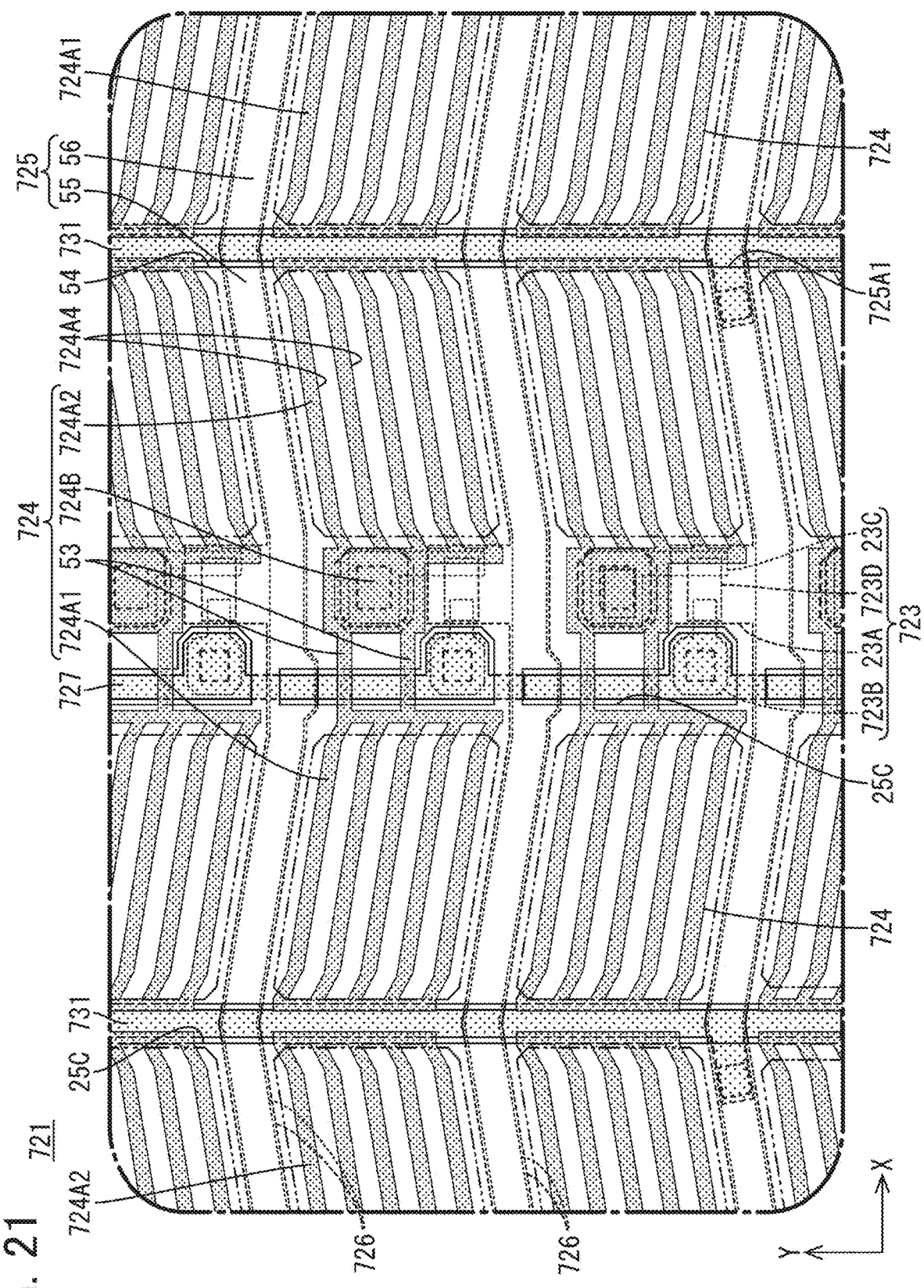
FIG. 21 is a plan view illustrating a pixel arrangement in a display region of a liquid crystal panel according to an eighth embodiment and is a plan view illustrating a third metal film and a second transparent electrode film in different mesh shapes.
Figure 22:
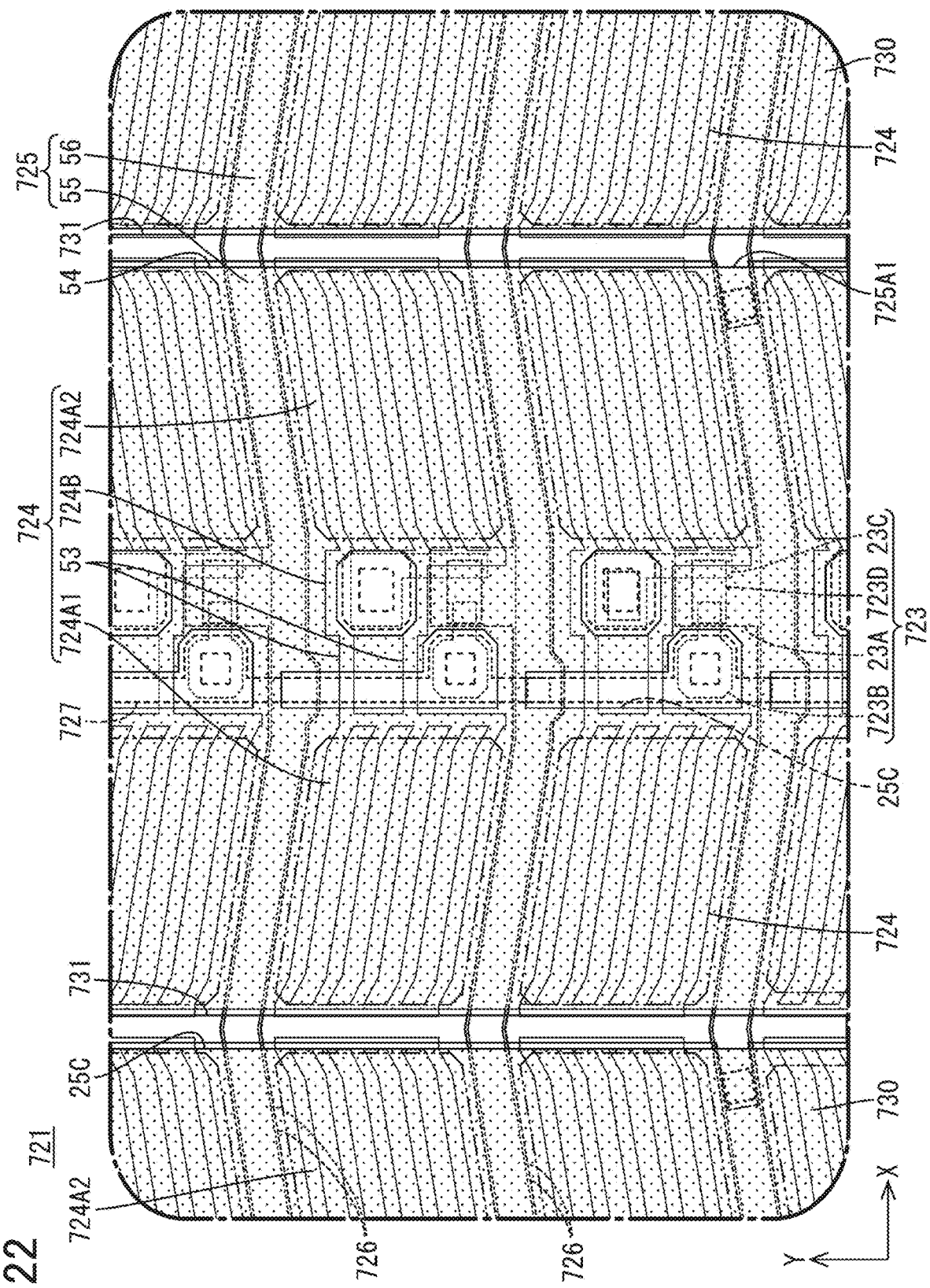
FIG. 22 is a plan view illustrating the pixel arrangement in the display region of the liquid crystal panel according to the eighth embodiment and is a plan view illustrating a first transparent electrode film in a mesh shape.

As illustrated in FIG. 21, in the pixel electrode 724 according to the present embodiment, a central portion 53 in the longitudinal direction is disposed to overlap a source wiring 727. FIG. 21 illustrates two rows of the pixel arrangement. In FIG. 21, the third metal film and the second transparent electrode film provided on an array substrate 721 are illustrated in different mesh shapes, respectively. Specifically, the pixel electrode 724 includes a first pixel electrode portion (twelfth electrode portion) 724A1 disposed on the left side in FIG. 21 with respect to the source wiring 727, a second pixel electrode portion (thirteenth electrode portion) 724A2 disposed on the right side in FIG. 21 with respect to the source wiring 727, the central portion that is continuous with the first pixel electrode portion 724A1, and a contact portion 724B that is continuous with the central portion 53 and the second pixel electrode portion 724A2. A source electrode 723B of a TFT 723 is disposed at a position adjacent to the central portion 53 in the Y-axis direction. A semiconductor portion 723D of the TFT 723 is disposed at a position obliquely facing the central portion 53 in a plan view. The TFT 723 and the source wiring 727 are interposed between the first pixel electrode portion 724A1 and the second pixel electrode portion 724A2 in the X-axis direction. A slit 724A4 is divided into a portion provided at the first pixel electrode portion 724A1 and a portion provided at the second pixel electrode portion 724A2.

As illustrated in FIG. 21, the central portion 53 has a band shape that extends in the X-axis direction, and has a relationship of being perpendicular to the source wiring 727. One end portion of the central portion 53 extending in the X-axis direction is continuous with the contact portion 724B, and the other end portion thereof is continuous with the first pixel electrode portion 724A1. Two central portions 53 are disposed to be arranged at positions at intervals in the Y-axis direction. The total of the width dimensions (dimensions in the Y-axis direction) of the two central portions 53 is smaller than the width dimension of the first pixel electrode portion 724A1 or the width dimension of the second pixel electrode portion 724A2. That is, the central portion 53 is narrower than both of the first pixel electrode portion 724A1 and the second pixel electrode portion 724A2. In this manner, as compared with the case where the central portion is set to have the same width as those of the first pixel electrode portion 724A1 and the second pixel electrode portion 724A2, it is possible to reduce the parasitic capacitance that may be generated between the source wiring 727 and the central portion 53 of the pixel electrode 724.

As illustrated in FIG. 21, a touch wiring 731 is disposed between two pixel electrodes 724 adjacent to each other in the X-axis direction. Specifically, the touch wiring 731 is disposed to be interposed between the second pixel electrode portion 724A2 of one pixel electrode 724 and the first pixel electrode portion 724A1 of the other pixel electrode 724. As illustrated in FIG. 22, the touch wiring 731 is disposed to overlap a first partition opening portion 725A1 provided in a common electrode 725. FIG. 22 illustrates the pixel arrangement in the same range as that of FIG. 21. FIG. 22 illustrates the first transparent electrode film provided on the array substrate 721 in a mesh shape. The first partition opening portion 725A1 illustrated in FIG. 22 among a plurality of first partition opening portions 725A1 provided in the common electrode 725 is set to a "sixth opening portion 54" below. The touch electrode 730 located on the left side in FIG. 22 with respect to the sixth opening portion 54 is set to a "tenth electrode portion 55". The touch electrode 730 located on the right side in FIG. 22 with respect to the sixth opening portion 54 is set to an "eleventh electrode portion 56". The sixth opening portion 54 extends in the Y-axis direction which is the extension direction of the source wiring 727 and the touch wiring 731, and divides the common electrode 725 into the tenth electrode portion 55 and the eleventh electrode portion 56. The sixth opening portion 54 is disposed to overlap the touch wiring 731, and is disposed between two pixel electrodes 724 adjacent to each other in the X-axis direction. Therefore, the sixth opening portion 54 has a relationship of non-overlapping with the source wiring 727 and the TFT 723. In this manner, as compared with the case where the source wiring 27 and the TFT 23 are disposed between two pixel electrodes 24 adjacent to each other as in the first embodiment described above (see FIG. 8), it is possible to reduce the overlapping area between the touch wiring 731 and the pixel electrode 724 and to reduce the parasitic capacitance that may be generated between the touch wiring 731 and the pixel electrode 724.

As described above, according to the present embodiment, the plurality of pixel electrodes 724 arranged at intervals along the gate wiring 726, the TFT 723 connected to the gate wiring 726, the source wiring 727, and the pixel electrode 724, and the common electrode 725 disposed to overlap the plurality of pixel electrodes 724 are provided. All of the plurality of pixel electrodes 724 have a longitudinal shape along the gate wiring 726. The source wiring 727 is disposed to overlap the central portion 53 of any pixel electrode 724. The TFT 723 is connected to the central portion 53 of the pixel electrode 724. The common electrode 725 includes the sixth opening portion 54 extending along the source wiring 727, and the tenth electrode portion 55 and the eleventh electrode portion 56 that are divided by the sixth opening portion 54. The sixth opening portion 54 is disposed between two pixel electrodes 724 adjacent to each other. When the TFT 723 is driven based on the signal transmitted by the gate wiring 726, the pixel electrode 724 is charged to a potential based on the signal transmitted by the source wiring 727. The sixth opening portion 54 of the common electrode 725 is disposed between two pixel electrodes 724 adjacent to each other, and has a relationship of non-overlapping with the source wiring 727 and the TFT 723. In this manner, as compared with the case where the source wiring and the TFT are disposed between two pixel electrodes 724 adjacent to each other, it is possible to reduce the overlapping area between the touch wiring 731 and the pixel electrode 724. As a result, it is possible to reduce the parasitic capacitance that may be generated between the touch wiring 731 and the pixel electrode 724.

The pixel electrode 724 includes the first pixel electrode portion (twelfth electrode portion) 724A1 and the second pixel electrode portion (thirteenth electrode portion) 724A2 which are disposed to interpose the central portion 53 and continuous with the central portion 53. The central portion 53 is narrower than the first pixel electrode portion 724A1 and the second pixel electrode portion 724A2. In this manner, as compared with the case where the central portion is set to have the same width as those of the first pixel electrode portion 724A1 and the second pixel electrode portion 724A2, it is possible to reduce the parasitic capacitance that may be generated between the source wiring 727 and the central portion 53 of the pixel electrode 724.

Ninth Embodiment

A ninth embodiment will be described with reference to FIGS. 23 to 27. The ninth embodiment shows a case where a pixel arrangement and the like are changed from the first embodiment described above. Repetitive descriptions of structure, action, and effect similar to those of the first embodiment described above will be omitted.

Figure 23:
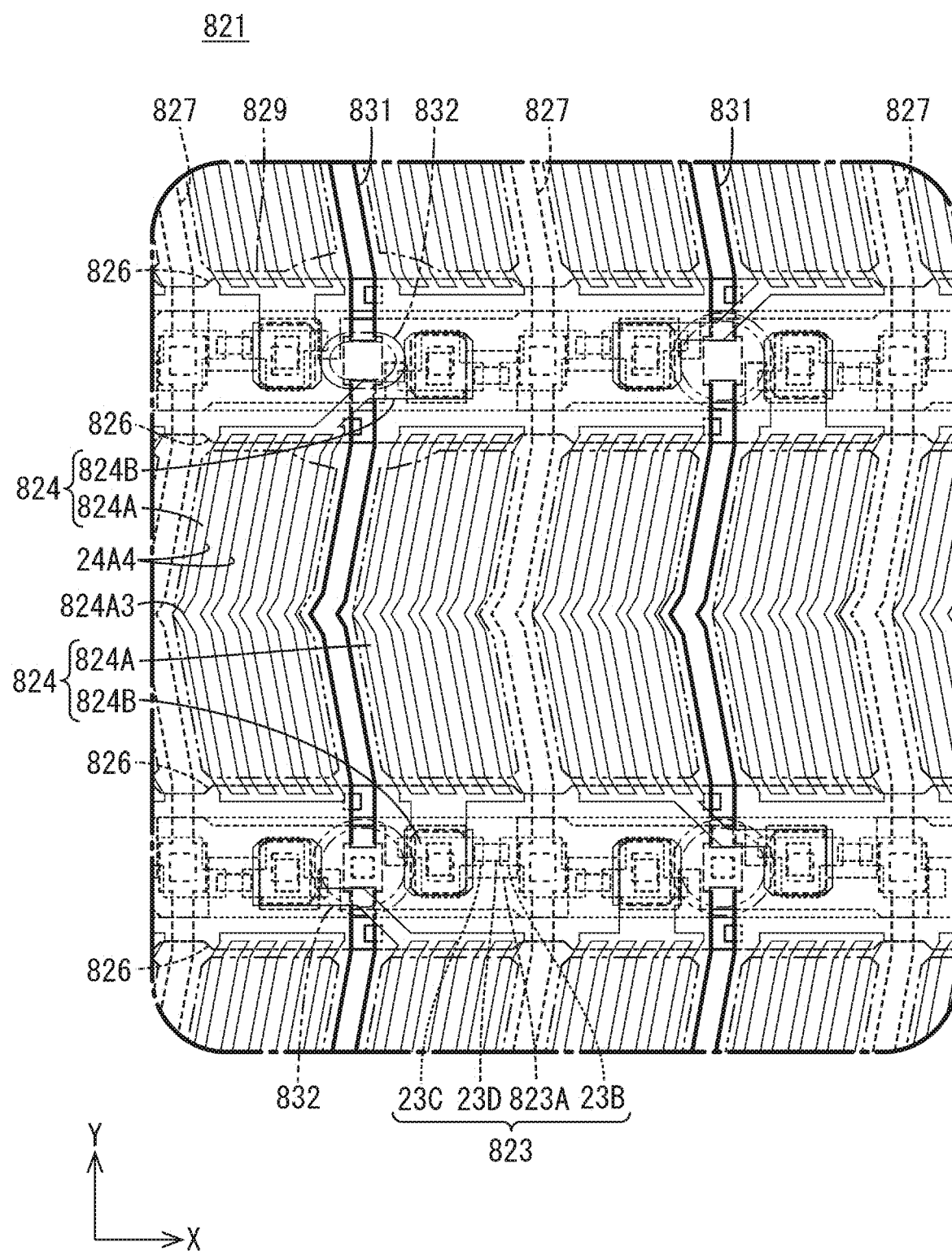
FIG. 23 is a plan view illustrating a pixel arrangement in a display region of a liquid crystal panel according to a ninth embodiment.
Figure 24:
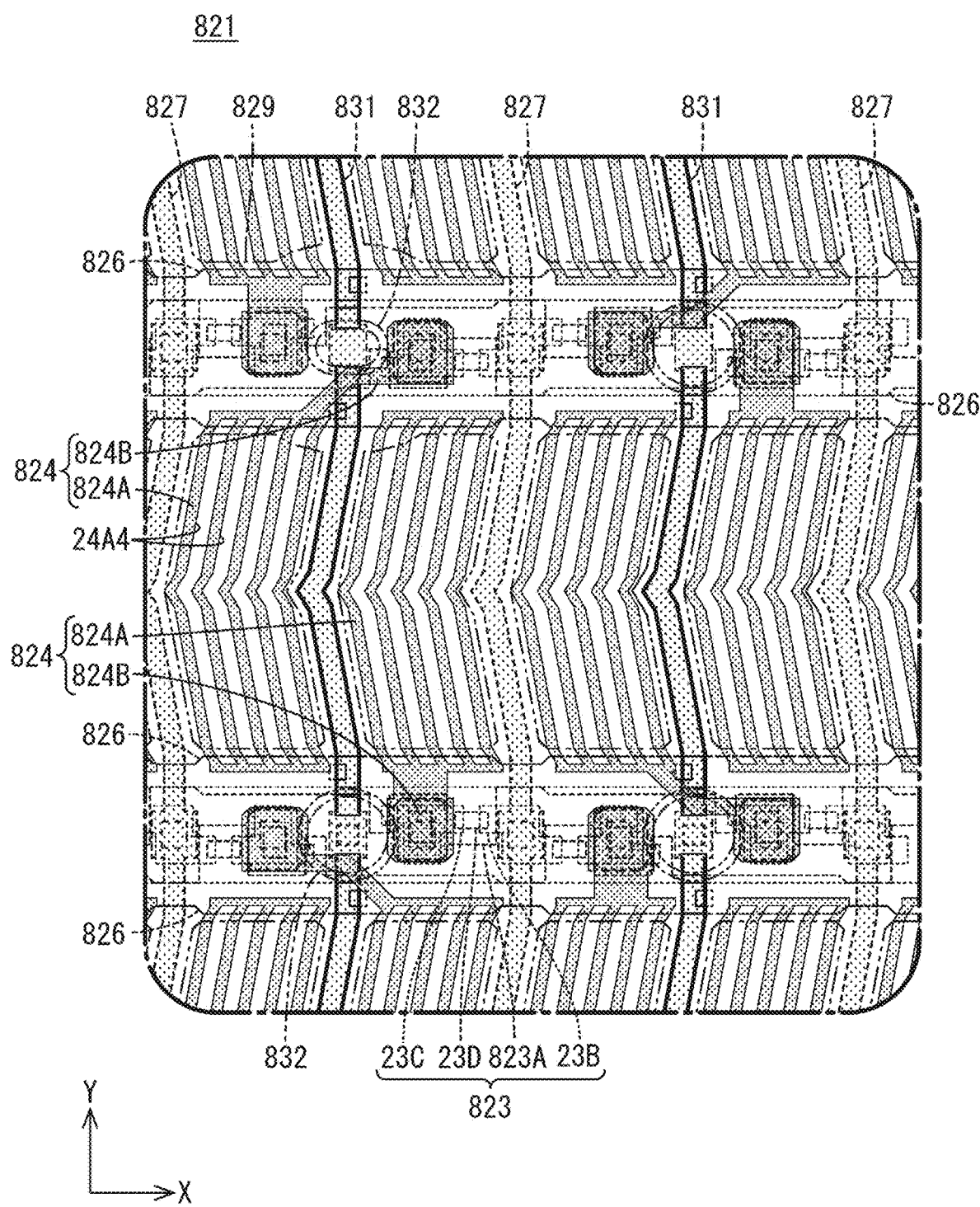
FIG. 24 is a plan view illustrating the pixel arrangement in the display region of the liquid crystal panel according to the ninth embodiment and is a plan view illustrating a third metal film and a second transparent electrode film in different mesh shapes.

As illustrated in FIGS. 23 and 24, a pixel electrode 824 according to the present embodiment has a vertically longitudinal shape in a plan view. The longitudinal direction coincides with the Y-axis direction, and the short direction coincides with the X-axis direction. FIGS. 23 and 24 illustrate four rows of the pixel arrangement. FIG. 24 illustrates the third metal film and the second transparent electrode film provided on an array substrate 821 in different mesh shapes. While a source wiring 827 or the touch wiring 831 is interposed between the pixel electrodes 824 adjacent to each other in the short direction (X-axis direction), the gate wiring 826 and the TFT 823 are interposed between the pixel electrodes 824 adjacent to each other in the longitudinal direction (Y-axis direction). A pixel electrode body 824A constituting the pixel electrode 824 has a vertically long planar shape, and is bent in the middle in the longitudinal direction. The central portion of the pixel electrode body 824A in the longitudinal direction is used as a bent portion 824A3. As described above, the pixel electrode body 824A according to the present embodiment has a planar shape in which the pixel electrode 24 (see FIG. 7) described in the first embodiment described above is rotated by 90 degrees in the counter clock direction in a plan view.

As illustrated in FIGS. 23 and 24, the source wiring 827 extends substantially in the Y-axis direction while being repeatedly bent in a zigzag shape along the side edge of the pixel electrode 824 on the longitudinal side of the pixel electrode 824. A plurality of source wirings 827 are disposed to be arranged at intervals to interpose two pixel electrodes 824 in the X-axis direction. Therefore, the number of installed source wirings 827 is approximately half the number of the pixel electrodes 824 arranged in the X-axis direction. The touch wiring 831 is disposed to be interposed between two pixel electrodes 824 interposed between two source wirings 827 arranged in the X-axis direction. Therefore, in each of regions between the pixel electrodes 824 arranged in the X-axis direction, which are spaced from each other, the source wiring 827 and the touch wiring 831 are disposed to be alternately and repeatedly arranged. The number of touch wirings 831 arranged in the X-axis direction coincides with the same number of the arranged source wirings 827. Similarly to the source wiring 827, the touch wiring 831 extends substantially in the Y-axis direction while being repeatedly bent in a zigzag shape along the side edge on the longitudinal side of the pixel electrode 824.

Figure 25:
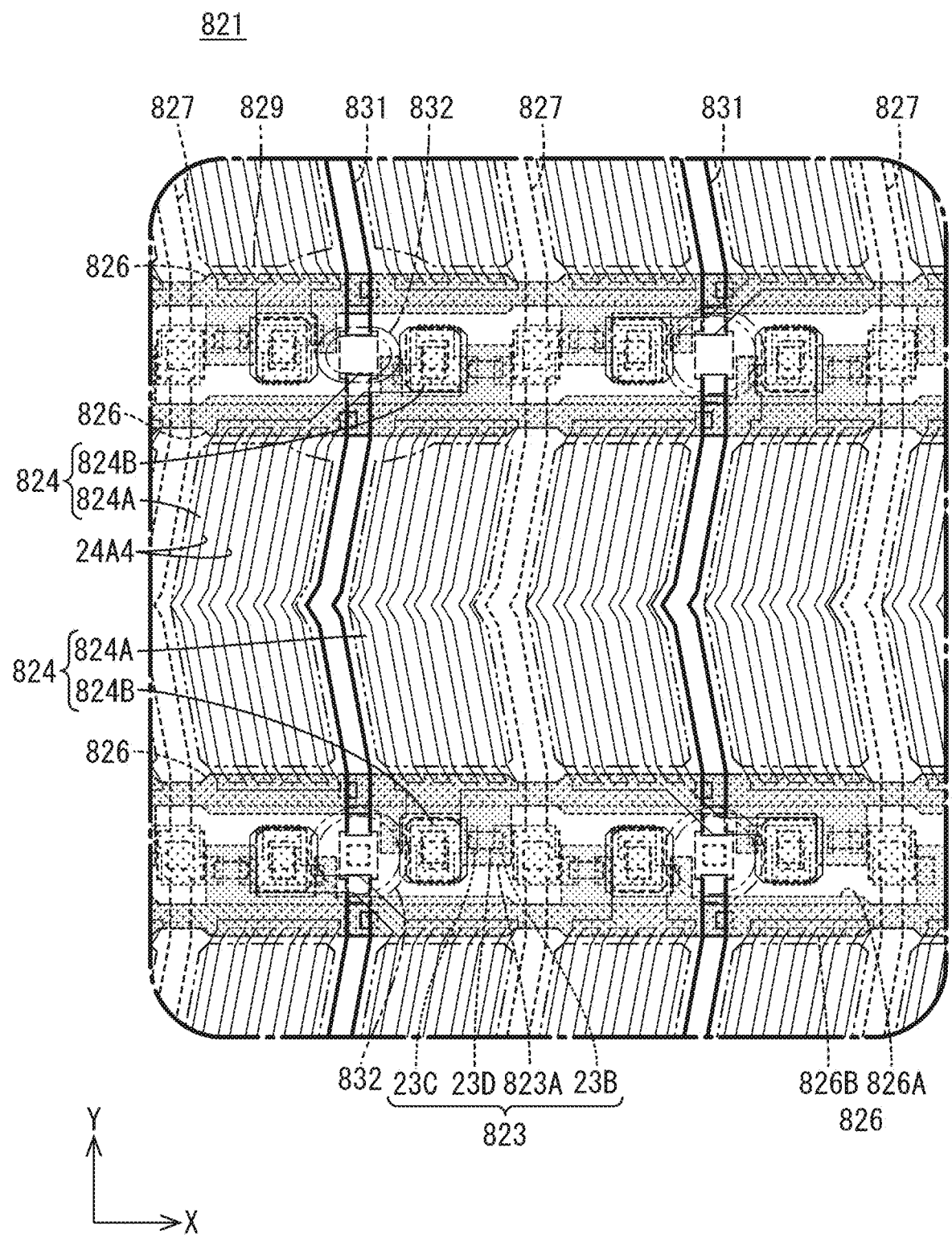
FIG. 25 is a plan view illustrating the pixel arrangement in the display region of the liquid crystal panel according to the ninth embodiment and is a plan view illustrating a first metal film and a second metal film in different mesh shapes.

As illustrated in FIGS. 23 and 25, the gate wiring 826 extends substantially straight in the X-axis direction while increasing or decreasing the line width in the middle. FIG. 25 illustrates the pixel arrangement in the same range as that of FIG. 24. FIG. 25 illustrates the first metal film and the second metal film provided on the array substrate 821 in different mesh shapes, respectively. The wide portion of the gate wiring 826 constitutes the gate electrode 823A and the like. Two consecutive gate wirings 826 are disposed to be arranged between the pixel electrodes 824 adjacent to each other in the Y-axis direction. Therefore, the number of installed gate wirings 826 is twice the number of the pixel electrodes 824 arranged in the Y-axis direction. The two consecutive gate wirings 826 are disposed at prescribed intervals in the Y-axis direction.

As illustrated in FIGS. 23 and 24, a plurality of TFTs 823 are disposed to be arranged in the X-axis direction in a region interposed between two pixel electrodes 824 arranged in the Y-axis direction. The number of TFTs 823 arranged in the X-axis direction coincides with the number of pixel electrodes 824 arranged in the X-axis direction. The plurality of pixel electrodes 824 include one pixel electrode 824 that is connected to the adjacent TFT 823 without the contact portion 824B crossing the touch wiring 831, and another pixel electrode 824 that is connected to the TFT 823 located in the adjacent row with the contact portion 824B crossing the touch wiring 831. One pixel electrode 824 is connected to the TFT 823 disposed in the row to which the pixel electrode 824 belongs. The other pixel electrode 824 is connected to the TFT 823 disposed in a row adjacent to the row to which the pixel electrode 824 belongs with the touch wiring 831 interposed therebetween. A spacer 832 is disposed between the adjacent TFTs 823 at a position that overlaps the touch wiring 831. Since the first pixel contact hole and the second wiring contact hole are not disposed at this position, the flatness is high. Thus, this position is suitable for maintaining the interval between the pair of substrates. Further, a light shielding portion 829 is formed at this position, and thus it is possible to suppress an influence of poor alignment due to the spacer 832 on the display. The spacer 832 illustrated in FIG. 23 and the like includes a main spacer and a sub-spacer. Specifically, the spacer 832 having a substantially circular planar shape is a sub-spacer, and the spacer 832 having a horizontally long planar shape including an arc portion is a main spacer.

Figure 26:
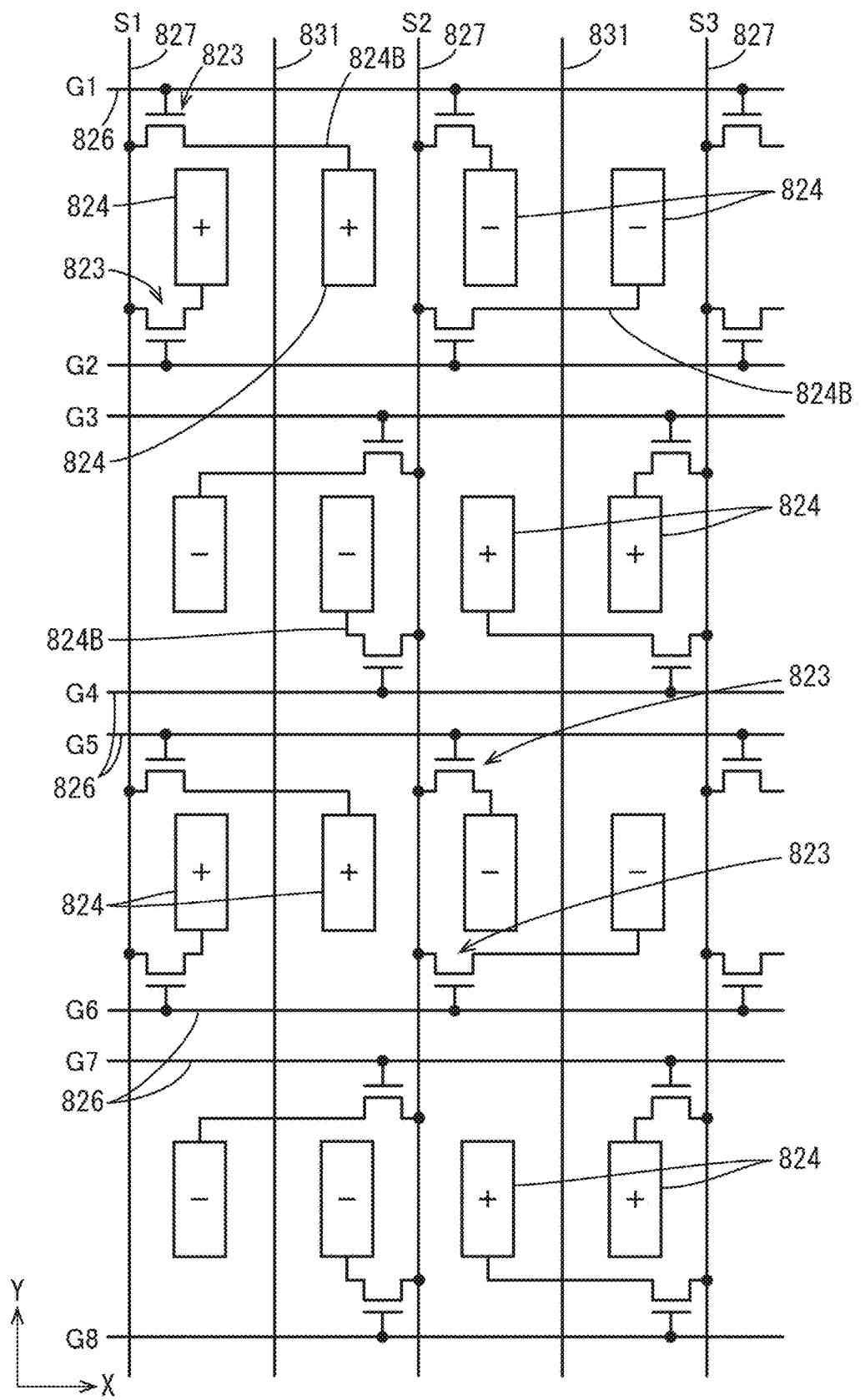
FIG. 26 is a circuit diagram schematically illustrating a connection form of a TFT with a gate wiring, a source wiring, and a pixel electrode provided in the liquid crystal panel according to the ninth embodiment, and a polarity of an image signal supplied to a pixel electrode in a certain frame period.

Here, a connection form between the TFT 823, and the gate wiring 826 and the source wiring 827 will be described with reference to FIG. 26. FIG. 26 schematically illustrates the connection form between the TFT 823, and the gate wiring 826, the source wiring 827, and the pixel electrode 824, and a polarity of an image signal supplied to the pixel electrode 824 in a certain frame period. In FIG. 26, a plurality of gate wirings 826 are numbered, the first gate wiring 826 counted from the upper end is set as "G1", the second gate wiring 826 is set as "G2", and the gate wirings up to "G8" being the eighth gate wiring 826 are illustrated. A row of pixel electrodes 824 interposed between "G1" and "G2" is referred to as a "first row". A row of pixel electrodes 824 interposed between "G3" and "G4" is referred to as a "second row". A row of pixel electrodes 824 interposed between "G5" and "G6" is referred to as a "third row". A row of pixel electrodes 824 interposed between "G7" and "G8" is referred to as a "fourth row". In FIG. 26, a plurality of source wirings 827 are numbered, the first source wiring 827 counted from the left end is set as "S1", the second source wiring 827 is set as "S2", and the source wirings up to "S3" being the third source wiring 827 are illustrated. A row of pixel electrodes 824 located on the right side of "S1" is referred to as a "first row". A row of pixel electrodes 824 located on the left side of "S2" is referred to as a "second row". A row of pixel electrodes 824 located on the right side of "S2" is referred to as a "third row". A row of pixel electrodes 824 located on the left side of "S3" is referred to as a "fourth row". A row of pixel electrodes 824 located on the right side of "S3" is referred to as a "fifth row". FIG. 26 also illustrates the touch wiring 831. In FIG. 26, in a case where, in a certain frame period (here, the frame period is set to a period from when the TFT 823 connected to the gate wiring 826 "G1" turns into an ON state until the TFTs 823 connected to the gate wirings 826 "G2" and "G3" sequentially turn into the ON state, and the TFT 823 connected to the gate wiring 826 "G1" turns into the ON state gain), an image signal having a positive polarity is supplied to the odd-numbered source wiring 827 ("S1", "S3") counted from the left end, and an image signal having a negative polarity is supplied to the even-numbered source wiring 827 ("S2") counted from the left end, the polarity of an image signal supplied to the pixel electrode 824 is indicated by the sign "+" or "−". In the frame period next to a certain frame period, an image signal having a negative polarity is supplied to the odd-numbered source wiring 827 ("S1", "S3") counted from the left end, an image signal having a positive polarity is supplied to the even-numbered source wiring 827 ("S2") counted from the left end, and the polarity of an image signal supplied to each pixel electrode 824 is opposite to the polarity indicated by the sign "+" or "−" illustrated in FIG. 26. Furthermore, in a frame period next to a frame period after a certain frame period, the polarity of an image signal supplied to each pixel electrode 824 is the same as that illustrated in FIG. 26, and this will be repeated thereafter. Here, the image signal supplied to each source wiring 827 is not inverted in polarity in a certain frame period. With such a configuration, as compared with the configuration in which the TFT 823 and the like are connected such that an image signal supplied to each source wiring 827 is inverted during a certain frame period, it is possible to reduce the amplitude of the image signal supplied to each source wiring 827. Thus, it is possible to reduce a current consumption and to reduce the bluntness of the image signal.

As illustrated in FIG. 26, one pixel electrode 824 (pixel electrode 824 in which the contact portion 824B does not cross the touch wiring 831) and the other pixel electrode 824 (pixel electrode 824 in which the contact portion 824B crosses the touch wiring 831) described above are arranged in a zigzag pattern in a plan view. That is, two pixel electrodes 824 adjacent to each other in the X-axis direction include one pixel electrode 824 and the other pixel electrode 824. Two pixel electrodes 824 adjacent to each other in the Y-axis direction include one pixel electrode 824 and the other pixel electrode 824. Two TFTs 823 connected to the two pixel electrodes 824 belonging to the (2n−1)th row and the (2n)th row in a certain column are connected to the same source wiring 827. "n" is a natural number. Therefore, an image signal having the same polarity in a certain frame period is supplied to the two pixel electrodes 824 belonging to the (2n−1)th row and the (2n)th row in a certain column. On the other hand, two TFTs 823 connected to the two pixel electrodes 824 belonging to the (2n)th row and the (2n+1)th row in a certain column are respectively connected to the two source wirings 827 for transmitting image signals having different polarities. Thus, image signals having opposite polarities are supplied to the two pixel electrodes 824 belonging to the (2n)th row and the (2n+1)th row in a certain column in a certain frame period. Two TFTs 823 connected to the two pixel electrodes 824 belonging to the (2n−1)th column and the (2n)th column in a certain row are respectively connected to two source wirings 827 for transmitting image signals having different polarities. Thus, image signals having opposite polarities are supplied to the two pixel electrodes 824 belonging to the (2n−1)th column and the (2n)th column in a certain row in a certain frame period. Two TFTs 823 connected to the two pixel electrodes 824 belonging to the (2n)th column and the (2n+1)th column in a certain row are respectively connected to two source wirings 827 for transmitting image signals having different polarities. Thus, image signals having opposite polarities are supplied to the two pixel electrodes 824 belonging to the (2n)th column and the (2n+1)th column in a certain row in a certain frame period.

As described above, according to FIG. 26, in a case where two pixel electrodes 824 belonging to the (2n−1)th row and the (2n) row are made as one pixel set, the polarities are inverted in two pixel sets adjacent to each other in the X-axis direction, and the polarity are inverted in two pixel sets adjacent to each other in the Y-axis direction. That is, the polarities are inverted in units of two pixels disposed side by side in a zigzag manner. As described above, in a case where the pixel arrangement is made such that the polarity of the image signal supplied to each pixel electrode 824 is in a zigzag shape in units of the pixel electrodes 824 or in units of the plurality of pixel electrodes 824, a linear luminance failure has difficulty in being visually recognized even when there is a variation in the image signal or a common potential signal. In the present embodiment, as compared with the case where one gate wiring is disposed between two adjacent pixel electrodes, the number of installed gate wirings 826 is doubled. Accordingly, the time for transmitting the signal causing the TFT 823 to turn into the ON state by the one gate wiring 826 is 1/2. As described above, when the time for driving the TFT 823 is reduced, in a case where the signal transmitted by the gate wiring 826 is blunt, there is a concern that the pixel electrode 824 is not sufficiently charged. In this respect, in addition to reduction in wiring resistance of the gate wiring 826 in a manner that the gate wiring 826 has a stacked structure of the lower-layer wiring portion 826A and the upper-layer wiring portion 826B, bluntness is unlikely to occur in the signal transmitted by the gate wiring 826 in a manner that the first interlayer insulating film and the flattening film having a larger film thickness than the gate insulating film are interposed between the gate wiring 826 and the source wiring 827. As a result, it is possible to sufficiently charge the pixel electrode 824 even when the time for driving the TFT 823 is reduced.

Figure 27:
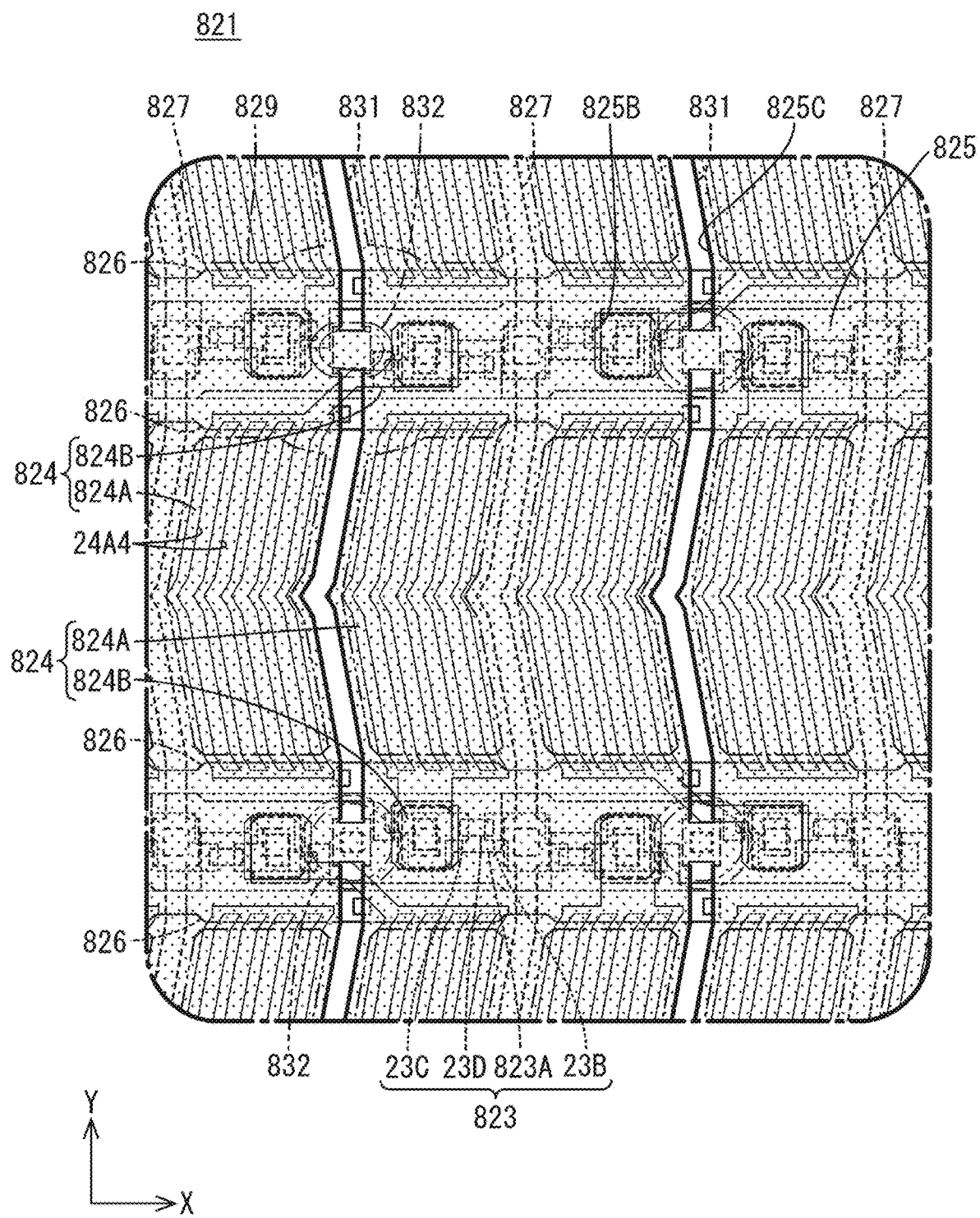
FIG. 27 is a plan view illustrating the pixel arrangement in the display region of the liquid crystal panel according to the ninth embodiment and is a plan view illustrating a first transparent electrode film in a mesh shape.

As illustrated in FIG. 27, a TFT opening 825B and a wiring opening 825C are provided in the common electrode 825 in addition to the partition opening portion 25A (see FIG. 1). FIG. 27 illustrates the pixel arrangement in the same range as that of FIG. 24. FIG. 27 illustrates the first transparent electrode film provided on the array substrate 821 in a mesh shape. In the present embodiment, the wiring opening 825C is provided in a range that overlaps a portion of the touch wiring 831. The wiring openings 825C are disposed to be arranged at intervals in the Y-axis direction.

As described above, according to the present embodiment, the two gate wirings 826, the plurality of pixel electrodes 824 arranged at intervals along the source wiring 827, the TFT 823 connected to the gate wirings 826, the source wiring 827, and the pixel electrodes 824, and the common electrode 825 disposed to overlap the plurality of pixel electrodes 824 are provided. All the plurality of pixel electrodes 824 have a longitudinal shape along the source wiring 827. The two gate wirings 826 are disposed at an interval between two pixel electrodes 824 adjacent to each other. When the TFT 823 is driven based on the signal transmitted by the gate wiring 826, the pixel electrode 824 is charged to a potential based on the signal transmitted by the source wiring 827. Two gate wirings 826 are disposed at an interval between two adjacent pixel electrodes 824. Thus, as compared with the case where one gate wiring is disposed between two adjacent pixel electrodes, the number of installed gate wirings 826 is doubled, and thus the time for transmitting the signal causing the TFT 823 to turn into the ON state by one gate wiring 826 is 1/2. As described above, when the time for driving the TFT 823 is shortened, in a case where the signal transmitted by the gate wiring 826 is blunt, there is a concern that the pixel electrode 824 is not sufficiently charged. In this respect, in addition to reduction in wiring resistance of the gate wiring 826 in a manner that the gate wiring 826 has a stacked structure of the lower-layer wiring portion 826A and the upper-layer wiring portion 826B, bluntness is unlikely to occur in the signal transmitted by the gate wiring 826 in a manner that the first interlayer insulating film and the flattening film that are the second insulating films and have a larger film thickness than the gate insulating film are interposed between the gate wiring 826 and the source wiring 827. As a result, the pixel electrode 824 can be sufficiently charged even when the time for driving the TFT 823 is shortened.

Tenth Embodiment

A tenth embodiment will be described with reference to FIG. 28. The tenth embodiment shows a case where a connection form between a TFT 923, and a gate wiring 926 and a source wiring 927 is changed from the ninth embodiment described above. Repetitive descriptions of the structure, action, and effect similar to those of the ninth embodiment described above will be omitted.

Figure 28:
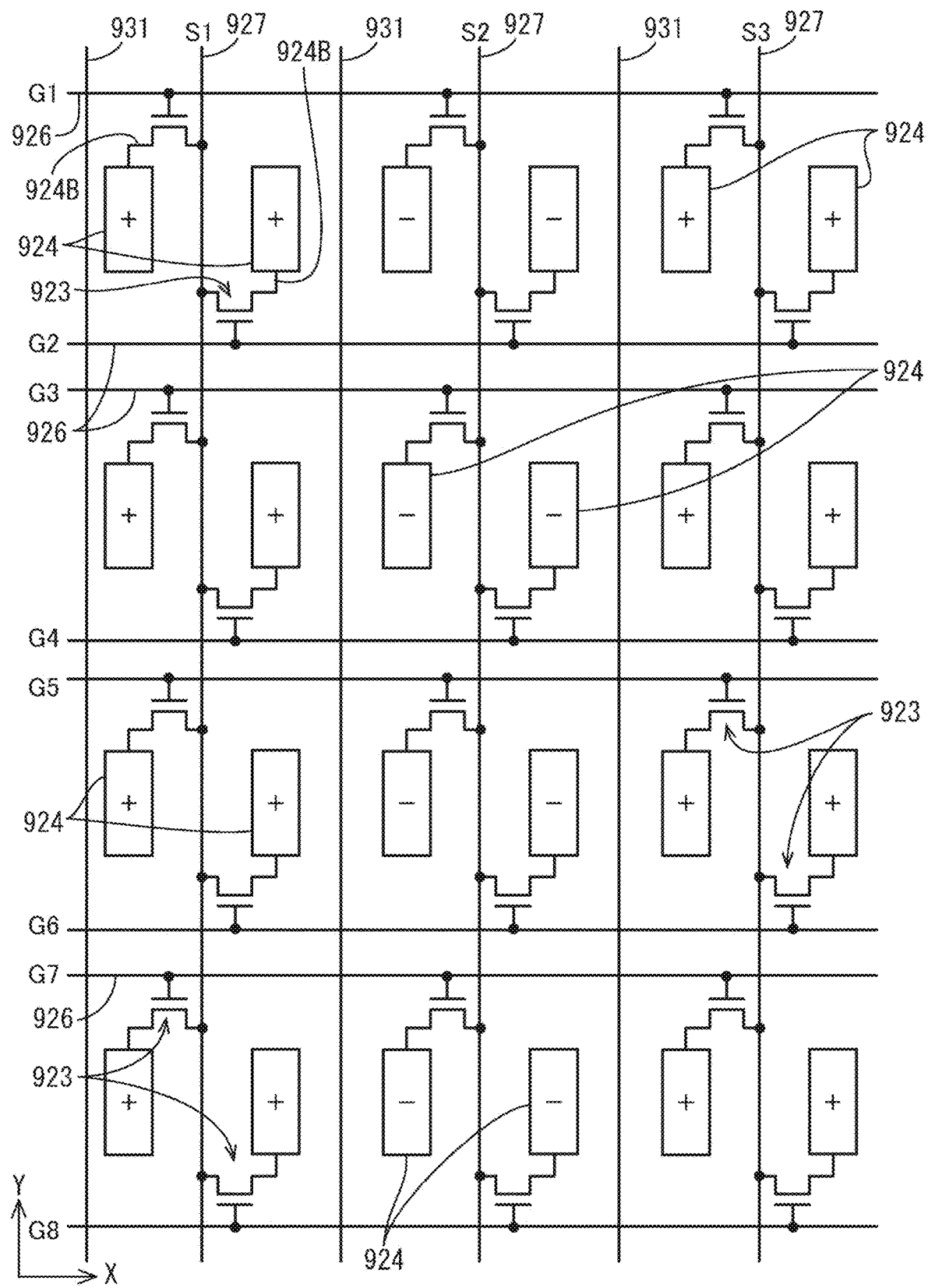
FIG. 28 is a circuit diagram schematically illustrating a connection form of a TFT with a gate wiring, a source wiring, and a pixel electrode provided in a liquid crystal panel according to a tenth embodiment, and a polarity of an image signal supplied to a pixel electrode in a certain frame period.

The connection form between the TFT 923, and the gate wiring 926 and the source wiring 927 according to the present embodiment is as illustrated in FIG. 28. FIG. 28 schematically illustrates the connection form between the TFT 923, and the gate wiring 926, the source wiring 927, and a pixel electrode 924, and a polarity of an image signal supplied to the pixel electrode 924 in a certain frame period. Each notation of "G1", "S1", "+", and "−" in FIG. 28 is as described in the ninth embodiment, and is similar to each notation in FIG. 26. In the present embodiment, contact portions 924B provided in all the pixel electrodes 924 are connected to the adjacent TFTs 923 without crossing the touch wiring 931. That is, all the pixel electrodes 924 are connected to the TFTs 923 disposed in the rows to which the pixel electrodes 924 belong.

Specifically, two TFTs 923 connected to the two pixel electrodes 924 belonging to the (2n−1)th row and the (2n)th row in all columns are connected to the same source wiring 927. "n" is a natural number. Therefore, two pixel electrodes 924 belonging to the (2n−1)th row and the (2n)th row in all the columns have the same polarity. On the other hand, two TFTs 923 connected to the two pixel electrodes 924 belonging to the (2n)th row and the (2n+1)th row in all columns are respectively connected to the two source wirings 927 for transmitting image signals having different polarities. Therefore, two pixel electrodes 924 belonging to the (2n)th row and the (2n+1)th row in all columns have opposite polarities. As described above, according to FIG. 28, the polarities are inverted in units of two horizontal rows of pixels. According to the present embodiment, it is possible to obtain the action and effect similar to those of the ninth embodiment described above.

OTHER EMBODIMENTS

The technique disclosed in the present specification is not limited to the embodiments described by the above description and drawings, and for example, the following embodiments are also included in the technical scope.

(1) As the wiring extending in the Y-axis direction, a dummy touch wiring that is connected to neither touch electrode 30, 230, or 730 can be added in addition to the touch wirings 31, 231, 331, 431, 531, 631, 731, 831, and 931 and the connection wiring 43. In a case where there is a region in which any of the touch wirings 31, 231, 331, 431, 531, 631, 731, 831, and 931 and the connection wiring 43 is not disposed, the dummy touch wiring is disposed by using the region. The configuration of the dummy touch wiring is similar to the configuration of the touch wirings 31, 231, 331, 431, 531, 631, 731, 831, and 931, except for not being connected to the touch electrodes 30, 230, and 730. With the dummy touch wiring, a difference in the amount of transmitted light, which may be generated between a region in which the touch wirings 31, 231, 331, 431, 531, 631, 731, 831, and 931 and the connection wiring 43 are set to be disposed and a region in which any of the touch wirings 31, 231, 331, 431, 531, 631, 731, 831, and 931 and the connection wiring 43 is set not to be disposed is reduced.

(2) In the configurations described in the first, second, and fourth to tenth embodiments, the connection wiring 43 described in the third embodiment can be added.

(3) The wirings disposed to overlap the first partition opening portions 25A1, 225A1, 325A1, 425A1, 525A1, and 725A1 of the common electrodes 25, 225, 325, 625, 725, and 825 are not limited to the touch wirings 31, 231, 331, 431, 531, 631, 731, 831, and 931. The connection wiring 43 described in the third embodiment may be used. The dummy touch wiring described in (1) above may be disposed to overlap the first partition opening portions 25A1, 225A1, 325A1, 425A1, 525A1, and 725A1.

(4) The first interlayer insulating film 35 may not be formed on the array substrates 21, 221, 321, 421, 521, 621, 721, and 821. Even in this case, the film thickness of the flattening film 36 interposed between the gate wirings 26, 126, 226, 326, 626, 726, 826, 826-1, 826-3, and 926 and the source wirings 27, 127, 227, 427, 727, 827, 827-1, 827-2, 827-3, and 927 is sufficiently larger than the film thickness of the gate insulating film 34.

(5) The liquid crystal panel 10 may be a curved liquid crystal panel in which the main surface is curved. The axial direction of the curved axis of the curved liquid crystal panel can be caused to coincide with the Y-axis direction (arrangement direction of color filters having different colors), and the curved direction perpendicular to the curved axis can be caused to coincide with the X-axis direction (extension direction of the color filter). In this manner, in a process of manufacturing the curved liquid crystal panel, when a liquid crystal panel obtained by bonding the counter substrate 20 and the array substrates 21, 221, 321, 421, 521, 621, 721, and 821 is curved, positional deviation may occur between the counter substrate 20, and the array substrates 21, 221, 321, 421, 521, 621, 721, and 821 in the X-axis direction, but color mixing is unlikely to occur between pixels having different colors due to the positional deviation.

(6) The planar shapes of the pixel electrodes 24, 124, 224, 324, 424, 524, 624, 724, and 824 can be appropriately changed other than the illustration in each drawing. For example, the planar shapes of the pixel electrodes 24, 124, 224, 324, 424, 524, 624, and 724 may be changed to planar shapes obtained by inverting the pixel electrodes 24, 124, 224, 324, 424, 524, 624, and 724 illustrated in the drawings in the first to eighth embodiments upside down. The planar shape of the pixel electrode 824 may be changed to a planar shape obtained by inverting the pixel electrode 824 illustrated in the drawings in the ninth embodiment left and right.

(7) The pixel electrodes 24, 124, 224, 324, 424, 524, 624, 724, 824, 824-1, 824-2, and 924 may be configured by the first transparent electrode film, and the common electrodes 25, 225, 325, 625, 725, and 825 may be configured by the second transparent electrode film. In this case, it is preferable to form a slit for alignment control in the common electrodes 25, 225, 325, 625, 725, and 825.

Figure 29:
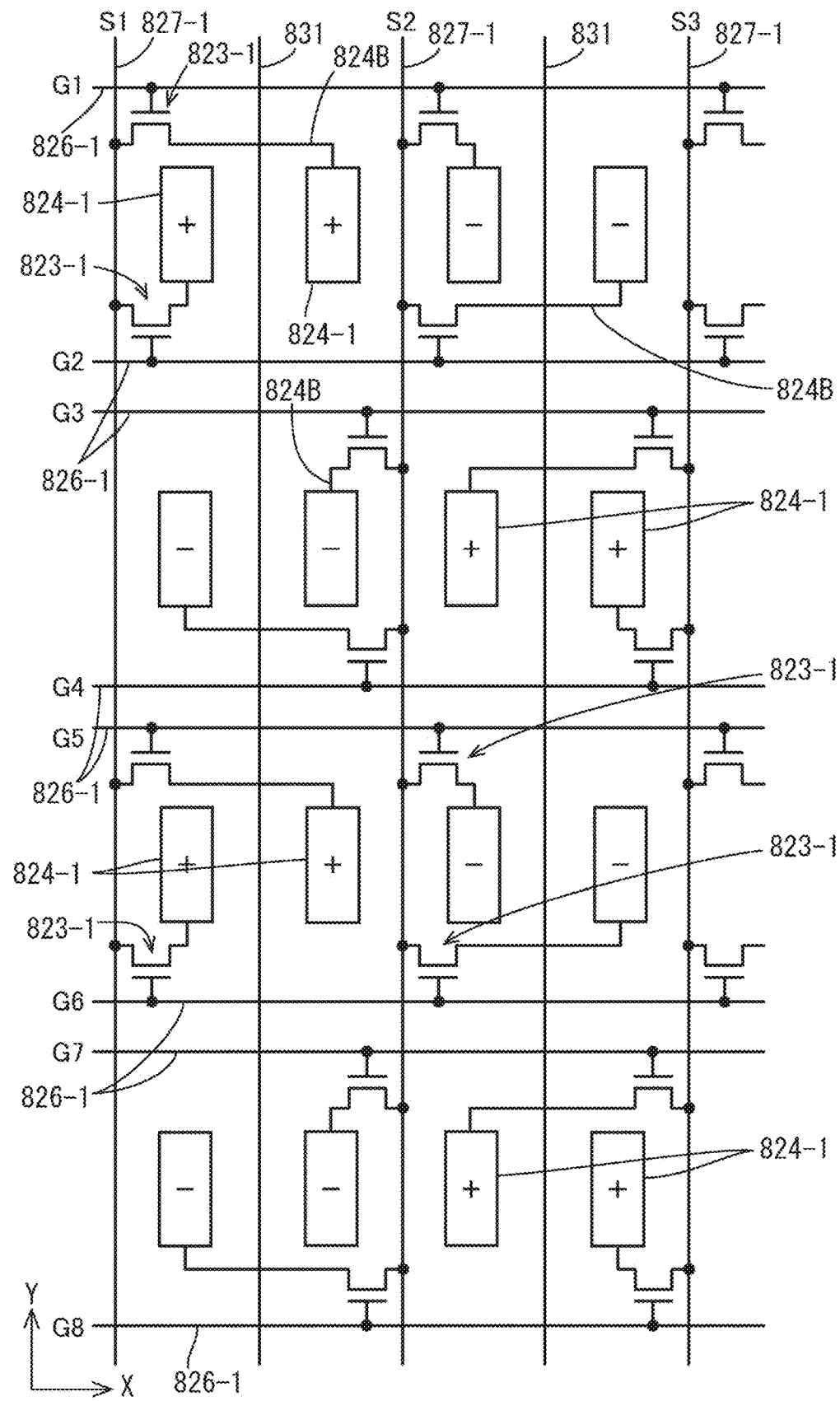
FIG. 29 is a circuit diagram schematically illustrating a connection form of a TFT with a gate wiring, a source wiring, and a pixel electrode provided in a liquid crystal panel according to another embodiment (8), and a polarity of an image signal supplied to a pixel electrode in a certain frame period.

(8) In the configurations described in the ninth and tenth embodiments, which gate wiring 826, 926 or source wiring 827, 927 each of the TFTs 823 and 923 connected to each of the pixel electrodes 823 and 924 is connected to can be changed as appropriate. For example, a connection form illustrated in FIG. 29 as a modification example of the ninth embodiment can be adopted. Specifically, as illustrated in FIG. 29, among pixel electrodes 824-1 belonging to the (2n)th column, the TFT 823-1 connected to the (4n)th gate wiring 826-1 counted from the upper end is connected to each of pixel electrodes 824-1 belonging to the (4n−3)th row, the TFT 823-1 connected to the (4n−1)th gate wiring 826-1 counted from the upper end is connected to each of pixel electrodes 824-1 belonging to the (4n−2)th row, the TFT 823-1 connected to the (4n−1)th gate wiring 826-1 counted from the upper end is connected to each of pixel electrodes 824-1 belonging to the (4n−1)th row, and the TFT 823-1 connected to the (4n)th gate wiring 826-1 counted from the upper end is connected to each of pixel electrodes 824-1 belonging to the (4n)th row. "n" is a natural number. The image signal supplied to each source wiring 827-1 is not inverted in polarity in a certain frame period, and the polarity is inverted for each frame. Even in the connection form illustrated in FIG. 29, similar to the ninth embodiment, the polarities can be inverted in units of two horizontally arranged pixels in a zigzag manner.

Figure 30:
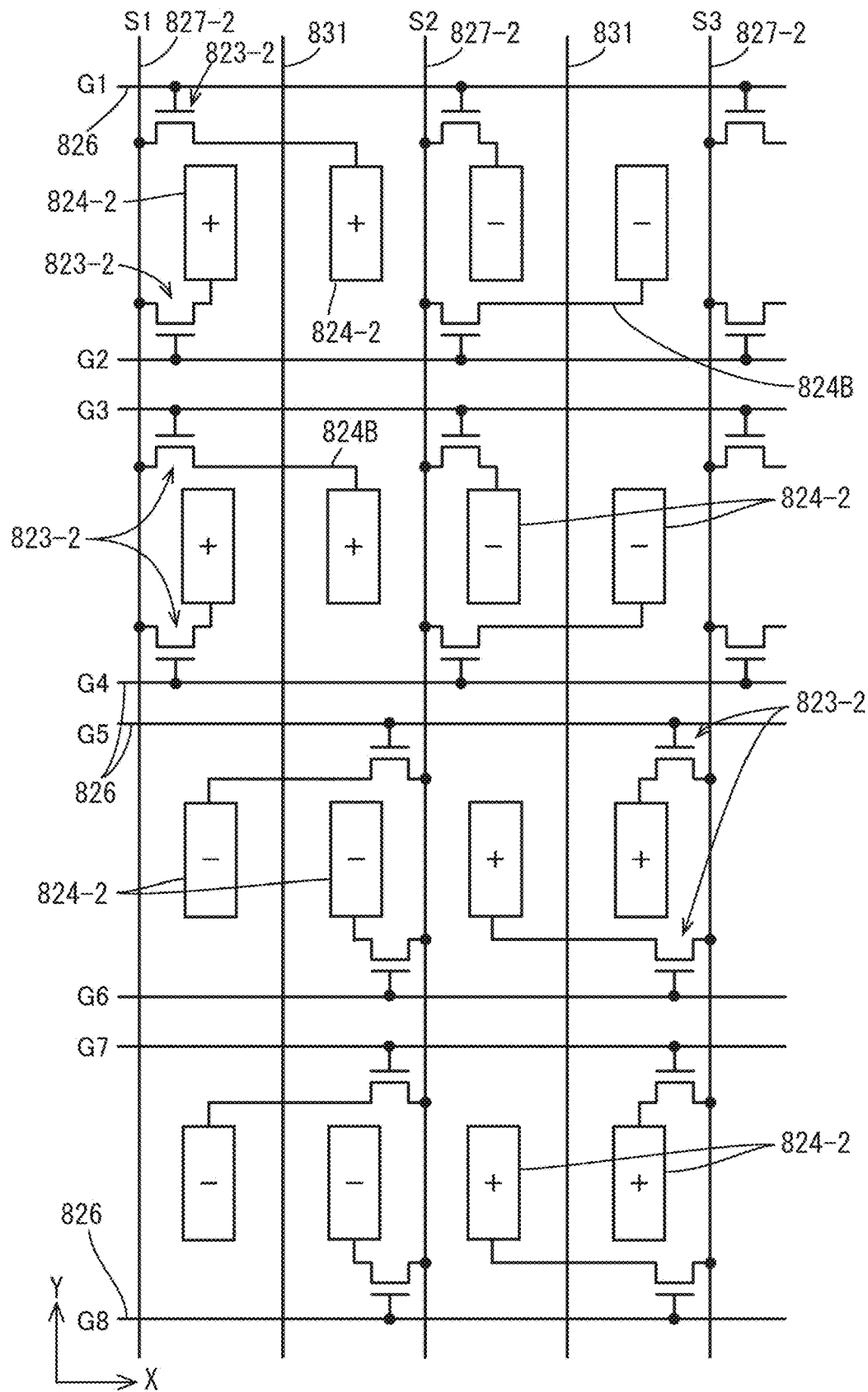
FIG. 30 is a circuit diagram schematically illustrating a connection form of a TFT with a gate wiring, a source wiring, and a pixel electrode provided in a liquid crystal panel according to another embodiment (9), and a polarity of an image signal supplied to a pixel electrode in a certain frame period.

(9) In addition to (8) above, a connection form as illustrated in FIG. 30 can be adopted as the modification example of the ninth embodiment. Specifically, as illustrated in FIG. 30, the TFT 823-2 connected to the odd-numbered source wiring 827-2 counted from the left end is connected to each pixel electrode 824-2 belonging to the (4n−2)th column, and the TFT 823-2 connected to the even-numbered source wiring 827-2 counted from the left end is connected to each pixel electrode 824-2 belonging to the (4n−1)th column. The image signal supplied to each source wiring 827-2 is not inverted in polarity in a certain frame period, and the polarity is inverted for each frame. In this manner, the image signal transmitted to the odd-numbered source wiring 827-2 counted from the left end is supplied to each of the pixel electrodes 824-2 belonging to the (4n−3)th column and the (4n−2)th column. The image signal transmitted to the even-numbered source wiring 827-2 counted from the left end is supplied to each of the pixel electrodes 824-2 belonging to the (4n−1)th column and the (4n)th column. Therefore, according to the connection form illustrated in FIG. 30, in a case where four pixel electrodes 824-2 of two pixel electrodes 824-2 belonging to the (2n−1)th row and the (2n)th row in the (2m−1)th column and two pixel electrodes 824-2 belonging to the (2n−1)th row and the (2n)th row in the (2m)th column are made as one pixel set, the polarities can be inverted in a zigzag manner in units of 2×2 pixels. Such a configuration is suitable in a case where the pixel size is small (for example, in a case where the length of the pixel in the short-side direction is 35 μm or less). Both "n" and "m" are natural numbers.

Figure 31:
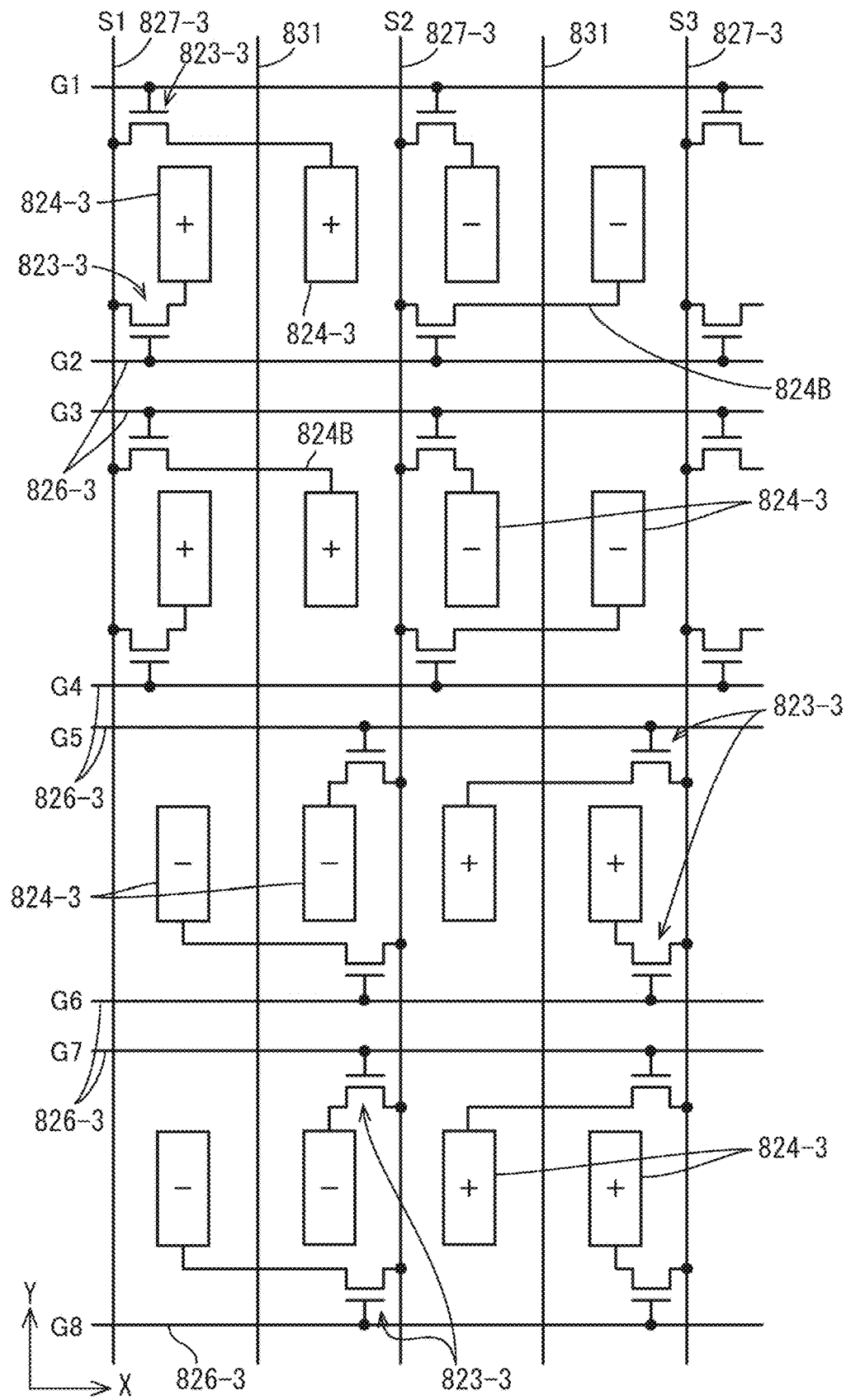
FIG. 31 is a circuit diagram schematically illustrating a connection form of a TFT with a gate wiring, a source wiring, and a pixel electrode provided in a liquid crystal panel according to another embodiment (10), and a polarity of an image signal supplied to a pixel electrode in a certain frame period.

(10) As a modification example of (9) above, a connection form as illustrated in FIG. 31 can be adopted. Differences from (9) described above will be mainly described below. Specifically, as illustrated in FIG. 31, among pixel electrodes 824-3 belonging to the (4n−1)th column, the TFT 823-3 connected to the (8n−2)th gate wiring 826-3 counted from the upper end is connected to each of pixel electrodes 824-3 belonging to the (4n−3)th row, the TFT 823-3 connected to the (8n−3)th gate wiring 826-3 counted from the upper end is connected to each of pixel electrodes 824-3 belonging to the (4n−2)th row, the TFT 823-3 connected to the (8n−3)th gate wiring 826-3 counted from the upper end is connected to each of pixel electrodes 824-3 belonging to the (4n−1)th row, and the TFT 823-3 connected to the (8n−2)th gate wiring 826-3 counted from the upper end is connected to each of pixel electrodes 824-3 belonging to the (4n)th row. In addition, among pixel electrodes 824-3 belonging to the (4n)th column, the TFT 823-3 connected to the (8n)th gate wiring 826-3 counted from the upper end is connected to each of pixel electrodes 824-3 belonging to the (4n−3)th row, the TFT 823-3 connected to the (8n−1)th gate wiring 826-3 counted from the upper end is connected to each of pixel electrodes 824-3 belonging to the (4n−2)th row, the TFT 823-3 connected to the (8n−1)th gate wiring 826-3 counted from the upper end is connected to each of pixel electrodes 824-3 belonging to the (4n−1)th row, and the TFT 823-3 connected to the (8n)th gate wiring 826-3 counted from the upper end is connected to each of pixel electrodes 824-3 belonging to the (4n)th row. "n" is a natural number. The image signal supplied to each source wiring 827-3 is not inverted in polarity in a certain frame period, and the polarity is inverted for each frame. In this manner, similar to (9) above, the polarities can be inverted in units of four pixels arranged two by two vertically and horizontally in a zigzag manner. Such a configuration is suitable in a case where the pixel size is small (for example, in a case where the length of the pixel in the short-side direction is 35 µm or less).

(11) The gate circuit unit 13 can be omitted. In this case, a gate driver having the similar function to that of the gate circuit unit 13 may be mounted on the array substrates 21, 221, 321, 421, 521, 621, 721, and 821. Further, the gate circuit unit 13 can be provided only at the side portion of one side of the array substrates 21, 221, 321, 421, 521, 621, 721, and 821.

(12) The material of the semiconductor film constituting the semiconductor portions 23D and 723D may be polysilicon (LTPS) or the like.

(13) The touch panel pattern may be a mutual capacitance type in addition to the self-capacitance type.

(14) The configuration of the TFTs 23, 123, 723, 823, 823-1, 823-2, 823-3, and 923 may be a top gate type, a double gate type, or the like, in addition to the bottom gate type illustrated in the drawings.

(15) The color filters 28 and the light shielding portion 29 may be provided on the array substrates 21, 221, 321, 421, 521, 621, 721, and 821. In this case, the pixel electrodes 24, 124, 224, 324, 424, 524, 624, 724, 824, 824-1, 824-2, 824-3, and 924, and the color filter 28 are provided on the array substrates 21, 221, 321, 421, 521, 621, 721, and 821 together, and no pixel components are provided on the counter substrate 20.

(16) The number of colors of the color filter may be four or more. A color filter to be added may be a yellow color filter capable of emitting yellow light included in a yellow wavelength range (about 570 nm to about 600 nm), a transparent color filter capable of emitting light in the entire wavelength range, or the like.

(17) The planar shape of the liquid crystal panel 10 may be a vertically long rectangle, a square, a circle, a semicircle, an oval, an ellipse, a trapezoid, or the like.

(18) The liquid crystal panel 10 may be a reflective type or a semi-transmissive type in addition to the transmissive type.

(19) A display panel (such as an organic electroluminescence (EL) display panel) having a type different from the liquid crystal panel 10 or an EPD (microcapsule electrophoresis display panel) may be used.

(20) The liquid crystal panel 10 may not have the touch panel function. In this case, the plurality of touch wirings 31, 231, 331, 431, 531, 631, 731, 831, and 931 are a plurality of common wirings that exclusively transmit the common potential signal. The common electrodes 25, 225, 325, 625, 725, and 825 are connected to a plurality of common wirings to have a common potential, and do not function as the touch electrodes 30, 230, and 730.

The present disclosure contains subject matter related to that disclosed in Japanese Priority Patent Application JP 2023-049373 filed in the Japan Patent Office on Mar. 27, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wiring substrate comprising:
   a first wiring; and
   a second wiring that intersects the first wiring, wherein
   the first wiring includes a lower-layer wiring portion that is formed of a first conductive film, and an upper-layer wiring portion that is formed of a second conductive film disposed on an upper layer side of the first conductive film via a first insulating film,
   a plurality of first contact holes each connecting the lower-layer wiring portion and the upper-layer wiring portion is provided in the first insulating film and overlaps both the lower-layer wiring portion and the upper-layer wiring portion in a plan view,
   a plurality of pixels is located in a prescribed direction in which the first wiring extends,
   the second wiring is formed of a third conductive film disposed on an upper layer side of the second conductive film via a second insulating film,
   the second insulating film has a larger film thickness than a film thickness of the first insulating film,
   the plurality of first wiring contact holes is arranged at positions in intervals of approximately one pixel of the plurality of pixels in the prescribed direction, and a number of the plurality of first wiring contact holes which overlap the first wiring is equal to a number of the plurality of pixels arranged in the prescribed direction, and
   the first insulating film includes a first insulating material having a relative dielectric constant from 4 to 8, and the second insulating film includes a second insulating material having a relative dielectric constant from 3 to 4.

2. The wiring substrate according to claim 1, further comprising:
   a pixel electrode;

a switching element connected to the first wiring, the second wiring, and the pixel electrode; and
a common electrode disposed to overlap the pixel electrode,
wherein the common electrode includes
  a first opening portion extending along the second wiring, and
  a first electrode portion and a second electrode portion divided by the first opening portion, and
the first opening portion is disposed to overlap a portion of the pixel electrode.

3. The wiring substrate according to claim 1,
wherein two first wirings are provided, and
the wiring substrate further comprises:
  a plurality of pixel electrodes arranged at intervals along the second wiring;
  a switching element connected to the first wiring, the second wiring, and the pixel electrode; and
  a common electrode disposed to overlap the plurality of pixel electrodes,
all of the plurality of pixel electrodes have a longitudinal shape along the second wiring, and
the two first wirings are located between the two pixel electrodes adjacent to each other and are disposed at intervals.

4. The wiring substrate according to claim 1,
wherein the first insulating film is formed of an inorganic insulating material, and
the second insulating film is formed of an organic insulating material.

5. A display device comprising:
the wiring substrate according to claim 1; and
a counter substrate disposed to face the wiring substrate.

6. A wiring substrate comprising:
a first wiring; and
a second wiring that intersects the first wiring, wherein
the first wiring includes a lower-layer wiring portion that is formed of a first conductive film, and an upper-layer wiring portion that is formed of a second conductive film disposed on an upper layer side of the first conductive film via a first insulating film,
a first contact hole that connects the lower-layer wiring portion and the upper-layer wiring portion is provided in the first insulating film and overlaps both the lower-layer wiring portion and the upper-layer wiring portion in the plan view,
the second wiring is formed of a third conductive film disposed on an upper layer side of the second conductive film via a second insulating film,
the second insulating film has a larger film thickness than a film thickness of the first insulating film,
the wiring substrate further comprises:
  a pixel electrode;
  a switching element connected to the first wiring, the second wiring, and the pixel electrode; and
  a common electrode disposed to overlap the pixel electrode,
the common electrode includes:
  a first opening portion extending along the second wiring, and
  a first electrode portion and a second electrode portion divided by the first opening portion,
the first opening portion overlaps a portion of the pixel electrode,
the wiring substrate further includes a third wiring that is formed of a portion of the third conductive film, which is different from the second wiring, the third wiring intersecting the first wiring,
wherein the pixel electrode has a longitudinal shape along the first wiring and has a bent portion in the middle in a longitudinal direction,
the common electrode is formed of one transparent electrode film of a first transparent electrode film disposed on an upper layer side of the third conductive film via a third insulating film and a second transparent electrode film disposed on an upper layer side of the first transparent electrode film via a fourth insulating film,
the pixel electrode is formed of the other transparent electrode film of the first transparent electrode film and the second transparent electrode film,
the third wiring is disposed to overlap the bent portion, and
a second contact hole that connects the common electrode and the third wiring is provided in the third insulating film and overlaps both the common electrode and the third wiring in a plan view.

7. The wiring substrate according to claim 6,
wherein the third wiring includes a third wiring body that intersects the first wiring, and a first branch portion that is branched from the third wiring body and is disposed to overlap a portion of the common electrode and a portion of the first wiring, and
the second contact hole is disposed to overlap the first branch portion.

8. The wiring substrate according to claim 6,
wherein the common electrode is provided such that the first opening portion overlaps the third wiring.

9. The wiring substrate according to claim 8, further comprising:
a fourth wiring that is formed of a portion of the third conductive film, which is different from the second wiring and the third wiring, the fourth wiring intersecting the first wiring,
wherein the common electrode includes a second opening portion that extends along the fourth wiring and divides the first electrode portion into a third electrode portion and a fourth electrode portion,
the fourth wiring includes
  a fourth wiring body that is disposed to intersect the first wiring and overlap the second opening portion in a plan view,
  a second branch portion that is branched from the fourth wiring body and is disposed to overlap the third electrode portion in a plan view, and
  a third branch portion that is branched from the fourth wiring body and is disposed to overlap the fourth electrode portion in a plan view, and
at least the third insulating film is provided with:
  a third contact hole that connects the third electrode portion and the second branch portion is provided in the third insulating film and overlaps both the third electrode portion and the second branch portion in a plan view; and
  a fourth contact hole that connects the fourth electrode portion and the third branch portion is provided in the third insulating film and overlaps both the fourth electrode portion and the third branch portion in a plan view.

10. The wiring substrate according to claim 6,
wherein the pixel electrode is formed of the second transparent electrode film and includes a fifth electrode portion and a sixth electrode portion that are disposed to interpose the bent portion and are continuous with the bent portion, a third opening portion that extends along the first wiring is provided in the fifth electrode portion, a fourth opening portion that extends along the first wiring and has a relationship of intersecting the third opening portion is provided in the sixth electrode portion, and the bent portion includes a seventh electrode portion that extends along the third wiring and has a relationship of intersecting both the third opening portion and the fourth opening portion.

11. The wiring substrate according to claim 10, wherein the seventh electrode portion includes an eighth electrode portion that is continuous with the fifth electrode portion, and a ninth electrode portion that is continuous with the sixth electrode portion, and the bent portion includes a joining portion that intersects the third wiring and joins the eighth electrode portion and the ninth electrode portion.

12. The wiring substrate according to claim 6, wherein the pixel electrode is formed of the second transparent electrode film and includes a fifth electrode portion and a sixth electrode portion that are disposed to interpose the bent portion and are continuous with the bent portion, a fifth opening portion that extends along the first wiring is continuously provided in the bent portion, the fifth electrode portion, and the sixth electrode portion, and the bent portion has a relationship orthogonal to the third wiring.

13. A wiring substrate comprising:

a first wiring; and a second wiring that intersects the first wiring, wherein the first wiring includes a lower-layer wiring portion that is formed of a first conductive film, and an upper-layer wiring portion that is formed of a second conductive film disposed on an upper layer side of the first conductive film via a first insulating film, a plurality of first contact holes each connecting the lower-layer wiring portion and the upper-layer wiring portion is provided in the first insulating film and overlaps both the lower-layer wiring portion and the upper-layer wiring portion in a plan view, a plurality of pixels is located in a prescribed direction in which the first wiring extends, the second wiring is formed of a third conductive film disposed on an upper layer side of the second conductive film via a second insulating film, the second insulating film has a larger film thickness than a film thickness of the first insulating film, and the plurality of first wiring contact holes is arranged at positions in intervals of approximately one pixel of the plurality of pixels in the prescribed direction, and a number of the plurality of first wiring contact holes which overlap the first wiring is equal to a number of the plurality of pixels arranged in the prescribed direction, the wiring substrate further includes:

a plurality of pixel electrodes arranged at intervals along the first wiring;

a switching element connected to the first wiring, the second wiring, and the pixel electrode; and a common electrode disposed to overlap the plurality of pixel electrodes, all of the plurality of pixel electrodes have a longitudinal shape along the first wiring, the second wiring is disposed to overlap a central portion of any one of the pixel electrodes, the switching element is connected to the central portion of the pixel electrode, the common electrode includes a sixth opening portion that extends along the second wiring, and a tenth electrode portion and an eleventh electrode portion that are divided by the sixth opening portion, and the sixth opening portion is disposed to be located between two of the pixel electrodes adjacent to each other.

14. The wiring substrate according to claim 13, wherein the pixel electrode includes a twelfth electrode portion and a thirteenth electrode portion that are disposed to interpose the central portion and are continuous with the central portion, and the central portion is narrower than the twelfth electrode portion and the thirteenth electrode portion.

15. A wiring substrate comprising:

a first wiring; and a second wiring that intersects the first wiring, wherein the first wiring includes a lower-layer wiring portion that is formed of a first conductive film, and an upper-layer wiring portion that is formed of a second conductive film disposed on an upper layer side of the first conductive film via a first insulating film, a first contact hole that connects the lower-layer wiring portion and the upper-layer wiring portion is provided in the first insulating film and overlaps both the lower-layer wiring portion and the upper-layer wiring portion in a plan view, the second wiring is formed of a third conductive film disposed on an upper layer side of the second conductive film via a second insulating film, the second insulating film has a larger film thickness than a film thickness of the first insulating film, the wiring substrate further includes:

a pixel electrode; and a switching element connected to the first wiring, the second wiring, and the pixel electrode, wherein the second wiring, the switching element, and the pixel electrode are arranged along the first wiring, and the first contact hole is disposed to overlap the second wiring.

* * * * *